United States Patent [19]

Matsuo et al.

[11] Patent Number: 5,485,587
[45] Date of Patent: Jan. 16, 1996

[54] DATA PROCESSOR CALCULATING BRANCH TARGET ADDRESS OF A BRANCH INSTRUCTION IN PARALLEL WITH DECODING OF THE INSTRUCTION

[75] Inventors: Masahito Matsuo; Toyohiko Yoshida, both of Itami, Japan

[73] Assignee: Mitsubishi Denki Kabushiki Kaisha, Tokyo, Japan

[21] Appl. No.: 10,085

[22] Filed: Jan. 27, 1993

[30] Foreign Application Priority Data

Feb. 7, 1992 [JP] Japan ................................ 4-022695

[51] Int. Cl.$^6$ .............................. G06F 9/28; G06F 9/32
[52] U.S. Cl. .................... 395/375; 364/DIG. 1; 364/261.3; 364/255.1; 364/255.5
[58] Field of Search ................................ 395/375, 800

[56] References Cited

U.S. PATENT DOCUMENTS

| | | | |
|---|---|---|---|
| 4,471,433 | 9/1984 | Matsumoto et al. | 395/375 |
| 4,725,947 | 2/1988 | Shonai et al. | 395/375 |
| 4,742,451 | 5/1988 | Bruckert et al. | 395/375 |
| 4,764,861 | 8/1988 | Shibuya | 395/375 |
| 4,775,927 | 10/1988 | Hester et al. | 395/375 |
| 4,777,587 | 10/1988 | Case et al. | 395/375 |
| 4,881,170 | 11/1989 | Morisada | 395/375 |
| 4,912,635 | 3/1990 | Nishimukai et al. | 395/375 |
| 4,977,496 | 12/1990 | Onishi et al. | 395/375 |
| 5,075,849 | 12/1991 | Kuriyama et al. | 395/400 |
| 5,099,419 | 3/1992 | Nomura | 395/375 |
| 5,142,634 | 8/1992 | Fite et al. | 395/375 |
| 5,155,818 | 10/1992 | Stein et al. | 395/375 |
| 5,237,664 | 8/1993 | Usami | 395/375 |
| 5,295,248 | 3/1994 | Miyamori | 395/375 |

FOREIGN PATENT DOCUMENTS 0239937 10/1987 European Pat. Off. .

OTHER PUBLICATIONS

Dobinson et al, "Interfacing to Ethernet Using VLSI Protocol Chips", *Interfaces in Computing*, vol. 3, No. 3/4 (Dec. 1985), pp. 173–187.
Lee et al, "Branch Prediction Strategies and Brach Target Buffer Design", *IEEE Computer*, vol. 17, No. 1 (Jan. 1984), pp. 6–22.
"The Gmicro/100 32-Bit Microprocessor", *IEEE Microc*, vol. 11, No. 4 (Aug. 1991), pp. 20–23, 62–72.
"Internal Design and Performance of IBM 3033 Processor", Large General–Purpose Computer by Nikkei Macgrow Hill (May 1982), pp. 251–263.

*Primary Examiner*—Krisna Lim
*Attorney, Agent, or Firm*—Lowe, Price, LeBlanc & Becker

[57] ABSTRACT

A data processor, comprising: an instruction fetch unit 111 which fetches instructions from a memory which stores instructions; an instruction decoding unit 112 which decodes the instructions fetched from the instruction fetch unit 111; an instruction execution unit which executes the instructions on the basis of the decoding result by the instruction decoding unit 112; a program counter (DPC) 29 which holds an address of the instruction being decoded in the instruction decoding unit 112; and a branch target address calculation unit 1 which is connected to the instruction fetch unit 111 and the program counter (DPC) 29, adds a value of a branch displacement field transferred from the instruction fetch unit 111 and the instruction address transferred from the program counter (DPC) 29, and transfers the addition result to the instruction fetch unit 111, so that jump instruction can be processed efficiently by pipeline processing.

6 Claims, 59 Drawing Sheets

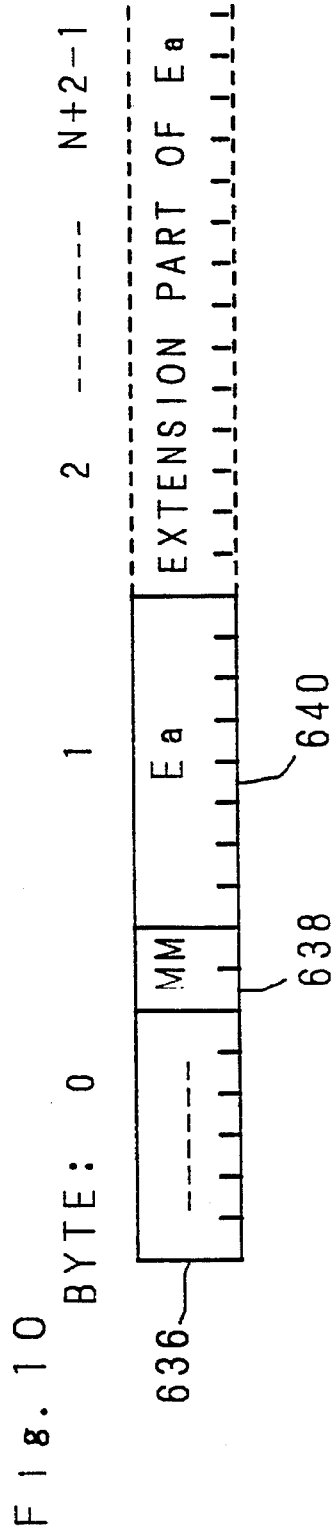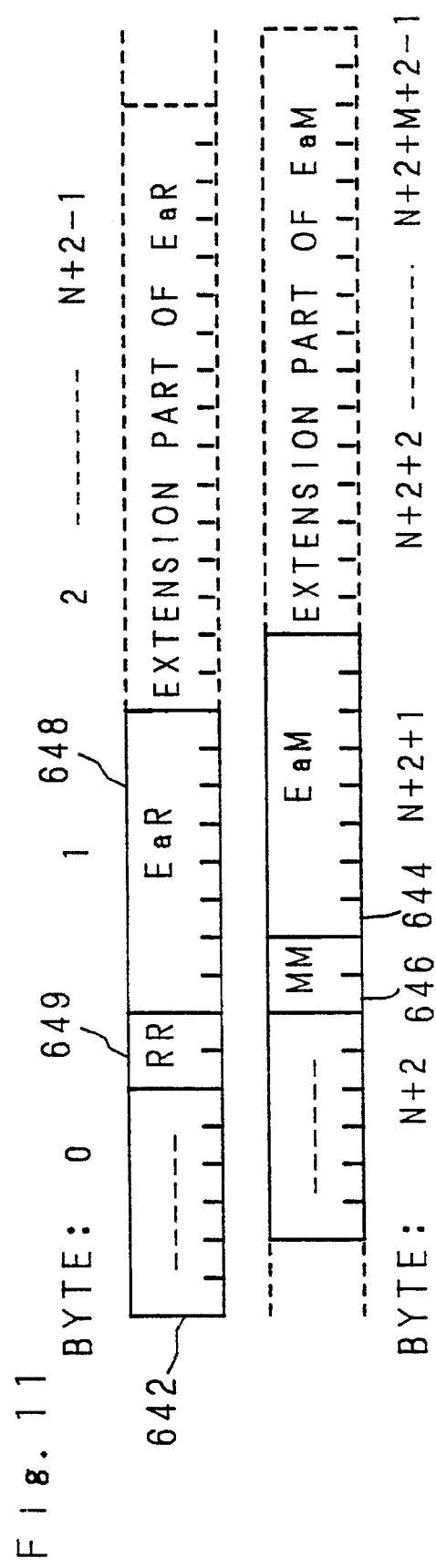

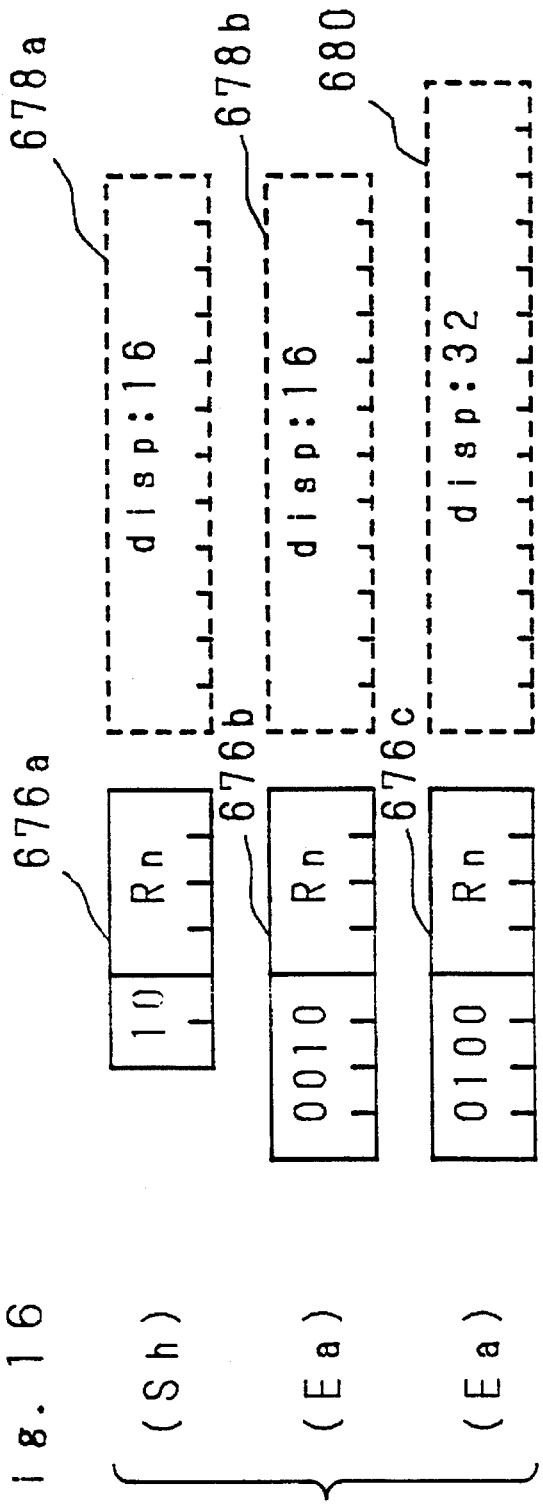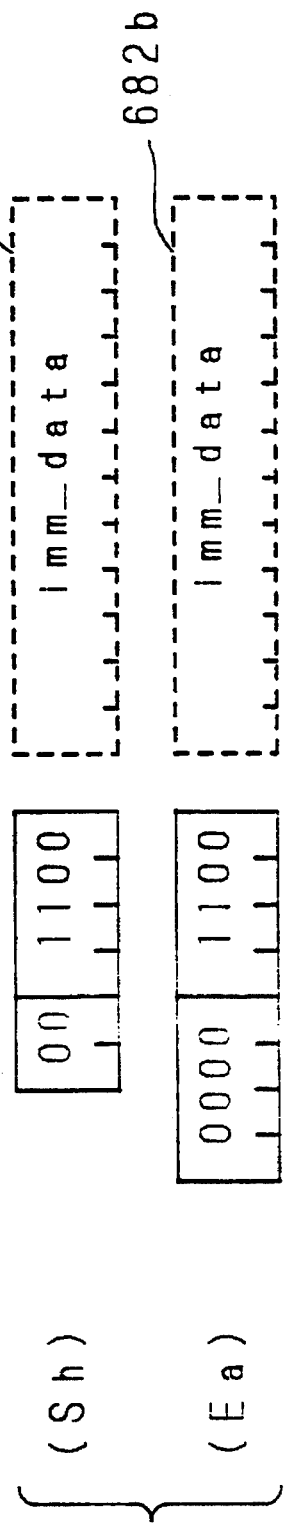

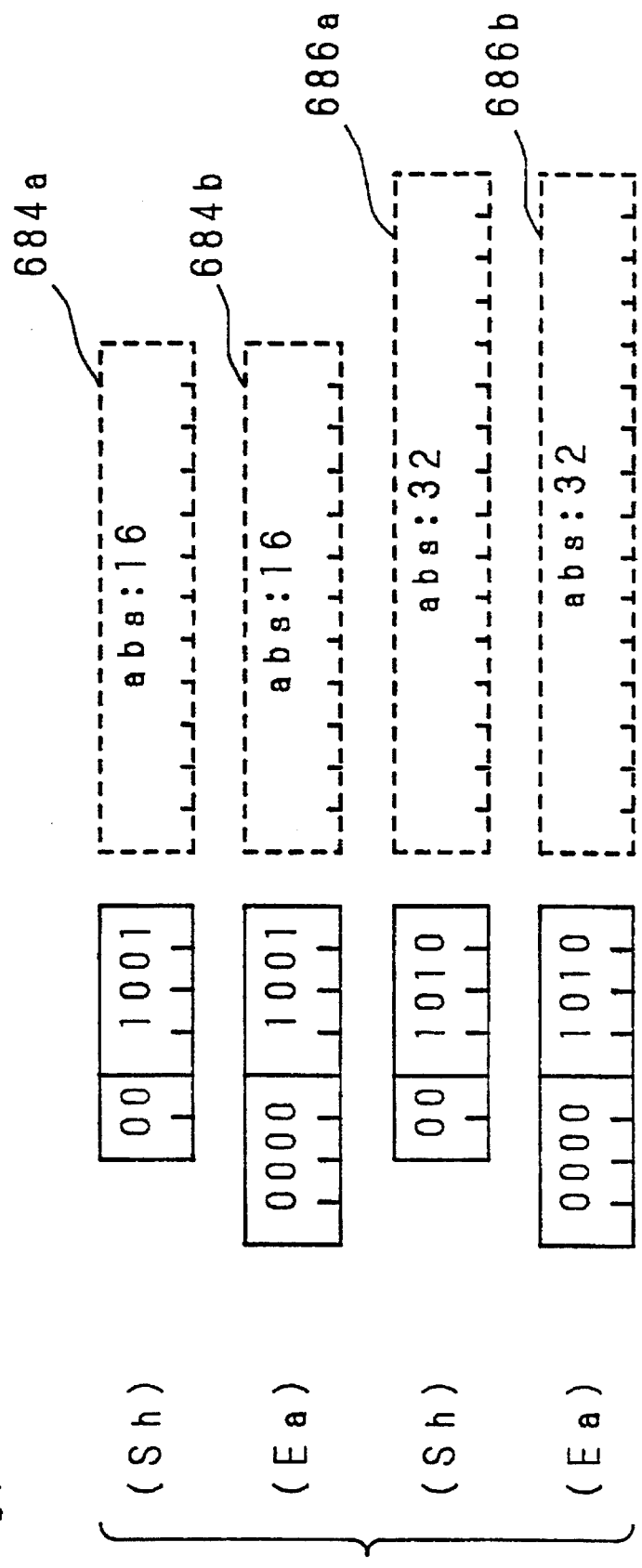

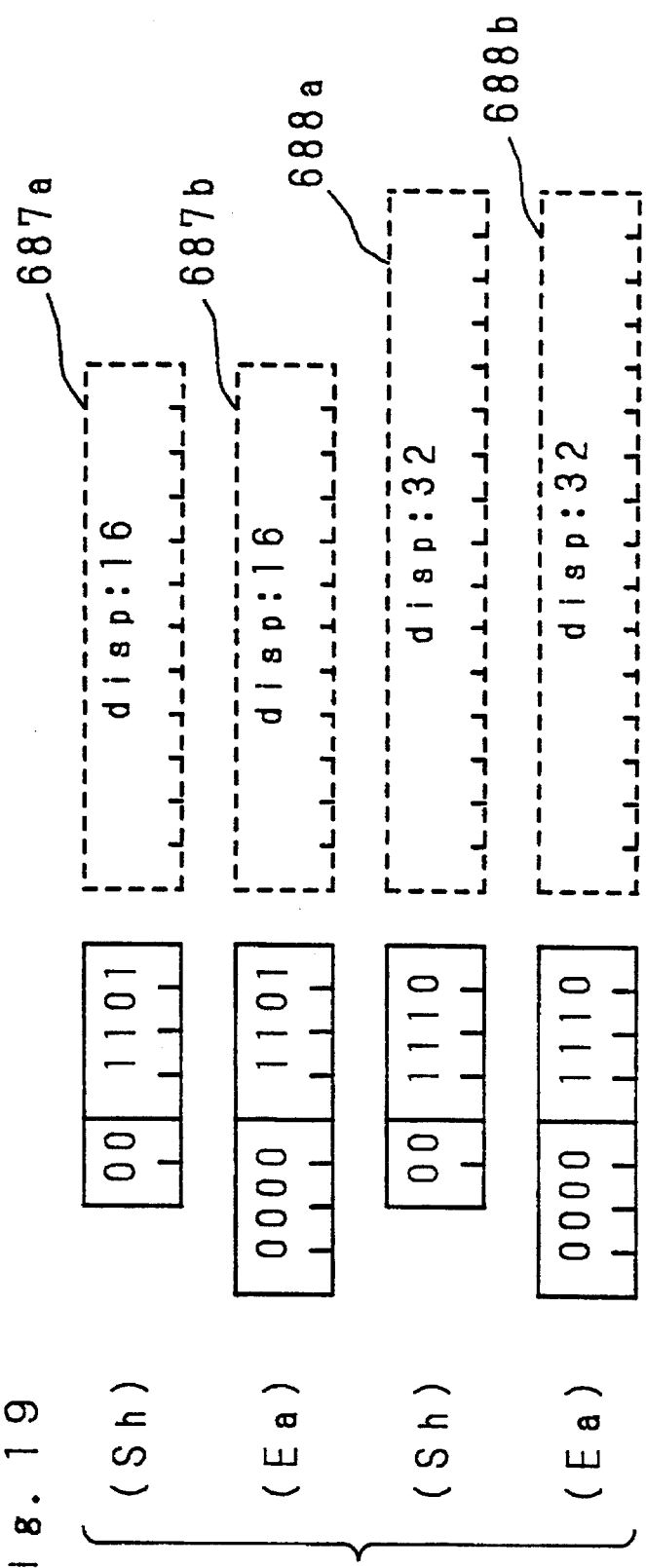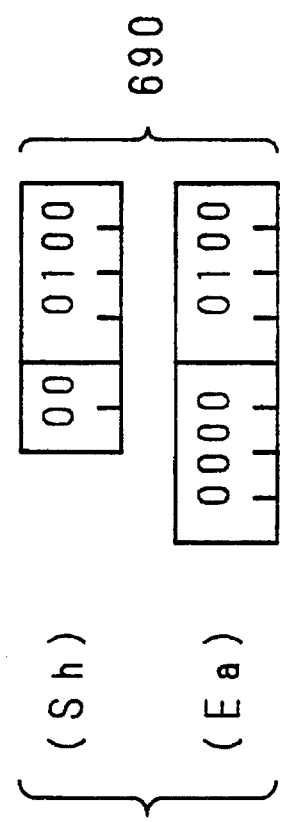

CHAINED ADDRESSING MODE --- CHAINED ADDRESSING MODE

CHAINED ADDRESSING MODE --- CHAINED ADDRESSING MODE --- CHAINED ADDRESSING MODE

Fig. 28

BRA:D   pcdisp

| 10101110 | pcdisp |

Fig. 30

Bcc:D   pcdisp

| 10 | cccc | 00 | pcdisp |

BSR:D   pcdisp

JMP   pcadr

Fig. 36

ACB:Q  1,xreg,limit,pcdisp

| 00 | xreg | 11 | 11010001 | limit | sz | pcdisp |

JMP    pcadr

Fig. 38

ACB:G step,xreg,limit,pcdisp

| 110100 | sx | step | 111100 | sy | limit |
| --- | --- | --- | --- | --- | --- |

| xx | xreg | sz | pcdisp |
| --- | --- | --- | --- |

Fig. 39

ACB:E step,xreg,limit,pcdisp

| 1011111 | step | 111100 | sy | limit |
|---|---|---|---|---| step,xreg,limit,pcdisp

| xx | xreg | sz | pcdisp |
|---|---|---|---|

Fig. 41

SCB:R   1,xreg,limit,pcdisp

| 00 | xreg | 11 | 11010010 | 00 | limit | sz | pcdisp |

Fig. 44

FBcc   pcdisp

| 111000 | sx | 0001 | xxxx | 001100 | sy | xxx | cccc | pcdisp

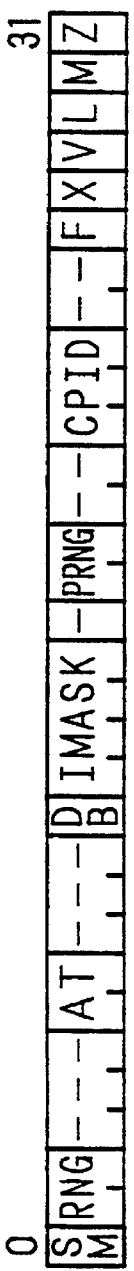
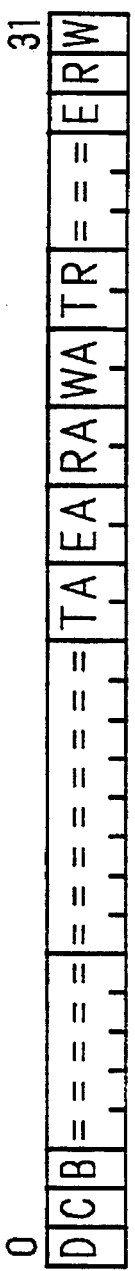
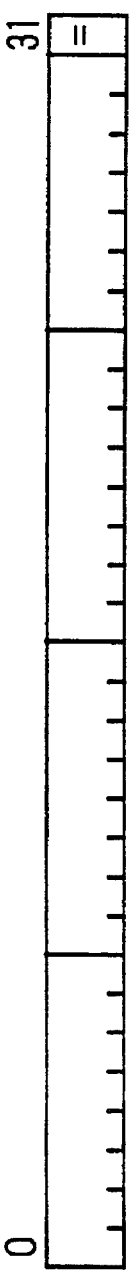
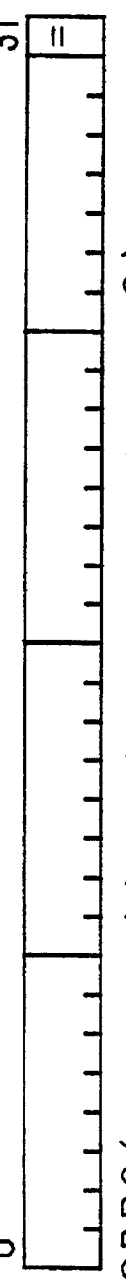
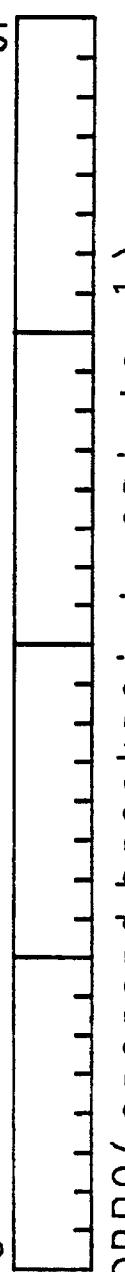
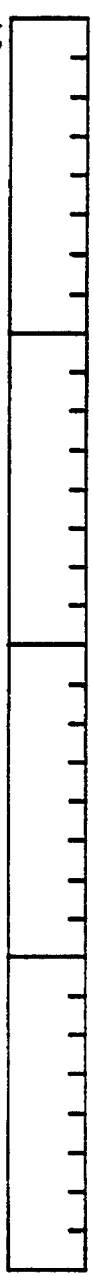
Fig. 45(a) PSW (processor status word)
Fig. 45(b) DBC (debug control register)
Fig. 45(c) XBP0 (execution breakpoint register 0)
Fig. 45(d) XBP1 (execution breakpoint register 1)
Fig. 45(e) OBP0 (operand breakpoint register 0)
Fig. 45(f) OBP0 (operand breakpoint register 1)

In-1 : JUST BEFOR INSTRUCTION OF BRA INSTRUCTION
Ibt : BRANCH TARGET INSTRUCTION OF BRA INSTRUCTION

In-1: JUST BEFOR INSTRUCTION OF BSR INSTRUCTION
Ibt: BRANCH TARGET INSTRUCTION OF BSR INSTRUCTION

In-1 : JUST BEFOR INSTRUCTION OF Bcc INSTRUCTION
In+1 : NEXT INSTRUCTION OF Bcc INSTRUCTION
Ibt : BRANCH TARGET INSTRUCTION OF Bcc INSTRUCTION

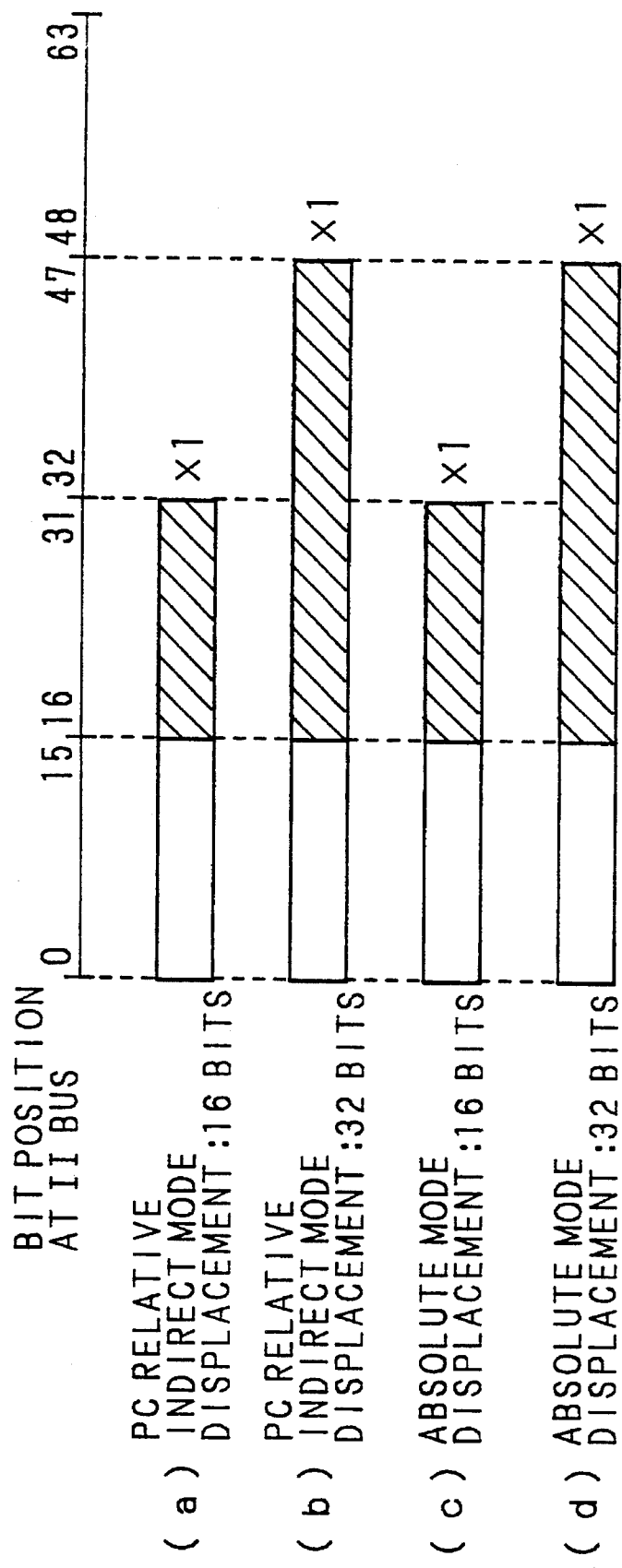

In-1: JUST BEFOR INSTRUCTION OF JMP INSTRUCTION
IJt: JUMP TARGET INSTRUCTION OF JMP INSTRUCTION

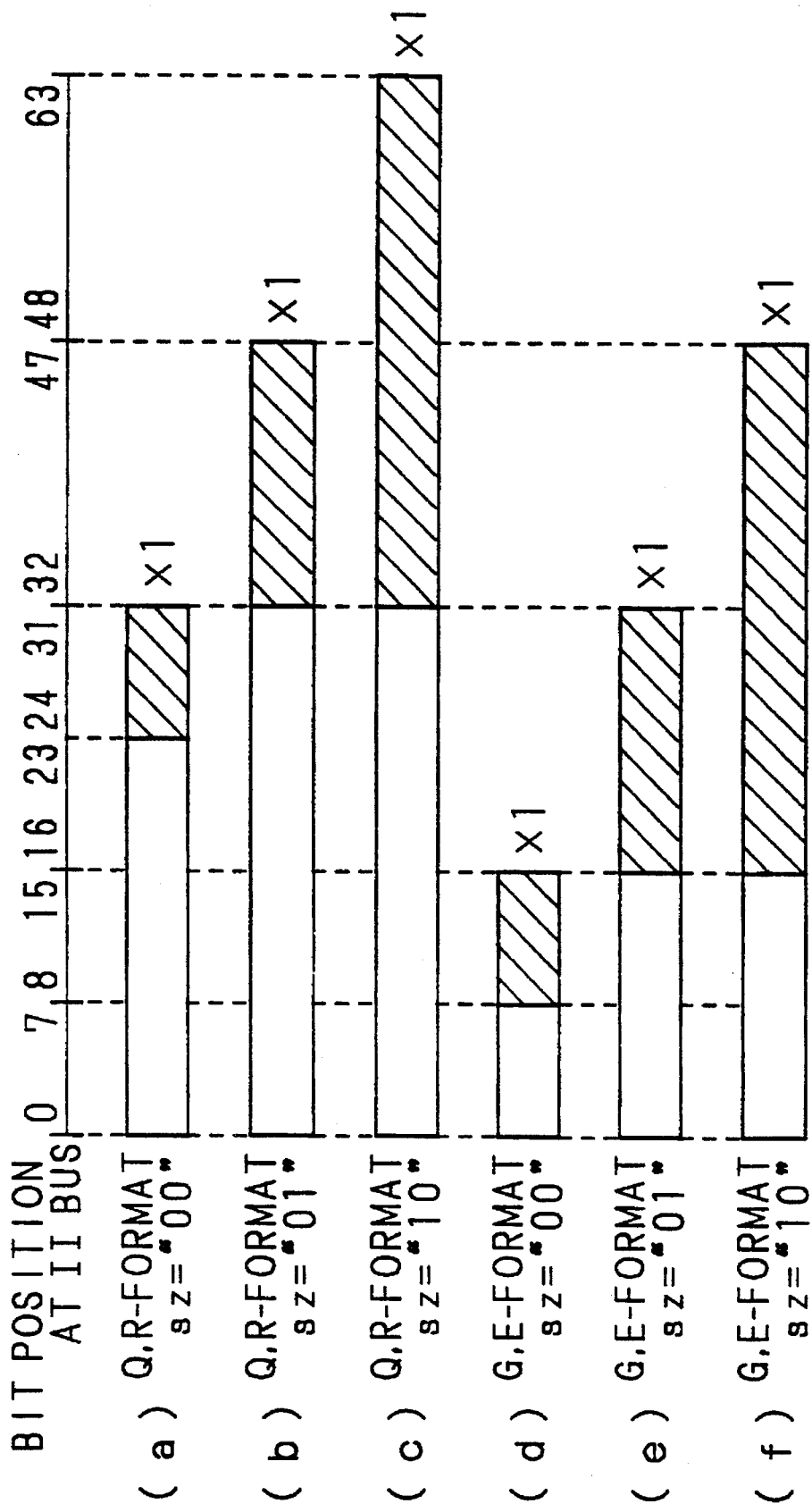

In-1 : JUST BEFOR INSTRUCTION OF
       ACB INSTRUCTION
In+1 : NEXT INSTRUCTION OF ACB
       INSTRUCTION
Ibt  : BRANCH TARGET INSTRUCTION
       OF ACB INSTRUCTION

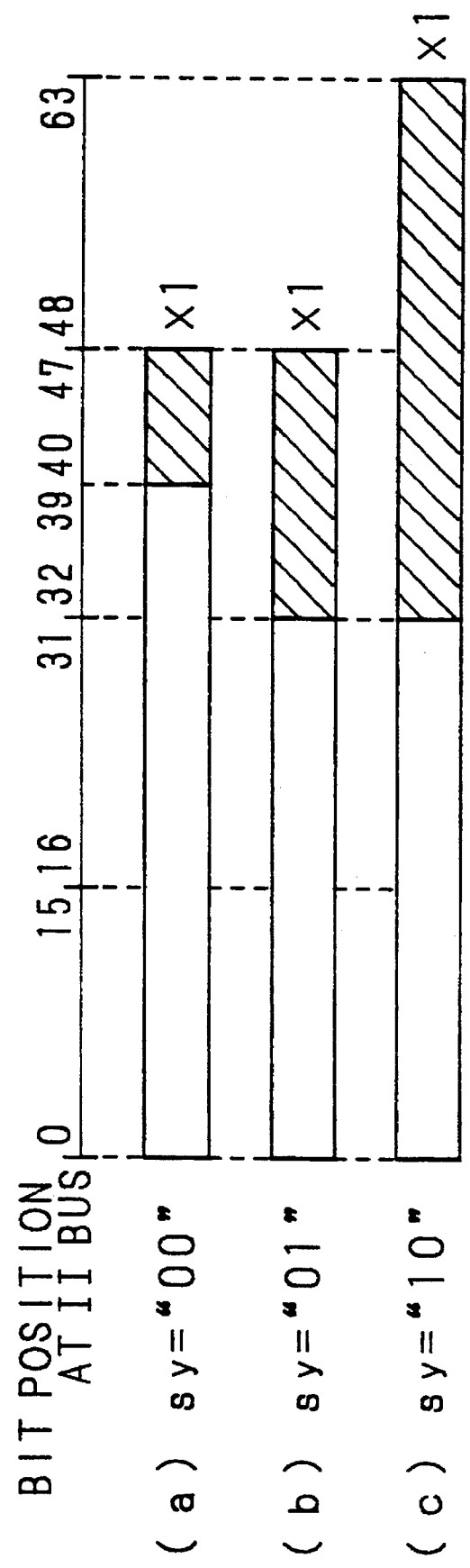

In-1 : JUST BEFOR INSTRUCTION OF
       FBcc INSTRUCTION
In+1 : NEXT INSTRUCTION OF FBcc
       INSTRUCTION
Ibt : BRANCH TARGET INSTRUCTION
      OF FBcc INSTRUCTION

In-1: JUST BEFOR INSTRUCTION OF BRA INSTRUCTION
Ibt: BRANCH TARGET INSTRUCTION OF BRA INSTRUCTION

In-1: JUST BEFOR INSTRUCTION OF
1st Bcc INSTRUCTION (Bcc1)
In+2: NEXT INSTRUCTION OF 2nd Bcc
INSTRUCTION (Bcc2)
Ibt2: BRANCH TARGET INSTRUCTION
OF 2nd Bcc INSTRUCTION (Bcc2)

In-1: JUST BEFOR INSTRUCTION OF Bcc INSTRUCTION
Ibt2: BRANCH TARGET INSTRUCTION OF BSR INSTRUCTION 5,485,587

DATA PROCESSOR CALCULATING BRANCH TARGET ADDRESS OF A BRANCH INSTRUCTION IN PARALLEL WITH DECODING OF THE INSTRUCTION

BACKGROUND OF THE INVENTION

1. Field of the Invention

The present invention relates to a data processor, specifically, to a data processor including a pipeline processing mechanism which processes a jump instruction rapidly, and more particularly, to a data processor capable of reducing overheads of pipeline processing of the case where the jump instruction is executed by performing jump processing in the initial pipeline stage.

2. Description of the Related Art

In a conventional data processor, by dividing the processing into a plural number of steps with a flow of data processing, and processing the steps of different instructions simultaneously in respective corresponding stages of the pipeline, a mean processing time necessary for one instruction is shortened and a processing performance is improved as a whole.

However, in case of executing an instruction which disturbs an instruction processing sequence such as a jump instruction, since an instruction processing sequence is switched at executing stages of the instruction, an overhead of the pipeline processing increases and a pipeline processing can not be performed efficiently. Besides, a frequency of appearance of the jump instruction in executing practical programs is very high, thus an increase in processing speed of the jump instruction is one of the most important items to improve the performance of the data processor.

For improving the performance of the data processor, various strategies are taken to reduce the overhead in executing the instructions such as the unconditional branch instruction and conditional branch instruction. For example, a method of branch processing by predicting an instruction flow at the instruction fetch stage by using a branch target buffer, which stores a branch instruction address and branch target address in a set, is proposed (J. F. K. Lee and A. J. Smith, "Branch Prediction Strategies and Branch Target Buffer Design", IEEE COMPUTER Vol. 17, No. 1, January 1984, pp 6–22). However, in this method, since the improvement of the processing performance is largely dependent on the size of branch target buffer, a large amount of hardwares must be added to improve the performance drastically.

As a method of increasing processing speed of the branch instruction by adding a small amount of hardwares, the inventors have proposed the method, whereby the branch processing is performed by calculating the branch target address at a decoding stage (Yoshida et al. "The Gmicro/100 32-Bit Microprocessor", IEEE MICRO, Vol. 11, No. 4, PP. 20– 23, 62–72, August 1991.

FIG. 1 is a block diagram showing a configuration of a jump instruction processing mechanism of a conventional data processor, which calculates a branch target address at the instruction decoding stage so as to perform jump processing as mentioned above.

In FIG. 1, numeral 351 designates an instruction fetch unit which fetches in the instructions from a memory, not shown, numeral 352 designates an instruction decoding unit which decodes the instructions taken in from the instruction Fetch unit 351, and numeral 353 designates a program counter (PC) calculation unit which calculates and holds the instruction head address. Numeral 354 designates a latch (DPC) which holds a PC value of the instruction being decoded in the instruction decoding unit 352, numeral 355 designates a latch (TPC) which holds a head address value of an instruction code of the instruction being decoded in the instruction decoding unit 352, numeral 356 designates a PC adder which calculates PC calculation and branch target address calculation, numerals 357, 358 and 359 designate input/output latches (PIA, PIB, PO) of the PC adder 356, and numerals 361, 362, 363 and 364 designate data transfer paths connecting between respective blocks, which are respectively a displacement bus, an instruction length buss, an instruction address bus (IA bus) and a PC adder output bus (PO bus).

The data processor comprising the jump instruction processing mechanism constructed as shown in FIG. 1 performs the five-stage pipeline processings, an instruction fetch (IF) stage fetches an instruction from a memory storing the instruction, an instruction decoding (D) stage decoding the fetched instruction, an address calculation (A) stage calculating operand address according to the result of instruction decked, an operand fetch (F) stage pre-fetching the operand and reading/decoding a micro-instruction, and an executing (E) stage executing the instruction.

Hereupon, for simplifying the description, one unit processing is to be performed in one clock cycle in respective pipeline stages. The instruction being processed is a variable length instruction set, and the instruction decoding unit 352 decodes one instruction by dividing it into one or plural decoding processing units.

The PC calculation unit 353 is operated at the instruction decoding stage. A head address of the decoding processing unit decoded immediately before and stored in the TPC 355 is taken into the PIA 357 in respective decoding cycles, and a processing code length outputted from the instruction decoding unit 352 is taken into the PIB 358 via the instruction length bus 362. In the PC adder 356, a value of the PIA 357 and a value of the PIB 358 are added, and the addition result is written back to the TPC 355 via the PO 359 and PO bus 364. In the case where one instruction has been decoded, by writing back the addition result also to the DPC 354 via the PO bus 364, the DPC 354 holds the PC value of the decoded instruction. In this way, in the conventional data processor including the jump instruction processing mechanism constructed as shown in FIG. 1 the processing code length in the decoding cycles becomes clear only after the instruction decoding, since its instruction system is the variable length instruction set, from a view point of timing, the PC calculation unit 353 calculates the head address of the instruction being decoded in the first decoding cycle of the respective instructions.

Next, a mechanism of performing branch processing at the instruction decoding stage is described. The operation at unconditional branch instruction (BRA instruction) processing for designating the branch target address by displacement from the instruction head address is described.

At the time point of finishing the decoding cycle of the unconditional branch instruction, the PC value of the unconditional branch instruction is stored in the DPC 354. At the D stage, the branch target address is calculated in the next cycle. The PC adder 356 calculates the branch target address by adding branch displacement taken into the PIB 358 from the instruction decoding unit 352 via the displacement bus 361, and the PC value of the branch instruction taken into the PIA 357 from the DPV 354, and transfers the addition result to the instruction fetch unit 351 via the PO 359 and IA bus 363. The addition result is also written back to the TPC 355 via the PO 359 and Po bus 364 for initializing the PC calculation unit 353. The instruction fetch unit 351 fetches the branch target instruction on the bases of the branch target address taken in via the IA bus 363.

FIG. 2 shows a timing chart of processing the unconditional branch instruction (BRA instruction).

In FIG. 2, reference character In-1 designates an instruction immediately before the BRA instruction, and reference character Ibt designates an branch target instruction. As shown in FIG. 2(b), the unconditional branch instruction is decoded in the C1 cycle, as shown in FIG. 2(c) the branch target address is calculated in the C2 cycle, as shown in FIG. 2(a) the branch target instruction is fetched in the C3 cycle and as shown in FIG. 2(b) the branch target instruction is decoded in the C4 cycle. As such, since the unconditional branch instruction can be processed in 3 clock cycles by branch processing at the instruction decoding stage, the performance is improved as compared with the case wherein the branch processing is performed at the instruction executing stage. However, when considering in terms of the instruction decoding stage, there are still idle times of 2 clock cycles of the C2 and C3 cycles.

As stated above, in the conventional data processor, it is attempted to increase speed of the branch processing by adding a small amount of hardwares, by performing the branch processing at the instruction decoding stage.

In the above-mentioned conventional example, the instruction which is branch processed at the instruction decoding stage is limited to the branch instruction whose jump target address is designated in the PC relative addressing mode, and the jump instruction whose jump target address is designated by an operated designator is not subjected to jump processing at the instruction decoding stage. In the above-mentioned conventional example, also for the unconditional branch instruction, it is not branched at the instruction decoding stage, but processed at the executing stage.

Furthermore, in the conventional data processor, there is the one which includes a plural number of instruction buffers to process the conditional branch instruction rapidly, performs branch prediction and takes in the branch target instruction before fixing the branch condition related to the conditional branch instruction so as to pipeline-process the predicted instruction. For example, as one example of such a data processor, IBM System/370 Model 168-3 can be given (Umino, "Internal Design and Performance of IBM 3033 Processor, "Nikkei Electronics Books" Large general-Purpose Computer "Nikkei Macgrow-Hill, pp. 251–263, May 31, 1982).

As one example of the conventional data processor, an internal construction of the above-mentioned IBM System/370 Model 168-3 is shown in a block diagram of FIG. 3.

This conventional data processor comprises, a main memory mechanism 371 which stores instructions and operand data, a main memory control mechanism 372 which controls the main memory mechanism 371 and includes a cache and address converting mechanism and a TLB (Translation Lookaside Buffer), an instruction pre-processing mechanism 373 which performs necessary pre-processing for executing the instruction, such as decoding the instruction, generating the operand address and the like, and an executing mechanism 374 for executing the instructions. The instruction pre-processing mechanism 373 includes, two instruction buffers (IB1, IB2) 375, 376, two instruction address registers (IAR1, IAR2) 377, an instruction register 378, an instruction decoder 379, a decoded instruction register 380 and operand address registers (OAR1, OAR2) 381.

In the IBM System/370 Model 168-3 as the conventional data processor having such a configuration, the branch target instruction is fetched at branch instruction processing by utilizing two sets of instruction buffers 375, 376 and the instruction address register 377, and decoding of the predicted instruction is continued in accordance with the static branch prediction result by the instruction or a mask value (branch condition). There is also a data processor which comprises three sets of instruction buffers so as to prefetch the branch target instruction of the second conditional branch instruction to perform pipeline processing of the two conditional branch instruction efficiently, as an IBM System/370 Model 3033.

As stated above, in the conventional data processor, the conditional branch instruction is processed efficiently by providing a plural number of instruction queues.

As described above, a conventional data processor performing branch processing at an instruction decoding stage, calculates the branch target address after decoding the branch instruction. And hence, it is problematic in that, at least idle times of 2 clock cycles are produced till the branch target instruction is decoded after decoding the branch instruction. It is also problematic in that, the jump processing can not be performed at the instruction decoding stage as to the jump instruction whose jump target address is designated by an operand designator.

In the conventional data processor, though a plural number of instruction buffers are provided so as to process the conditional branch instruction efficiently, it is necessary to provide three instruction buffers so as to pipeline-process the two conditional branch instructions efficiently, thus an amount of hardwares is increased.

Furthermore, in the conventional data processor, in case of performing branch processing at the instruction decoding stage, though the performance is improved when the unconditional branch instruction is not processed at the executing stage, in case of including a step execution mode in which the instruction is executed for every one instruction so as to debug a program of when exception is detected in case of not satisfying the designated boundary condition by the jump target address, it does not operate properly when it is simply constituted such that the unconditional branch instruction is not processed at the executing stage.

SUMMARY OF THE INVENTION

The present invention having been devised to solve problems as stated above, it is, therefore, an object thereof to provide a high-function data processor capable of pipeline processing the jump instruction more efficiently by adding a small amount of hardwares.

It is another object of the present invention to provide a data processor which performs branch processing at an earlier stage of a pipeline by adding a small amount of hardwares.

It is a further object of the present invention to provide a data processor capable of processing not only the instruction whose jump target address is designated at a PC relative addressing mode, but also the jump instruction whose jump target address is designated by an operand designator rapidly.

It is still another object of the present invention to provide a data processor capable of pipeline processing two conditional branch instructions efficiently by adding a small amount of hardwares.

It is a further object of the present invention to provide a data processor capable of pipeline processing the unconditional branch instruction efficiently.

The data processor according to a first invention, comprising: a memory which stores instructions; an instruction fetch unit which fetches the instructions from the memory; an instruction decoding unit which decodes the instructions fetched by the instruction fetch unit; an instruction execution unit which executes the instructions on the basis of the instruction decoding result by the instruction decoding unit; a program counter which holds a head address of the instruction being decoded in the instruction decoding unit; and a branch target address calculation unit which includes; adding means for, assuming that, every time a new instruction is decoded, the instruction is the branch instruction, calculating all address by respectively inputting a value of the branch displacement field from the instruction fetch unit, and a head address of the instruction from the program counter, and executes addition of the two in parallel with decoding processing of the instruction by the instruction decoding unit; and transferring means for transferring the address calculated by the adding means to the instruction fetch unit.

The data processor according to a second invention comprising: a memory which stores instructions; an instruction fetch unit which fetches the instructions from the memory; an instruction decoding unit which decodes the instructions fetched by the instruction fetch unit; an instruction execution unit which executes the instructions on the basis of the instruction decoding result by the instruction decoding unit; a program counter which holds a head address of the instruction being decoded in the instruction decoding unit; and a branch target address calculation unit which includes; first adding means for, assuming that, every time a new instruction is decoded, the instruction is the first branch instruction, calculating a first address by respectively inputting a value of the first branch displacement field form the instruction fetch unit, and a head address of the instruction from the program counter, and executes addition of the two in parallel with decoding processing of the instruction by the instruction decoding unit; second adding means for, assuming that, every time a new instruction is decoded, the instruction is the second branch instruction, calculating a second address by respectively inputting a value of the second branch displacement field from the instruction fetch unit, and a head address of the instruction from the program counter, and executes addition of the two in parallel with decoding processing of the instruction by the instruction decoding unit; and transferring means for selectively transferring the addition results by the first adding means and the second adding means to the instruction fetch unit.

The data processor according to a third invention comprising: a memory which stores instructions; an instruction fetch unit which fetches the instructions from the memory; an instruction decoding unit which decodes the instructions fetched by the instruction fetch unit; an instruction execution unit which executes the instructions on the basis of the instruction decoding result by the instruction decoding unit; a program counter which holds a head address of the instruction being decoded in the instruction decoding unit; and a branch target address calculation unit which includes; adding means for, assuming that, every time a new instruction is decoded, the instruction is the first branch instruction, calculating a first address by respectively inputting a value of the first branch displacement field form the instruction fetch unit, and a head address of the instruction from the program counter and executes addition of the two in parallel with decoding processing of the instruction by the instruction decoding unit, or for, after decoding the second branch instruction, calculating a second address by respectively inputting a value of the second branch displacement field from the instruction decoding unit, and a head address of the second branch instruction from the program counter, and executes addition of the two; and transferring means for transferring the addition result by the adding means to the instruction fetch unit.

The data processor according to a fourth invention comprising: a memory which stores instructions; an instruction fetch unit which fetches the instructions from the memory; an instruction decoding unit which decodes the instructions fetched by the instruction fetch unit; an instruction execution unit which executes the instructions on the basis of the instruction decoding result by the instruction decoding unit; cut-out means which, assuming that, every time a new instruction is decoded, the instruction is the jump instruction, cuts out an absolute address field of the jump instruction fetched in the instruction fetch unit in parallel with decoding processing of the instruction by the instruction decoding unit,; and transferring means for transferring a value of the absolute address field cut out by the cut-out means to the instruction fetch unit.

The data processor according to a fifth invention comprising: a memory which stores instructions; an instruction fetch unit which fetches the instructions from the memory; an instruction decoding unit which decodes the instructions fetched by the instruction fetch unit; an instruction execution unit which executes the instructions on the basis of the instruction decoding result by the instruction decoding unit; a program counter which holds a head address of the instruction being decoded in the instruction decoding unit; a branch target address calculation unit which, assuming that, every time a new instruction is decoded, the instruction is the jump instruction for specifying the jump target address in the PC relative mode, calculates a first address by respectively inputting a value of the displacement field of the PC relative mode from the instruction fetch unit, and a lead address of the instruction from the program counter, and executes addition of the two in parallel with decoding of the instruction by the instruction decoding unit; cut-out means for, assuming that, every time a new instruction is decoded, the instruction is the jump instruction for specifying the jump target address in the absolute mode, obtaining a second address by cutting out the absolute address field of the absolute mode fetched by the instruction fetch unit, in parallel with decoding of the instruction by the instruction decoding unit; and transferring means for selectively transferring the first address calculated in the branch target address calculation unit, and the second address obtained by the cut-out means to the instruction fetch unit.

The data processor according to a sixth invention comprising: a memory which stores instructions; an instruction fetch unit which fetches the instructions from the memory; an instruction decoding unit which decodes the instructions fetched by the instruction fetch unit; an instruction execution unit which executes the instructions on the basis of the instruction decoding result by the instruction decoding unit; a program counter which holds a head address of the instruction decodes in the instruction decoding unit; and a branch target; address calculation unit which includes; adding means for, assuming that, every time a new instruction is decoded, the instruction is the branch instruction, calculating an address, by respectively inputting a value of the branch displacement field from the instruction fetch unit, a head address of the second instruction decoded immediately before the first instruction being decoded in the instruction decoding unit from the program counter, and code length of the second instruction from the instruction decoding unit, and executes addition of the three in parallel with the decoding processing of the first instruction by the instruction decoding unit; and transferring means for transferring the addition result by the adding means to the instruction fetch unit.

The data processor according to a seventh invention comprising: a memory which stores instructions; an instruction fetch unit which fetches the instructions from the memory; an instruction decoding unit which decodes the instructions fetched by the instruction fetch unit, divides one instruction into one or a plural number of unit processing codes, and processes one or a plural number of unit processing codes by one decoding processing; an instruction execution unit which executes the instructions on the basis of the instruction decoding result by the instruction decoding unit; a program counter which holds a head address of the unit processing code decoded by the instruction decoding unit; and a branch target address calculation unit which includes; adding means for, assuming that, every time a new instruction is decoded, the instruction is the branch instruction, calculating address by respectively inputting a value of the branch displacement field form the instruction fetch unit, a head address of a second unit processing code decoded immediately before a first unit processing code being decoded in the instruction decoding unit from the program counter, and a code length of the second unit processing code from the instruction decoding unit, and executes addition of the three in parallel with decoding the instruction by the instruction decoding unit; and transferring means for transferring the addition result by the adding means to the instruction fetch unit.

The data processor according to a eighth invention comprising: a memory which stores instructions; an instruction fetch unit which fetches the instructions from the memory; an instruction decoding unit which decodes the instructions fetched by the instruction fetch unit, divides one instruction into one or a plural number of unit processing codes and processes one or a plural number of unit processing codes by one decoding processing; an instruction execution unit which executes the instructions on the basis of the instruction decoding result by the instruction decoding unit; a program counter which holds a head address of the unit processing code decoded in the instruction decoding unit; and a branch target address calculation unit which includes; first adding means for, assuming that, every time a new instruction is decoded, the instruction is the first branch instruction, calculating first address by respectively inputting a value of the first branch displacement field from the instruction fetch unit, a head address of a second unit processing code decoded immediately before a first unit processing code being decoded in the instruction decoding unit from the program counter, and a code length of the second unit processing code from the instruction decoding unit, and executes addition of the three in parallel with decoding the instruction by the instruction decoding unit; second adding means for, assuming that, every time a new instruction is decoded, the instruction is the second branch instruction, calculating second address by respectively inputting a value of the second branch displacement field from the instruction fetch unit, a head address of the second unit processing code from the program counter, and a code length of the second unit processing code from the instruction decoding unit, and executes addition of the three in parallel with decoding of the instruction by the instruction decoding unit; and transferring means for selectively transferring the addition results by the first adding means and the second adding means to the instruction fetch unit.

The data processor according to a ninth invention comprising: a memory which stores instructions; an instruction fetch unit which fetches the instructions from the memory; an instruction decoding unit which decodes the instructions fetched by the instruction fetch unit, divides one instruction into one or a plural number of unit processing codes and processes one or a plural number of unit processing codes by one decoding processing; an instruction execution unit which executes the instructions on the basis of the instruction decoding result by the instruction decoding unit; a program counter which holds a head address of the unit processing code decoded in the instruction decoding unit; and a branch target address calculation unit which includes; adding means for, assuming that, every time a new instruction is decoded, the instruction is the first branch instruction, calculating a first address by respectively inputting a value of the first branch displacement field from the instruction fetch unit, a head address of a second unit processing code decoded immediately before a first unit processing code being decoded in the instruction decoding unit from the program counter, and a code length of the second unit processing code from the instruction decoding unit, and executes addition of the three in parallel with decoding of the instruction by the instruction decoding unit, or for calculating a second address by inputting, after decoding the second branch instruction, a value of the second displacement field from the instruction decoding unit and a lead address of the second branch instruction from the program counter, and executes three-value addition of the three and and zero; and transferring means for transferring the addition result by the adding means to the instruction fetch unit.

The data processor according to a tenth invention comprising: a memory which stores instructions; an instruction fetch unit which fetches the instructions from the memory; an instruction decoding unit which decodes the instructions fetched by the instruction fetch unit, divides one instruction into one or a plural number of unit processing codes and processes one or a plural number of unit processing codes by one decoding processing; an instruction execution unit which executes the instructions on the basis of the instruction decoding result by the instruction decoding unit; a program counter which holds a head address of the unit processing code decoded in the instruction decoding unit; a branch target address calculation unit which, assuming that, every time a new instruction is decoded, the instruction is the instruction for specifying the jump target address in the PC relative mode, calculates a first address by respectively inputting a value of the displacement field of the PC relative mode from the instruction fetch unit, a head address of a second unit processing code decoded immediately before a first unit processing code being decoded in the instruction decoding unit from the program counter, and a code length of the second unit processing code from the instruction decoding unit, and executes addition of the three in parallel with decoding of the instruction by the instruction decoding unit; cut-out means for, assuming that, every time a new instruction is decoded, the instruction is the jump instruction which specifies the jump target address in the absolute mode, obtaining a second address by cutting out the absolute address field of the absolute mode fetched in the instruction fetch unit, in parallel with decoding of the instruction by the instruction decoding unit; and transferring means for selectively transferring the first address calculated in the branch target address calculation unit, and the second address obtained by the cut-out means to the instruction fetch unit.

The data processor according to a eleventh invention comprising: a memory which stores instructions; an instruction fetch unit which fetches the instructions from the memory; an instruction decoding unit which decodes the instructions fetched by the instruction fetch unit; an instruction execution unit which executes the instructions on the basis of the instruction decoding result by the instruction decoding unit; and pre-branch means including, a branch target address generating unit having, relating to processing the conditional branch instruction, means for generating the branch target address and transferring means for transferring the branch target address to the instruction fetch unit, and means for, at processing the conditional branch instruction, instructing to fetch an instruction of branch target by transferring the branch target address generated in the branch target address generating unit before determining the branch condition in the instruction execution unit to the instruction fetch unit via the transferring means.

The data processor according to a twelfth invention comprising: a memory which stores instructions; an instruction fetch unit which fetches the instructions from the memory; an instruction decoding unit which decodes the instructions fetched by the instruction fetch unit; an instruction execution unit which executes the instructions on the basis of the instruction decoding result by the instruction decoding unit; and pre-branch means including, a branch target address generating unit having, relating to the branch instruction processing, means for generating the branch target address and transferring means for transferring the branch target address to the instruction fetch unit, and means for, before determining the branch condition in the instruction execution unit at processing the branch instruction, instructing to fetch an instruction of the branch target by transferring the branch target address generated in the branch target address generating unit to the instruction fetch unit via the transferring means.

The data processor according to a thirteenth invention comprising: a memory which stores instructions; an instruction fetch unit which fetches the instructions from the memory; an instruction decoding unit which decodes the instructions fetched by the instruction fetch unit; an instruction execution unit which executes the instructions on the basis of the instruction decoding result by the instruction decoding unit; and pre-jump means including, a jump target address generating unit having means for generating the jump target address relating to processing the jump instruction, and transferring means for transferring the jump target address to the instruction fetch unit, and means for, at jump instruction processing, instructing to fetch an instruction of the jump target by transferring the jump target address generated in the jump target address generating unit to the instruction fetch unit via the transferring means; and a mode register for, which can be set by the instruction or hardwares, specifying operation modes.

The data processor according to a fourteenth invention comprising: a memory which stores instructions; an instruction fetch unit which fetches the instructions from the memory; an instruction decoding unit which decodes the instructions fetched by the instruction fetch unit; an instruction execution unit which executes the instructions on the basis of the instruction decoding result by the instruction decoding unit; and pre-jump means including, a jump target address generating unit having means for generating the jump target address relating to processing the jump instruction, and transferring means for transferring the jump target address to the instruction fetch unit, judging means for judging the boundary condition of the jump target address, and means for, at processing the jump instruction, instruction to fetch an instruction of the jump target by transferring the jump target address generated in the jump target address generating unit to the instruction fetch unit via the transferring means.

The data processor in the first invention of the present invention is that, in parallel with decoding the instruction fetched from the instruction fetch unit by the instruction decoding unit, the branch target address calculation unit adds a value of a branch displacement field transferred from the instruction fetch unit, and a head address of the instruction transferred from the program counter, and when it becomes clear that the instruction being decoded in the instruction decoding unit is the branch instruction which specifies a branch displacement from the head address of the instruction in the branch displacement field transferred from the instruction fetch unit to the branch target address calculation unit, the branch target address calculation unit transfers the addition result to the instruction fetch unit to allow the instruction fetch unit to fetch an instruction of the address of the addition result, thereby the branch target instruction can be fetched immediately after decoding the instruction in processing the branch instruction.

The data processor in the second invention of the present invention is that, in parallel with decoding the instruction fetched from the instruction fetch unit by the instruction decoding unit, the branch target address calculation unit adds a value of a first branch displacement field transferred from the instruction fetch unit, and a head address of the instruction transferred from the program counter by first adding means, and in parallel with decoding the instruction fetched from the instruction fetch unit by the instruction decoding unit, adds a value of a second branch displacement field transferred from the instruction fetch unit and the head address of the instruction transferred from the program counter by second adding means, and when it becomes clear that the instruction being decoded in the instruction decoding unit is the first branch address which branches to an address obtained by adding the value of the first branch displacement field to the instruction head address, a first address calculated by the first adding means is transferred to the instruction fetch unit, which fetches an instruction of the first address, and when it becomes clear that the instruction being decoded in the instruction decoding unit is the second branch instruction which branches to an address obtained by adding the value of the second branch displacement field to the head address of the instruction, a second address calculated by the second adding means is transferred to the instruction fetch unit, which fetches an instruction of the second address, thereby the branch target instruction can be fetched immediately after decoding the instruction in processing the first and second branch instructions.

The data processor in the third invention of the present invention is that, in parallel with decoding the instruction fetched from the instruction fetch unit by the instruction decoding unit, the branch target address calculation unit adds a value of a first branch displacement field transferred from the instruction fetch unit, and a head address of the instruction transferred from the program counter so as to calculate the first address, and when it becomes clear that the instruction being decoded in the instruction decoding unit is the first branch instruction which branches to an address obtained by adding the value of the first branch displacement field to the head address of the instruction, the branch target address calculation unit transfers the first address to the instruction fetch unit to allow the instruction fetch unit to fetch an instruction of the first address, and when it becomes clear that the instruction being decoded in the instruction decoding unit is the second branch instruction which branches to the address obtained by adding the value of the second branch displacement field to the head address of the instruction, the instruction decoding unit outputs the second branch displacement field to the branch target address calculation unit to allow the branch target address calculation unit to add the value of the second branch displacement field transferred from the instruction decoding unit and the head address of the instruction transferred from the program counter after calculating the first address so as to calculate the second address, and further, by transferring the second address to the instruction fetch unit to allow the instruction fetch unit to fetch an instruction of the second address, the branch target instruction can be fetched immediately after decoding the instruction in processing the first branch instruction, and also in processing the second branch instruction, the branch target instruction can be fetched by calculating the branch target address using the same adding means after decoding the instruction.

The data processor in the fourth invention of the present invention is that, in parallel with decoding the instruction fetched from the instruction fetch unit by the instruction decoding unit, cut-out means cuts out an absolute address field, and when it becomes clear that the instruction being decoded in the instruction decoding unit is the jump instruction which specifies jump target address in the absolute address field cut out by the cut-out means, transferring means transfers the jump target address cut out by the cut-out means to the instruction fetch unit to allow the instruction fetch unit to fetch an instruction of the jump target address, thereby in processing the jump instruction which specifies a jump target in the absolute address, the jump target instruction can be fetched immediately after decoding the instruction.

The data processor in the fifth invention of the present invention is that, in parallel with decoding the instruction fetched from the instruction fetch unit by the instruction decoding unit, the branch target address calculation unit adds a value of a displacement field of a PC relative mode transferred from the instruction fetch unit, and a head address of the instruction transferred from the program counter, and in parallel with decoding the instruction fetched from the instruction fetch unit by the instruction decoding unit, cut-out means cuts out an absolute address field, and when it becomes clear that the instruction being decoded in the instruction decoding unit is the jump instruction in which jump target address is specified in the PC relative mode, the first address calculated in the branch target address calculation unit is transferred to the instruction fetch unit to allow the instruction fetch unit to fetch an instruction of the first address, and when it becomes clear that the instruction being decoded in the instruction decoding unit is the jump instruction in which the jump target address is specified in the absolute mode, the second address cut out by the cut-out means is transferred to the instruction fetch unit to allow the instruction fetch unit to fetch an instruction of the second address, thereby in processing the jump instruction which specifies the jump target address in the PC relative mode or the absolute mode, the jump target instruction can be fetched immediately after decoding the instruction.

The data processor in the sixth invention of the present invention is that, in parallel with decoding the instruction fetched from the instruction fetch unit by the instruction decoding unit, the branch target address calculation unit adds a value of a branch displacement field transferred from the instruction fetch unit, a head address value of the second instruction decoded immediately before the first instruction transferred from the program counter and being decoded in the instruction decoding unit, and a code length of the second instruction transferred from the instruction decoding unit, and when it becomes clear that the second instruction is the branch instruction which specifies a branch displacement from the head address of the instruction in the branch displacement field transferred from the instruction fetch unit to the branch target address calculation unit, which transfers the addition result to the instruction fetch unit to allow the instruction fetch unit to fetch an instruction of the address of the addition result, thereby in processing the branch instruction, the branch target instruction can be fetched immediately after decoding the instruction.

The data processor in the seventh invention of the present invention is that, in parallel with decoding the instruction fetched from the instruction fetch unit by the instruction decoding unit, the branch target address calculation unit adds a value of a branch displacement field transferred from the instruction fetch unit, a head address of a second unit processing code decoded immediately before a first unit processing code transferred from the program counter and being decoded in the instruction decoding unit, and a code length of the second unit processing code transferred from the instruction decoding unit, and when it becomes clear that the instruction including the first unit processing code is the branch instruction which specifies the branch displacement from the head address of the invention in the branch displacement field transferred from the instruction fetch unit to the branch target address calculation unit, which transfers the addition result to the instruction fetch unit to allow the instruction fetch unit to fetch an instruction of the address of the addition result, thereby in processing the branch instruction, the branch target instruction can be fetched immediately after decoding the instruction.

The data processor in the eighth invention of the present invention is that, in parallel with decoding the instruction fetched from the instruction fetch unit by the instruction decoding unit, the branch target address calculation unit adds a value of the first branch displacement field transferred from the instruction fetch unit, a head address of a second unit processing code decoded immediately before the first unit processing code transferred from the program counter and being decoded in the instruction decoding unit, and a code length of the second unit processing code transferred from the instruction decoding unit by first adding means, and in parallel with decoding the instruction fetched from the instruction fetch unit by the instruction decoding unit, a value of the second branch displacement field transferred from the instruction fetch unit, a head address of the second unit processing code transferred from the program counter and a code length of the second unit processing code transferred from the instruction decoding unit are added by second adding means, and when it becomes clear that the instruction including the first unit processing code is the first branch instruction which branches to an address obtained by adding the value of the first branch target field to a head address of the instruction, the first address calculated by the first adding means is transferred to the instruction fetch unit, which fetches an instruction of the first address, and when it becomes clear that the instruction including the first unit processing code is the second branch instruction which branches to an address obtained by adding the value of second branch displacement field to the head address of the instruction, the second address calculated by the second adding means is transferred to the instruction fetch unit, which fetches an instruction of the second address, thereby in processing the first and second branch instructions, the branch target instruction can be fetched immediately after decoding the instruction.

The data processor in the ninth invention of the present invention is that, in parallel with decoding the instruction fetched from the instruction fetch unit by the instruction decoding unit, the branch target address calculation unit adds a value of the first branch displacement field transferred from the instruction fetch unit, a head address of the second unit processing code decoded immediately before the first unit processing code transferred from the program counter and being decoded in the instruction decoding unit, and a code length of the second unit processing code transferred from the instruction decoding unit so as to calculate the first address, and when it becomes clear that the instruction including the first unit processing code is the first branch instruction which branches to an address obtained by adding a value of the first branch displacement field to the head address of the instruction, the branch target address calculation unit transfers the first address to the instruction fetch unit to allow the instruction fetch unit to fetch an instruction of the first address, and when it becomes clear that the instruction including the first unit processing code is the second branch instruction which branches to an address obtained by adding a value of the second branch displacement field to the head address of the instruction, the instruction decoding unit outputs the value of the second branch target field to the branch target address calculation unit to allow the branch target address calculation unit to calculate the second address, after calculating the first address, by adding the value of the second branch displacement field transferred from the instruction decoding unit, a head address of the instruction including the first unit processing code transferred from the program counter and zero, and further, by transferring the second address to the instruction fetch unit and allowing the instruction fetch unit to fetch an instruction of the second address, in processing the first branch instruction the branch target instruction can be fetched immediately after decoding the instruction, and also for the second branch instruction, the branch target instruction can be fetched by using the same adding means and calculating the branch target address after decoding the instruction.

The data processor in the tenth invention of the present invention is that, in parallel with decoding the instruction fetched from the instruction fetch unit by the instruction decoding unit, the branch target address calculation unit adds a value of displacement field of the PC relative mode transferred from the instruction fetch unit, a head address of the second unit processing code decoded immediately before the first unit processing code transferred from the program counter and being decoded in the instruction decoding unit, and a code length of the second unit processing code transferred from the instruction decoding unit, and cut-out means cuts out an absolute address field, and when it becomes clear that the instruction including the first unit processing code is the jump instruction in which the jump target address is specified in the PC relative mode, the first address calculated in the branch target address calculation unit is transferred to the instruction fetch unit to allow the instruction fetch unit to fetch an instruction of the first address, and when it becomes clear that the instruction including the first unit processing code is the jump instruction in which the jump target address is specified in the absolute mode, the second address cut out by the cut-out means is transferred to the instruction fetch unit to allow the instruction fetch unit to fetch an instruction of the second address, thereby in processing the jump instruction which specifies the jump target address in the PC relative mode or the absolute mode, the jump target instruction can be fetched immediately after decoding the instruction.

The data processor in the eleventh invention of the present invention is that, the instruction in a first instruction pre-fetch queue is outputted to the instruction decoding unit by output means, and when the first conditional branch instruction is included in an instruction train fetched into the first instruction pre-fetch queue, a branch target, address is generated by the branch target address generating unit at processing the first conditional branch instruction, pre-branch means transfers a first branch target address generated in the branch target address generating unit to the instruction fetch unit and indicates to fetch the instruction of the first branch target address, the instruction fetch unit stores the first branch target address in a second address register and allows a second instruction pre-fetch queue to fetch the branch target instruction, allows the output means to output the instruction fetched in either the first or second instruction pre-fetch queue to the instruction decoding unit, and when a second conditional branch instruction is included in an instruction train to be outputted to the instruction decoding unit before determining the branch condition of the first conditional branch instruction, the pre-branch means, at processing the second conditional branch instruction, transfers a second branch target address generated in the branch target address generating unit to the instruction fetch unit, and instructs to fetch an instruction of the second branch target address, the instruction fetch unit saves the second branch target address temporarily in a branch target address saving latch, when the branch condition for the first branch instruction is determined and the first branch instruction branches and the second conditional branch instruction is the instruction which is sequential to the instruction of the first branch target address, the first instruction prefetch queue is voided and the second branch target address saved in the branch target address saving latch is transferred to the first address register, the instruction of the second branch target address is fetched in the first instruction pre-fetch queue, and when the first branch instruction does not branch and the second conditional branch instruction is the instruction which is sequential to the first conditional branch instruction, the second instruction pre-fetch queue is voided and the second branch target address saved in the branch target address saving latch is transferred to the second address register, and the instruction of the second branch target address is fetched in the second instruction pre-fetch queue, thereby the two conditional branch instructions can be pipeline-processed by the two instruction queues.

The data processor in the twelfth invention of the present invention is that, the instruction in the first instruction pre-fetch queue is outputted to the instruction decoding unit by output means, and when the conditional branch instruction is included in an instruction train fetched in the first instruction pre-fetch queue, the pre-branch means generates a branch target address in the branch target address generating unit at processing the conditional branch instruction, transfers the generated first branch target address to the instruction fetch unit and instructs to fetch an instruction of the branch target, the instruction fetch unit stores the first branch target address in the second address register, and allows a second instruction pre-fetch queue to fetch the instruction train starting from the first branch target address, the instruction fetched in either the first or second instruction pre-fetch queues is outputted to the instruction decoding unit by the output means, and when the instruction in the first instruction pre-fetch queue is outputted to the instruction decoding unit by the output means and the unconditional branch instruction is included in the instruction train fetched in the first instruction pre-fetch queue, the pre-branch means generates the branch target address in the branch target address generating unit at processing the unconditional branch instruction, so as to transfer a generated second branch target address to the instruction fetch unit and instructs to fetch an instruction of the branch target, the instruction fetch unit stores the second branch target address in a first address register, fetches the instruction train starting from the second branch target address into the first instruction pre-fetch queue, and outputs the instruction fetched in the first instruction pre-fetch queue to the instruction decoding unit by the output means, thereby also for the unconditional branch instruction immediately after the conditional branch instruction, the branch target instruction can be fetched by the two instruction pre-fetch queues.

The data processor in the thirteenth invention of the present invention is that, at processing of the unconditional jump instruction, pre-jump means generates a jump target address in a jump target address generating unit and transfers the jump target address to the instruction fetch unit, which fetches an instruction of the jump target, and when a mode register shows a first mode, the unconditional jump instruction is processed in the instruction executing unit, and when the mode register shows a second mode, the unconditional jump instruction is not processed in the instruction executing unit, thus the unconditional jump instruction can be processed efficiently and properly responsive to the operation modes.

The data processor in the fourteenth invention of the present invention is that, at processing of the unconditional jump instruction, the pre-jump means generates a jump target address in a jump target address generating unit and transfers the jump target address to the instruction fetch unit, which fetches an instruction of the jump target, and when exception is detected by judging means, the unconditional jump instruction is processed in the instruction executing unit, and when exception is not detected by the judging means, the unconditional jump instruction is not processed in the instruction executing unit, thus the unconditional jump instruction can be processed efficiently and properly even when detecting the exception.

The above and further objects and features of the invention will more fully be apparent from the following detailed description with accompanying drawings.

BRIEF DESCRIPTION OF THE DRAWINGS

FIG. 10 is a schematic diagram of an instruction format according to an example of one embodiment of a data processor of the present invention, FIG. 11 is a schematic diagram of an instruction format according to an example of one embodiment of a data processor of the present invention, FIG. 16 is a schematic diagram showing a format of an addressing mode according to an example of one embodiment of a data processor of the present invention, FIG. 17 is a schematic diagram showing a format of an addressing mode according to an example of one embodiment of a data processor of the present invention, FIG. 18 is a schematic diagram showing a format of an addressing mode according to an example of one embodiment of a data processor of the present invention, FIG. 19 is a schematic diagram showing a format of an addressing mode according to an example of one embodiment of a data processor of the present invention, FIG. 20 is a schematic diagram showing a format of an addressing mode according to an example of one embodiment of a data processor of the present invention, FIG. 21 is a schematic diagram showing a format of an addressing mode according to an example of one embodiment of a data processor of the present invention, FIG. 22 is a schematic diagram showing a format of an addressing mode according to an example of one embodiment of a data processor of the present invention, FIG. 23 is a schematic diagram showing a format of an addressing mode according to an example of one embodiment of a data processor of the present invention, FIG. 28 is a schematic diagram showing bit pattern of BRA instruction according to an example of one embodiment of a data processor of the present invention, FIG. 30 is a schematic diagram showing bit pattern of Bcc instruction according to an example of one embodiment of a data processor of the present invention, FIG. 36 is a schematic diagram showing bit pattern of ACB instruction according to an example of one embodiment of a data processor of the present invention, FIG. 38 is a schematic diagram showing bit pattern of ACB instruction according to an example of one embodiment of a data processor of the present invention, FIG. 39 is a schematic diagram showing bit pattern of ACB instruction according to an example of one embodiment of a data processor of the present invention, FIG. 41 is a schematic diagram showing bit pattern of SCB instruction according to an example of one embodiment of a data processor of the present invention, FIG. 44 is a schematic diagram showing bit pattern of FBcc instruction according to an example of one embodiment of a data processor of the present invention, FIGS. 45(a), 45(b), 45(c), 45(d), 45(e) and 45(f) are schematic diagrams showing a configuration of PSW and debug related control register according to an example of one embodiment of a data processor of the present invention, FIG. 59 is a schematic diagram showing branch displacement positions on II bus at processing of JMP and JSR instructions based upon an example of one embodiment of a data processor of the present invention, FIG. 62 is a schematic diagram showing branch displacement positions on II bus at processing of ACB and SCB instructions based upon an example of one embodiment of a data processor of the present invention, FIG. 64 is a schematic diagram showing branch displacement positions on II bus at processing of FBcc instruction based upon an example of one embodiment of a data processor of the present invention.

DESCRIPTION OF THE PREFERRED EMBODIMENTS

In the following, the present invention will be particularly described with reference to the drawings showing its embodiments.

Embodiment 1

"Configuration of a System using a Data Processor of the Present Invention"

Figure 1:
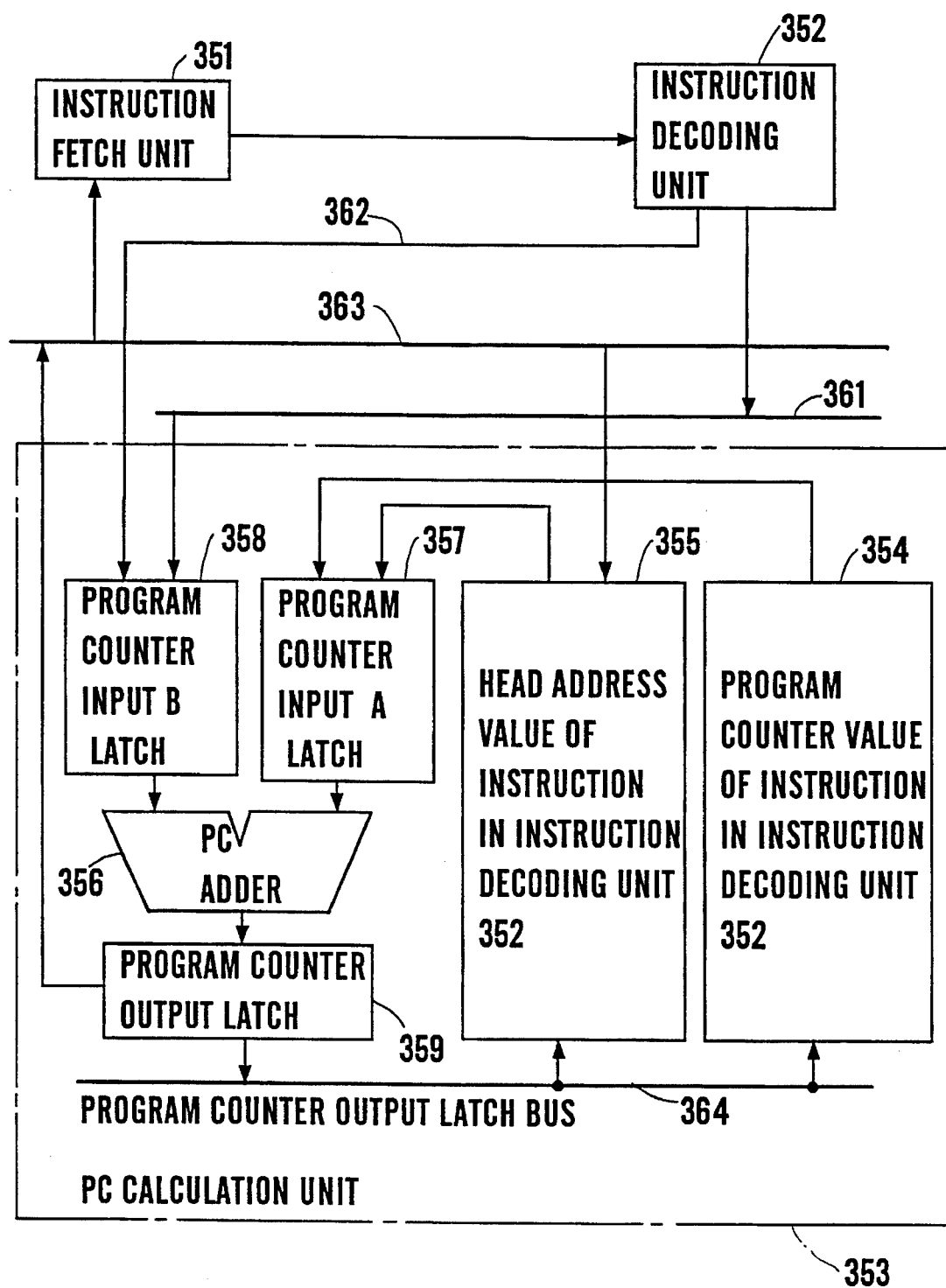
FIG. 1 is a block diagram showing a configuration of a jump instruction processing mechanism of a conventional data processor which calculates a branch target address at the instruction decoding stage so as to perform jump processing.
Figure 2:
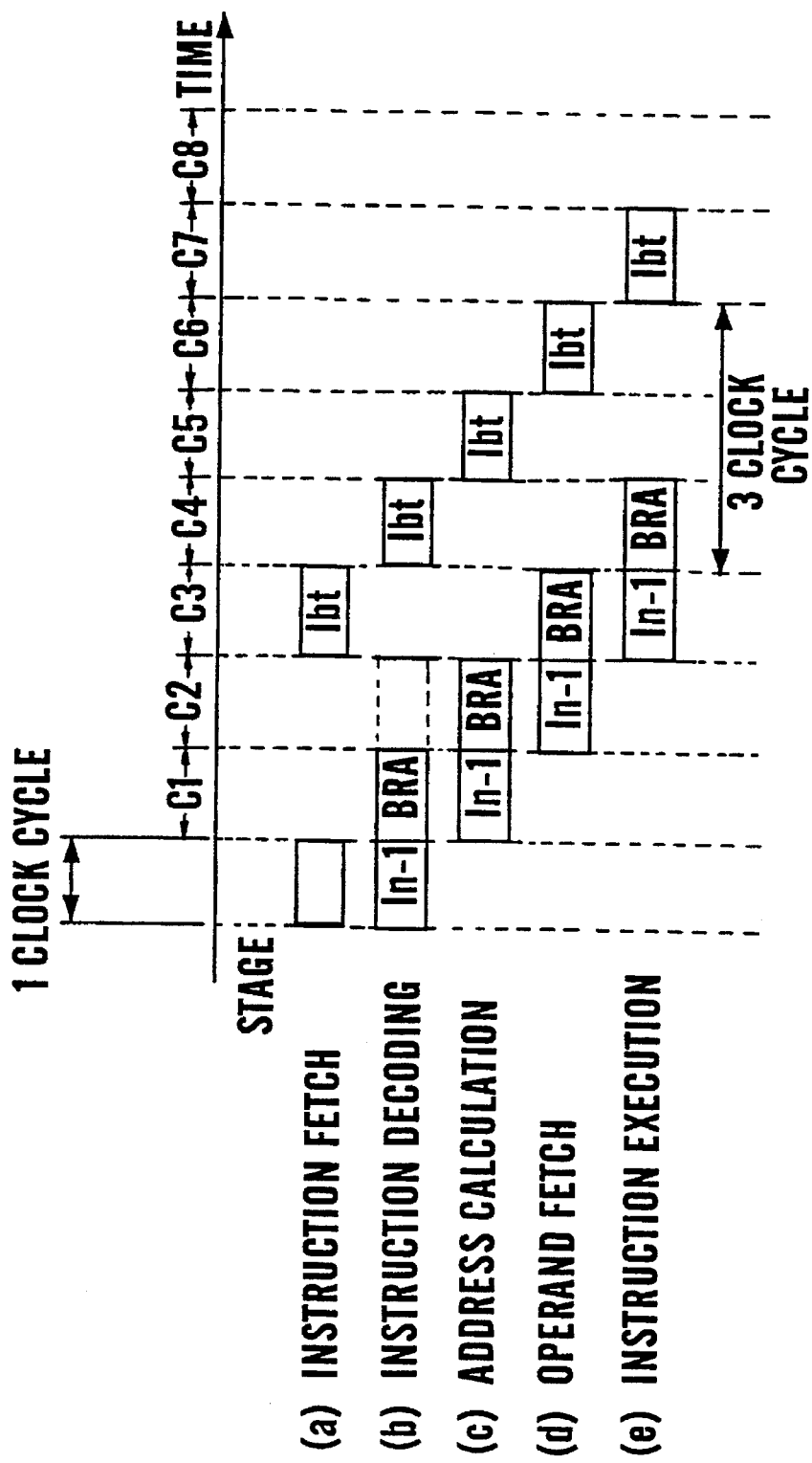
FIG. 2 is a timing chart of a conventional data processor at unconditional branch instruction (BRA instruction) processing.
Figure 3:
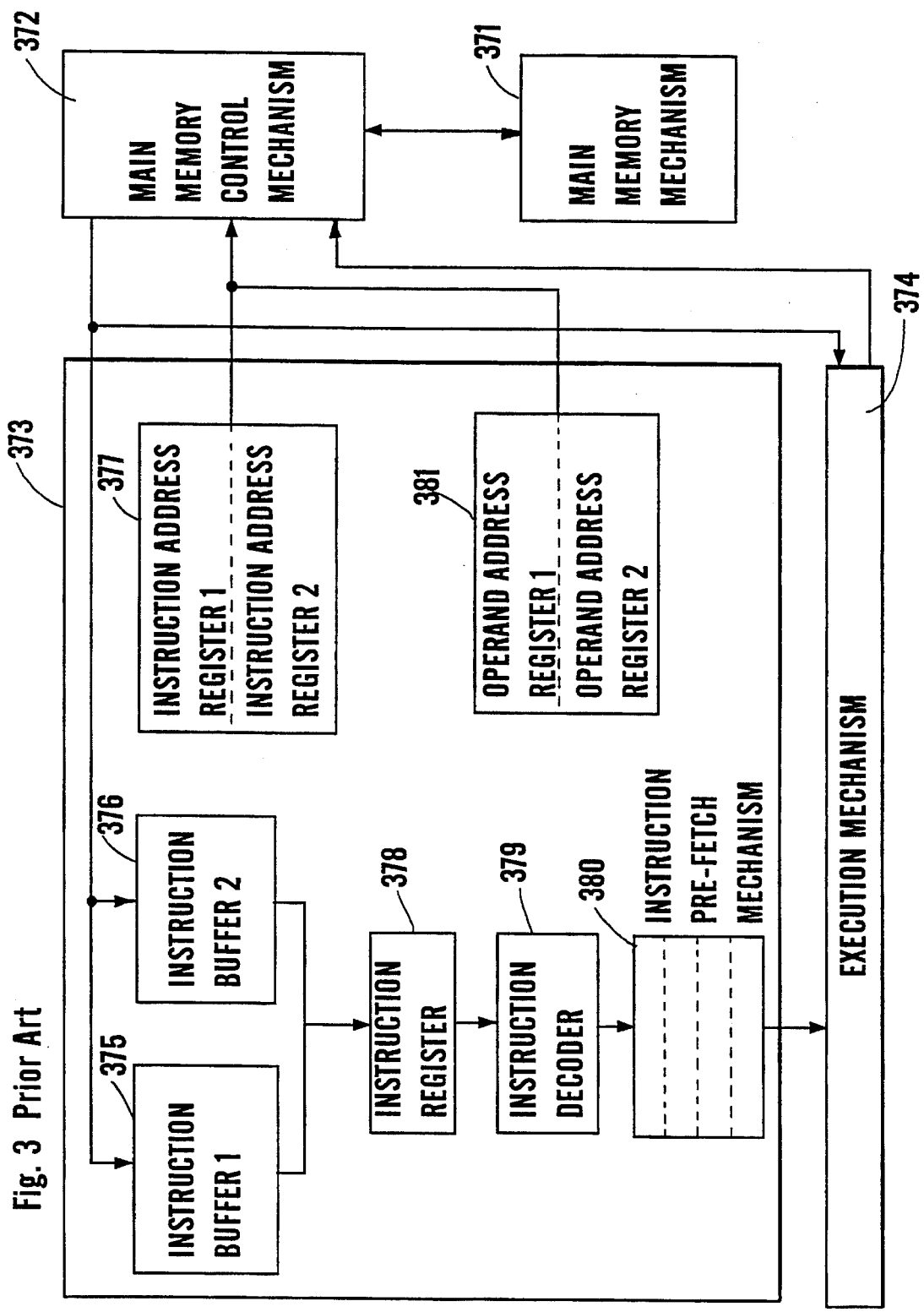
FIG. 3 is a block diagram showing an internal configuration of IBM system/370 Model 168-3 as an example of a conventional data processor.
Figure 4:
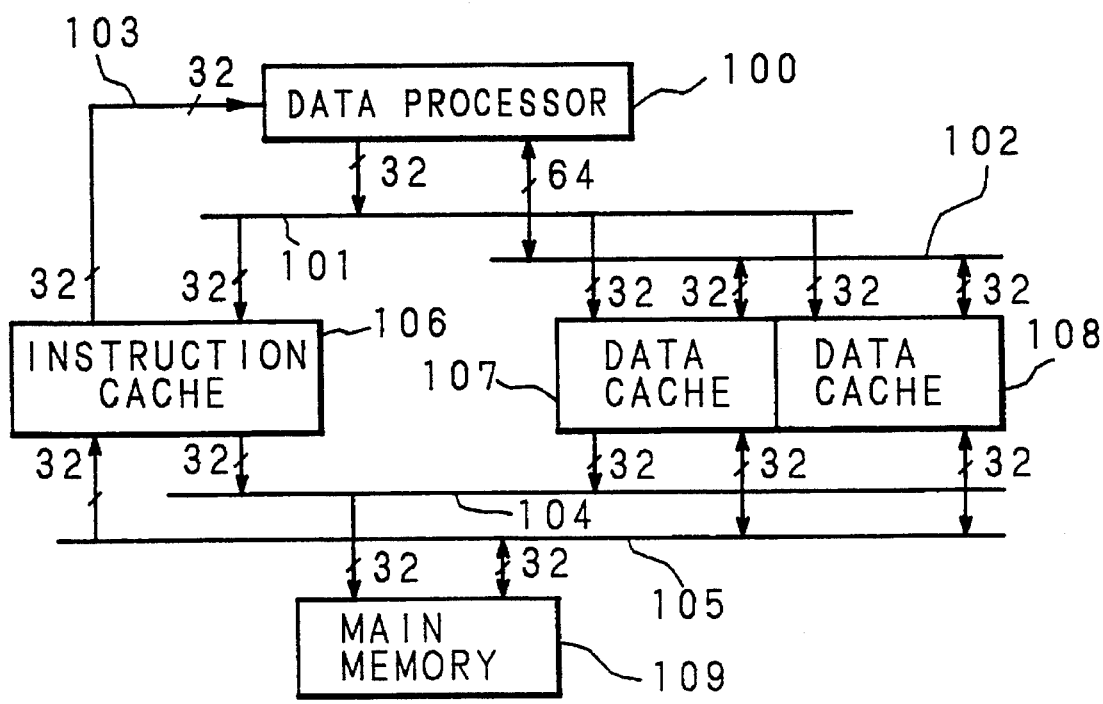
FIG. 4 is a block diagram showing a configuration example of a system using an embodiment example of a data processor of the present invention.

FIG. 4 is a block diagram showing an example of a configuration of a system using a data processor 100 of the present invention.

In this embodiment, a data processor 100 of the present invention, an instruction cache 106, data caches 107 and 108, and a main memory 109 are connected by an address bus 101, a data bus 102, an instruction bus 103, a memory address bus 104, and a memory data bus 105.

The address bus 101 inputs the address outputted from the data processor 100 of the present invention into the instruction cache 106 and the data caches 107, 108. The instruction bus 103 transfers the instruction code outputted from the instruction cache 106 to the data processor 100 of the present invention. The data bus 102 transfers data outputted from the data processor 100 of the present invention to the data caches 107, 108, or data outputted from the data caches 107, 108 to the data processor 100 of the present invention. The memory address bus 104 transfers the address outputted from the instruction cache 106 or the data caches 107, 108 to the main memory 109. The memory data bus 105 transfers the instruction or data between the main memory 109 and the instruction cache 106 or the data caches 107, 108.

When the instruction cache 106 or the data caches 107, 108 misses, the caches 106, 107 or 108 arbitrate the memory address bus 104 and the memory data bus 105 so as to access the main memory 109.

In the data caches 107, 108, on the side of the data processor 100 of the present invention, two data caches 107, 108 are operated in cooperation with each other for they associate with a 64-bit bus. For each of the 64-bit data, the data cache 107 treats the high-order 32-bit data and the data cache 108 treats the low-order 32-bit data.

In the following, first, instruction system and a processing mechanism of the data processor 100 of the present invention will be explained, and next, processing method of jump instruction will be explained.

(2) "Allocation of Instruction Bits of a Data Processor of the Present Invention"

(2.1) "Instruction Format"

An instruction of a data processor of the present invention is formed on a 16-bit unit basis, being variable in length. No instruction with an odd number of bytes is used herein.

The data processor of the present invention has an instruction format specifically devised for the purpose of highly frequent instructions in a short format. For example, as to a two-operand instruction, two formats are provided; a general format which has basically a configuration of "four bytes+ extension part(s)" and allows the utilization of all addressing modes and a short format allowing only the use of a highly frequent instruction and an addressing mode.

The meanings of symbols appearing in the instruction format of the data processor of the present invention shown in FIG. 5 to FIG. 13 are as follows:

—: Field for operation code

: Field in which literal or immediate enters

Ea: Field for specifying an operand in a general type 8-bit addressing mode

Sh: Field for specifying an operand in a short type 6-bit addressing mode

Rn: Field for specifying an operand on a register file by the register number

*: Field in which anything may enter

Figure 5:
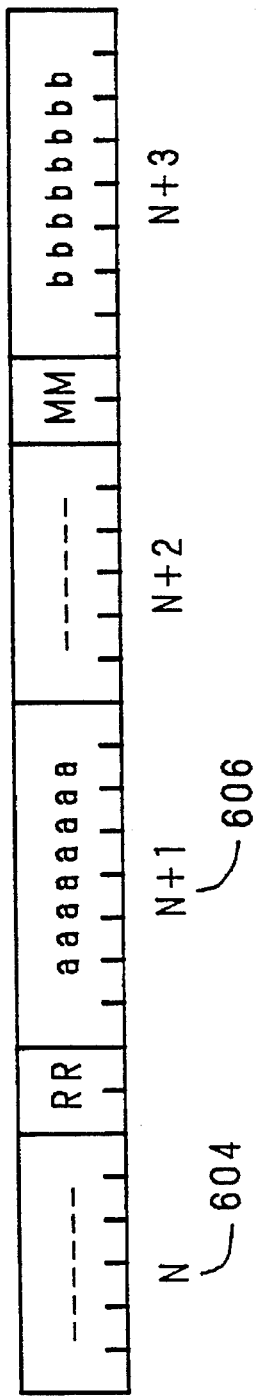
FIG. 5 is a schematic diagram of an instruction format according to an example of one embodiment of a data processor of the present invention.

In the format, as shown in FIG. 5, the right side 602 is the LSB side and is higher address. The instruction format can be discriminated only after an address N 604 and an address N+1 606 are checked. This is because of a premise that the instruction is fetched and decoded on a 16-bit (half word) unit basis without fail.

In the data processor of the present invention, in the case with any format, the extension part of Ea or Sh of each operand is sure to be positioned immediately after 16 bits (half word) comprising the basic part of that Ea or Sh. This takes precedence over the immediate data specified implicitly by the instruction or the extension part of the instruction. Accordingly, as to an instruction of four or more bytes, there are cases where the operation code of the instruction is divided by the extension part of Ea.

Also, as described later, in the case where another extension part is further appended to the extension part of Ea at a chained addressing mode, this part takes precedence over the next operation field. For example, consideration is made on the case of 6-byte instruction which comprises Ea1 in a first half word, Ea2 in a second half word, and ends with a third half word. In this case, the chained addressing mode is used for Ea1, the extension part of the chained addressing mode is also appended besides the general extension part. In this case, the actual instruction bit pattern is composed in the sequence of the first half word of instruction (including the basic part of Ea1), the extension part of the chained addressing mode of Ea1, the second half word of instruction (including the basic part of Ea2), the extension part of Ea2 and the third half word of instruction.

(2.1.1) "Short-Format Two-Operand Instruction"

FIG. 6 to FIG. 9 are schematic diagrams showing short format of the two-operand instruction.

Figure 6:
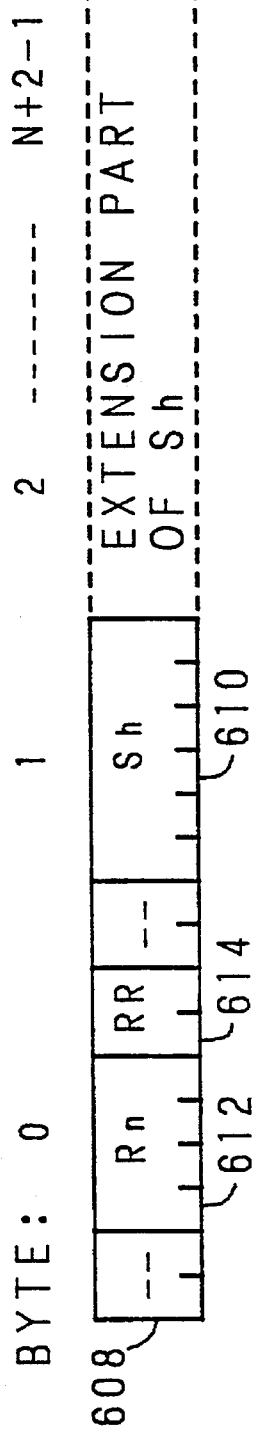
FIG. 6 is a schematic diagram of an instruction format according to an example of one embodiment of a data processor of the present invention.

FIG. 6 is a schematic diagram showing a format 608 of instruction of operation between memory and register. This format includes an L-format wherein the source operand side is memory and an S-format wherein the destination operand side is memory.

In the L-format, symbol Sh 610 represents the specifying field of the source operand, symbol Rn 612 represents the specifying field of the register of the destination operand and RR 614 represents specifying of the operand size of Sh 610, respectively. The size of the destination operand located in the register is fixed to 32 bits. In the case where the size of the register side differs from that of the memory side and the size of the source side is smaller, sign extension is performed. And, in some instructions (addition instruction, subtraction instruction), the operand size of the source is fixed to a word. In this case, the RR field is the operation code.

In the S-format, symbol Sh 610 represents the specifying field of the destination operand, symbol Rn 612 represents the register specifying field of the source operand and RR 614 represents specifying field of the operand size of Sh 610, respectively. The size of the source operand located in the register is fixed to 32 bits. In the case where the size of the register side differs from that of the memory side and the size of time source side is larger, truncating of the overflow portion and overflow check are performed.

Figure 7:
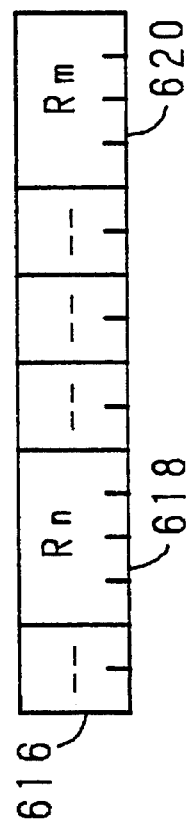
FIG. 7 is a schematic diagram of an instruction format according to an example of one embodiment of a data processor of the present invention.

FIG. 7 is a schematic diagram showing a format (R-format) 616 of instruction of operation between register and register. In this format, symbol Rn 618 represents the specifying field of the destination register and symbol Rm 620 represents the specifying register of the source register. The operand size is limited to only 32 bits.

Figure 8:
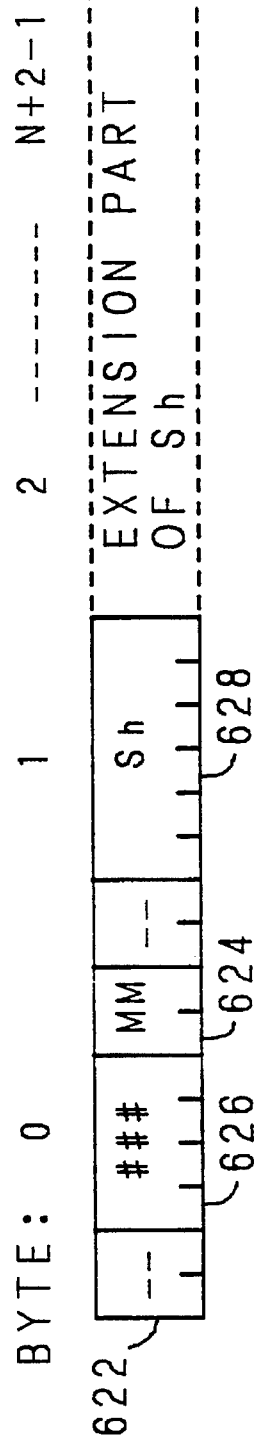
FIG. 8 is a schematic diagram of an instruction format according to an example of one embodiment of a data processor of the present invention.

FIG. 8 is a schematic diagram showing a format (Q-format) 622 of instruction of operation between literal and memory. In this format, symbol MM 624 represents the specifying field of the destination operand size, symbol ### 626 represents the specifying field of the source operand and symbol Sh 628 represents the specifying register of the destination operand.

Figure 9:
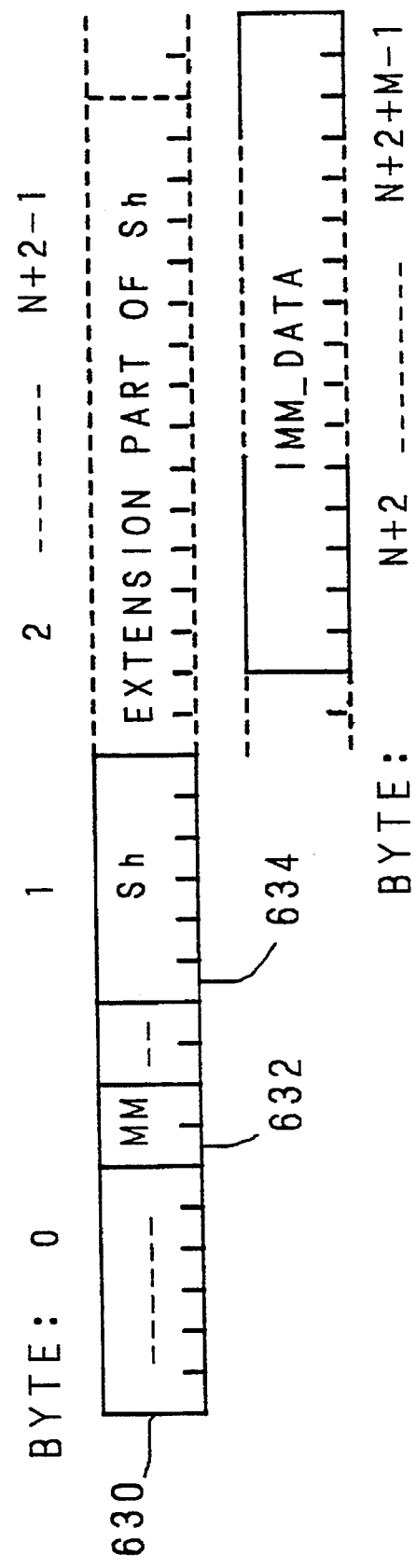
FIG. 9 is a schematic diagram of an instruction format according to an example of one embodiment of a data processor of the present invention.

FIG. 9 is a schematic diagram showing a format (I-format) 630 of instruction of operation between immediate and memory. In this format, symbol MM 632 represents the specifying field of the operand size (common in source and destination), and symbol Sh 634 represents the specifying field of the destination operand. The I-format immediate size is common with the operand size on the destination side and is 8, 16 and 32 bits, and zero extension and sign extension are not performed.

(2.1.2) "General-Format One-Operand Instruction"

FIG. 10 is a schematic diagram showing a general format 636 of one-operand instruction (G1-format). In this format, symbol MM 638 represents the specifying field of the operand size. Some of the G1-format instructions comprise an extension part besides the extension part of Ea 640. There are also instructions using no MM 638.

(2.1.3) "General-Format Two-Operand Instruction"

Figure 12:
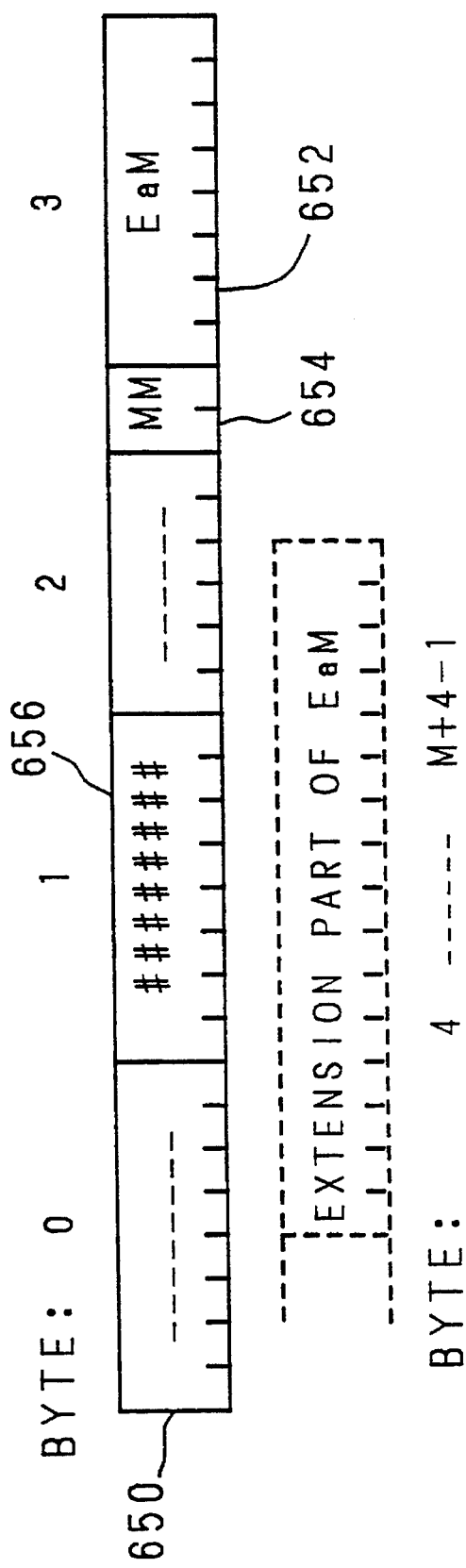
FIG. 12 is a schematic diagram of an instruction format according to an example of one embodiment of a data processor of the present invention.
Figure 13:
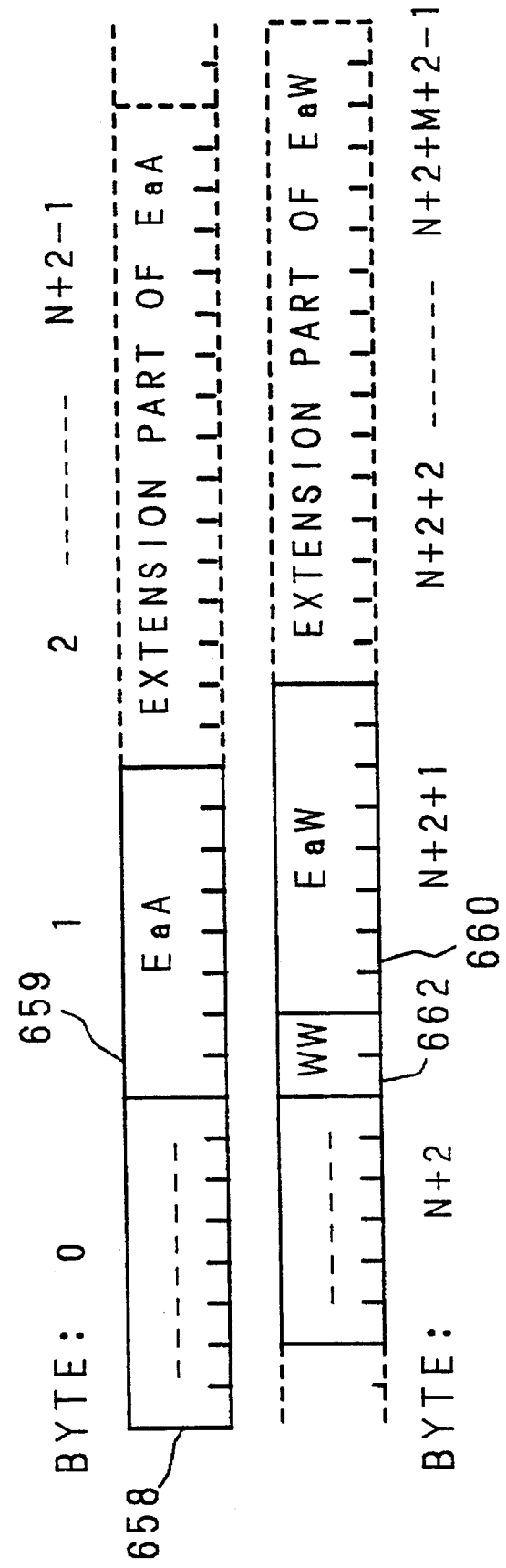
FIG. 13 is a schematic diagram of an instruction format according to an example of one embodiment of a data processor of the present invention.

FIG. 11 to FIG. 13 are schematic diagrams showing general format of two-operand instruction.

This format comprises an instruction having a maximum of two operands of the general-type addressing mode which are specified by eight bits. There are cases where the total number of operands becomes three or more.

FIG. 11 is a schematic diagram showing a format (G-format) 642 of instruction in which the first operand needs reading of memory. In this format, symbol EaM 644 represents the specifying field of the destination operand, symbol MM 646 represents the specifying field of the destination operand size, EaR 648 represents the specifying field of the source operand, and RR 649 represents the specifying field of the source operand size. In addition, some of the G-format instructions comprise an extension part besides the extension part of EaM 644 and EaR 648.

FIG. 12 is a schematic diagram showing a format (E-format) 650 of instruction whose first operand is 8-bit immediate. In this format, symbol EaM 652 represents the specifying field of the destination operand, symbol MM 656 represents the specifying field of the destination operand size, and the symbol ####. . . 656 represents the source operand.

FIG. 13 is a schematic diagram showing a format (GA-format) 658 of instruction whose first operand is only address calculation. In this format, symbol EaW 660 represents the specifying field of the destination operand, symbol WW 662 represents the specifying field of the destination operand size, and symbol EaA 659 represents the specifying field of the source operand. In addition, as the source operand, the calculation result itself of the effective address is used.

(2.1.4) "The Other Instruction"

Besides the instruction aforementioned, there is such instruction as specifies irregular operand, or instruction with only operation code and with no operand specification.

(2.2) "Addressing Mode"

The methods of specifying the addressing mode of the data processor 100 of the present invention include the short type specified by six bits including the register and the general type specified by eight bits.

In the case where an undefined addressing mode has been specified, or where a combination of addressing modes obviously unsuitable has been specified, a reserved instruction exception is generated, likewise, the case where the undefined instruction has been executed, and exception processing is started. Examples of these cases are the case where the destination is the immediate mode and the case where the immediate mode is used in the specifying field of the addressing mode to be accompanied by address calculation.

Meanings of symbols used in the format diagram shown in FIG. 14 to FIG. 24 is as follows:

Rn: Register specifying field (Sh): Specifying method by the short-type addressing mode of six bits (Ea): Specifying method by the general-type addressing mode of eight bits In the format diagram, the portion surrounded by a broken line shows the extension part.

(2.2.1) "Basic Addressing Modes"

The data processor of the present invention supports various addressing modes. Among them, the basic addressing modes supported by the data processor 100 of the present invention include a register direct mode, a register indirect mode, a register relative indirect mode, an immediate mode, an absolute mode, a Program Counter (PC) relative indirect mode, a stack pop mode and a stack push mode.

Figure 14:
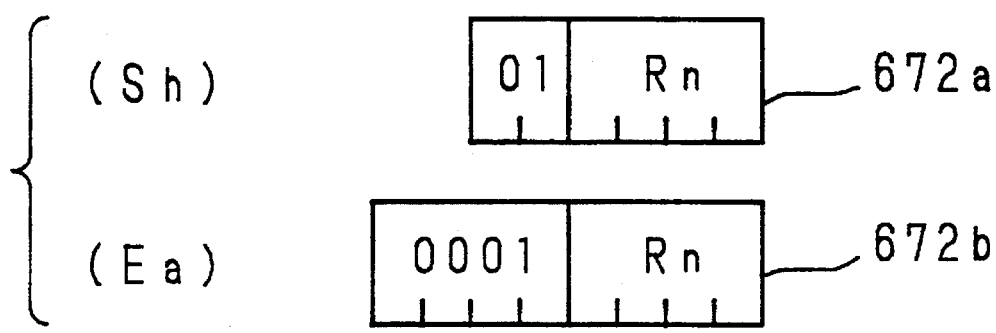
FIG. 14 is a schematic diagram showing a format of an addressing mode according to an example of one embodiment of a data processor of the present invention.

The register direct mode is an addressing mode which takes the content of a register intact as an operand. FIG. 14 is a schematic diagram of the format thereof. Each symbol Rn 672a, 672b shows the number of the general-purpose register or the FPU register.

Figure 15:
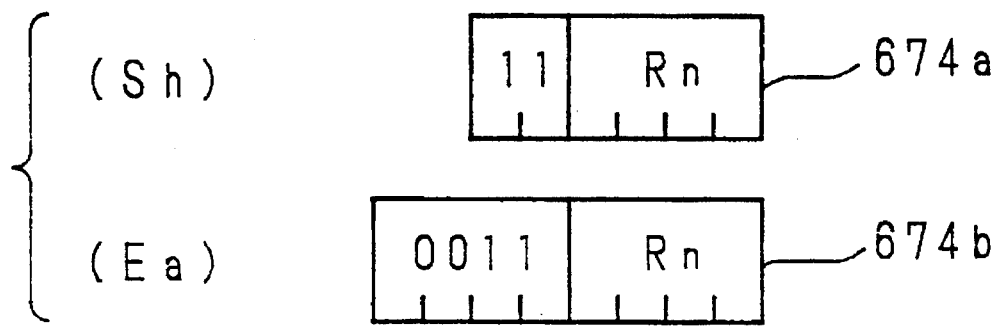
FIG. 15 is a schematic diagram showing a format of an addressing mode according to an example of one embodiment of a data processor of the present invention.

The register indirect mode is an addressing mode which takes as an operand the content of the memory whose address is the content of a register. FIG. 15 is a schematic diagram of the format thereof. Symbol Rn 674a, 674b shows the number of the general-purpose register.

The register relative indirect mode includes two kinds due to 16 bits or 32 bits of the displacement value. Each of them is an addressing mode which makes s an operand the content of the memory whose address is the value obtained by adding the value of displacement of 16 bits or 32 bits to content of a general-purpose register. FIG. 16 is a schematic diagram of the format thereof. In the figure, symbol Rn 676a, 676b, 676c shows the number of the general-purpose register. Each symbol disp:16 678a, 678b and disp:32 680 show the displacement value of 16 bits and the displacement value of 32 bits, respectively. The displacement value is handled as a signed number.

The immediate mode is an addressing mode which makes as an operand the bit pattern specified in the instruction code assuming it to be a binary number. FIG. 17 is a schematic diagram of the format thereof. Symbol imm_data 682a, 682b shows the immediate. The size of imm_data is specified in the instruction as the operand size.

The absolute mode includes two kinds of field due to 16 bits and 32 bits of the address value. Each of them is an addressing mode which makes as an operand the content of the memory whose address is the bit pattern of 16 bits or 32 bits specified in the instruction code. FIG. 18 is a schematic diagram showing the format thereof. Each symbol abs:16 684a, 684b and abs:32 686a shows the address value of 16 bits and 32 bits, respectively. When the address is shown by abs:16, the specified address value is sign-extended to 32 bits.

The PC relative indirect mode includes two kinds field due to 16 bits or 32 bits of the displacement value. Each of them is an addressing mode which makes as an operand the content of the memory whose address is the value of the content of a program counter whereto the displacement value of 16 bits or 32 bits is added. FIG. 19 is a schematic diagram showing the format thereof. Each symbol disp:16 687a, 687b and disp:32 688a, 688b shows the displacement value of 16 bits and the displacement value of 32 bits, respectively. The displacement value is handled with a signed number. In the PC relative indirect mode, the value of the program counter to be referred is the start address of the instruction comprising the operand. In the case where the value of the program counter is referred in the chained addressing mode, the start address of the instruction is also used as a reference value of PC relative mode.

The stack pop mode is an addressing mode which makes as an operand the content of the memory whose address is the content of a stack pointer (SP). After operand access, the SP is incremented by the operand size. For example, in the case where 32-bit data is handled, the SP is renewed (incremented) by +4 after the operand access. Designating of the stack pop mode for operands of sizes of 8 bits, 16 bits and 64 bits can also be performed, and the SP is renewed by +1, +2 and +8, respectively. FIG. 20 is a schematic diagram of the format thereof. As to the case where the stack pop mode is invalid for the operand, a reserved instruction exception is generated. Specifically, the stack pop mode specifying for a write operand and a read-modify-write operand becomes the reserved instruction exception.

The stack push mode is an addressing mode which makes as an operand the content, of the memory whose address is the content of the SP decremented by the operand size. In the stack push mode, the SP is decremented before operand access. For example, when handling 32-bit data, the SP is renewed by −4 before operand access. It is also possible to specify the stack push mode for operands of sizes of 8 bits, 16 bits and 64 bits, and the SP is renewed by −1, −2 and − 8, respectively. FIG. 21 is a schematic diagram showing the format thereof. As to the case where the stack push mode is invalid for the operand, a reserved instruction exception is generated. Specifically, the stack push mode specifying a read operand and a read-modify-write operand becomes the reserved instruction exceptions.

(2.2.2) "Chained Addressing Mode"

Addressing, whatever complicated, can basically be decomposed into combinations of addition and indirect reference. Accordingly, operations of addition and indirect reference are given in advance as primitives of addressing, and in the case where they can be combined arbitrarily, any complicated addressing mode can be realized. The chained addressing mode of the data processor 100 of the present invention is an addressing mode based on such a conception.

A complicated addressing mode is particularly useful for data reference between modules or the processing system of AI (Artificial Intelligence) language.

When specifying the chained addressing mode, in the basic addressing mode specifying field, one is specified from among three kinds of specifying methods viz. a register base chained addressing mode, a PC base chained addressing mode and an absolute chained addressing mode.

The register base chained addressing mode is an addressing mode making the value of general-purpose register as the base value of the chained addressing to be extended. FIG. 22 is a schematic diagram showing the format 694 thereof. Symbol Rn 696 shows the number of the general-purpose register.

The PC base chained addressing mode is an addressing mode making the value of the program counter (PC) as the base value of the chained addressing to be extended. FIG. 23 is a schematic diagram showing the format 698 thereof.

Figure 24:
FIG. 24 is a schematic diagram showing a format of an addressing mode according to an example of one embodiment of a data processor of the present invention.

The absolute base chained addressing mode is an addressing mode making zero as the base value of the chained addressing to be extended. FIG. 24 is a schematic diagram of the format 700 thereof.

Figure 25:
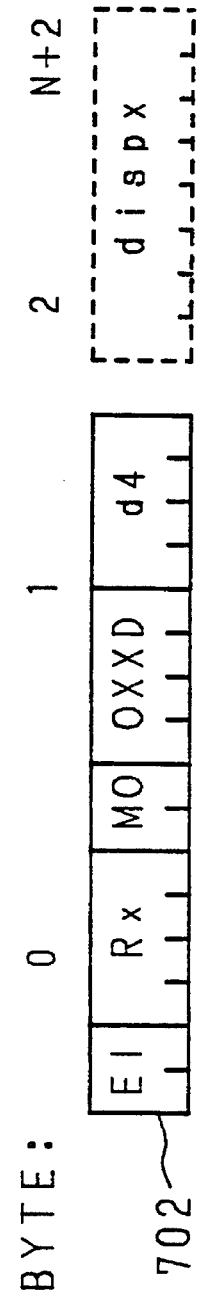
FIG. 25 is a schematic diagram showing a format of an addressing mode according to an example of one embodiment of a data processor of the present invention.

The chained addressing mode specifying field to be extended takes 16 bits as a unit, and this is repeated an arbitrary number of times. In each stage of the chained addressing mode, addition of displacement, scaling (X1, X2, X4, X8) and addition of an index register, and indirect reference of memory are performed. FIG. 25 is a schematic diagram showing the format 702 of the chained addressing mode. Each field has meanings as shown below.

E=0: Chained addressing mode is continued.

E=1: Address calculation ends. tmp→address of operand

I=0: No memory indirect reference is performed. tmp+ disp+Rx*Scale→tmp

I=1: Memory indirect reference is performed. mem[tmp+ disp+Rx*Scale]→tmp

M=0: <Rx> is used as an index.

M=1: Special index
  <Rx>=0 Index value is not added (Rx=0).
  <Rx>=1 Program counter is used as an index value (Rx=PC).
  <Rx>=2 or more Reserved.

D=0: The value of field d4 of four bits in the chained addressing mode is quadrupled to be taken as a displacement value, and this value is added. The d4 is handled with a signed number, and is used by surely quadrupling it irrespective of the size of the operand.

D=1: The dispx (16/32 bits) specified in the extension part of the chained addressing mode is taken as a displacement value and this value is added. The size of the extension part is added is specified in the d4 field.

| | |
|---|---|
| d4 = 0001 | dispx: 16 bits |
| d4 = 0010 | dispx: 32 bits |

XX: Index scale (scale=1/2/4/8)

In the case where scaling of X2, X4, X8 has been performed for the program counter, an indefinite value is entered as an intermediate value (tmp) after completion of processing of that stage. The effective address obtained by this chained addressing mode becomes an unpredictable value, but no exception is generated. Designating of scaling for the program counter should not be performed.

Figure 26:
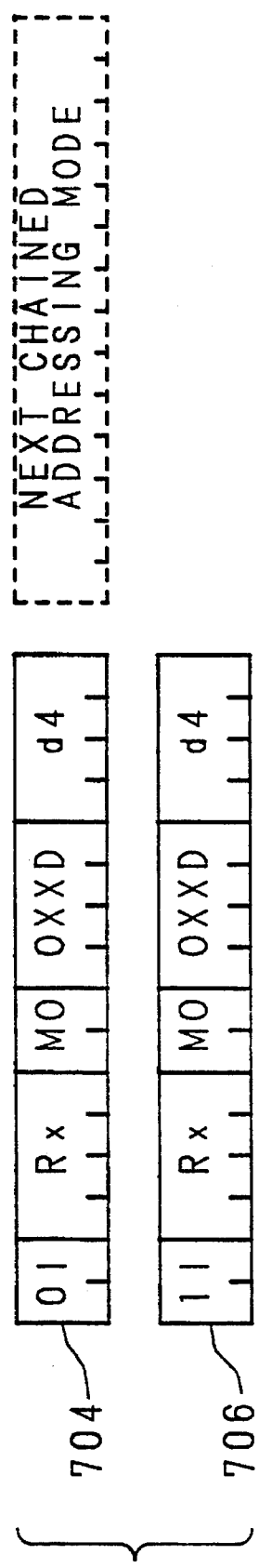
FIG. 26 is a schematic diagram showing a format of an addressing mode according to an example of one embodiment of a data processor of the present invention.
Figure 27:
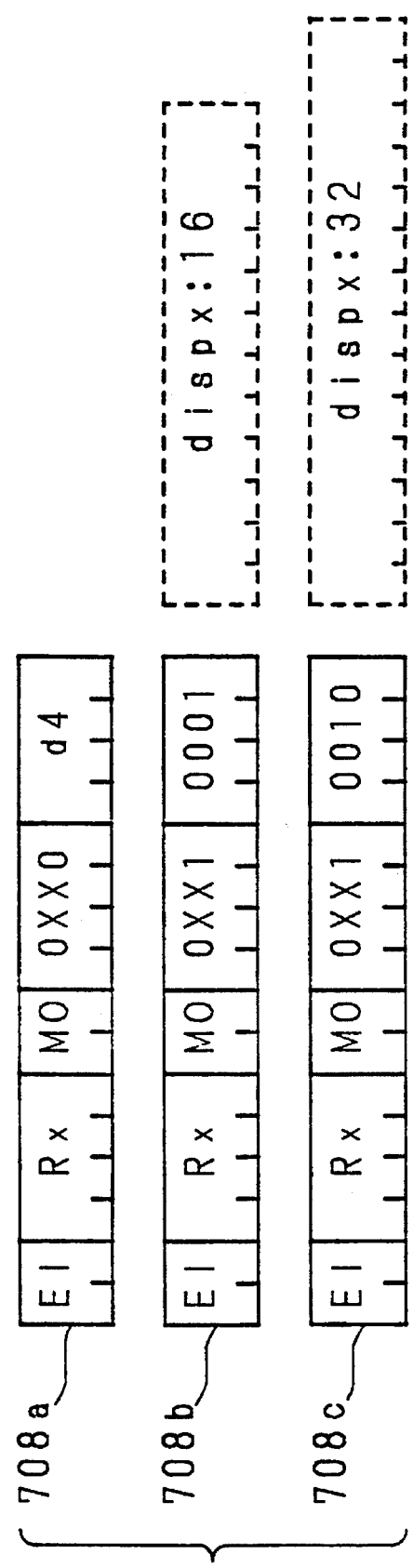
FIG. 27 is a schematic diagram showing a format of an addressing mode according to an example of one embodiment of a data processor of the present invention.

FIGS. 26 and 27 show variations on the instruction format formed by the chained addressing mode.

FIG. 26 shows variations of continuation 704 and completion of the chained addressing mode.

FIG. 27 shows variations 708a, 708b, 708c on the size of displacement.

In the case where the chained addressing mode of an arbitrary number of stages can be utilized, case-sorting in the compiler, on the basis of the number of stages, can be dispensed with, and therefore an advantage of alleviating the burden on the compiler is obtainable. This is because, even if frequency of chained reference is very low, the compiler has to be able to generate a correct code without fail. For this reason, up to an arbitrary number of stages can be applied in the format.

(2.3) "Jump Instruction"

Schematic views of FIG. 28 to FIG. 44 show instruction formats of the jump instruction of a data processor 100 of the present invention. Hereupon, the instructions are limited to those which are subject to processings associated with pre-jump described hereinbelow. Mark "*" shown in FIG. 28 to FIG. 44 designates a portion wherein anything can be filled.

Figure 28:
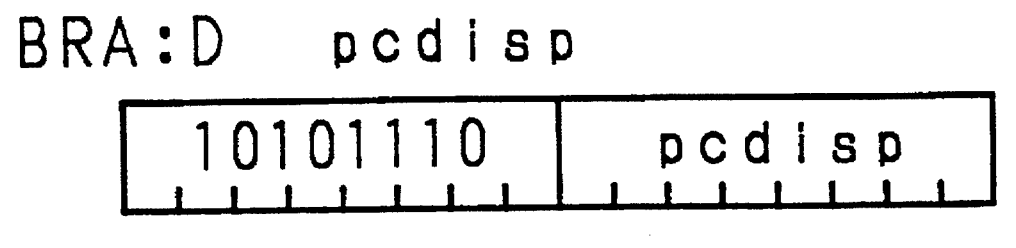

FIG. 28 is a schematic view showing an instruction format of a contracted type (D format) unconditional branch instruction (BRA instruction). The BRA instruction is the jump instruction where a branch target address is designated in PC relative. In the figure, pcdisp is a branch displacement and designated by an 8-bit immediate value. The branch displacement is treated as signed numbers. In the D format instruction, a doubled branch displacement is used.

Figure 29:
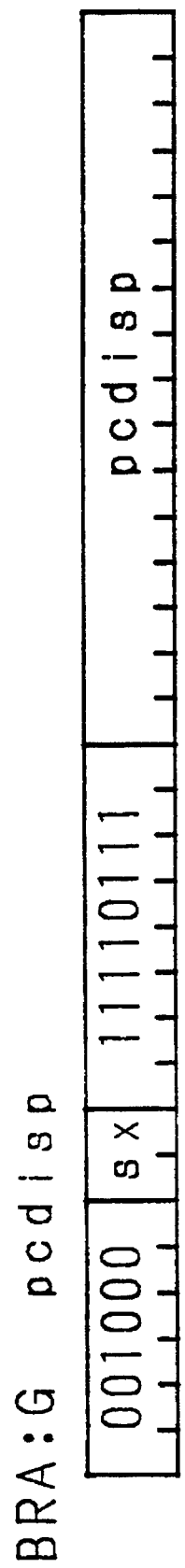
FIG. 29 is a schematic diagram showing bit pattern of BRA instruction according to an example of one embodiment of a data processor of the present invention.

FIG. 29 is schematic view showing an instruction format of a general type (G format) unconditional branch instruction (BRA instruction). In the figure, pcdisp is a branch displacement, designated by an 8-, 16- or 32-bit immediate value and treated as signed numbers. A branch displacement size is designed by sx. Bit allocations of sx are shown hereinbelow.

sx=00: 8 bits sx=01: 16 bits sx=10: 32 bits

In the data processor 100 of the present invention, since the instruction of the byte length of odd number are forbidden, even when the 8-bit displacement is designated, it is designated by 16 bits as a field. In this case, however, only the lower 8 bits of the 16-bit field are valid and the upper 8 bits are neglected whatever values they may be.

Figure 30:
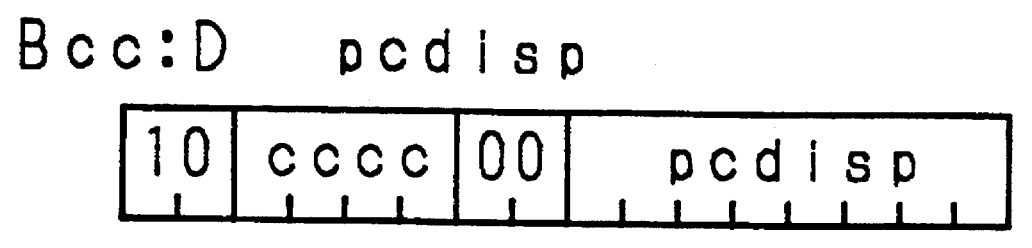
Figure 31:
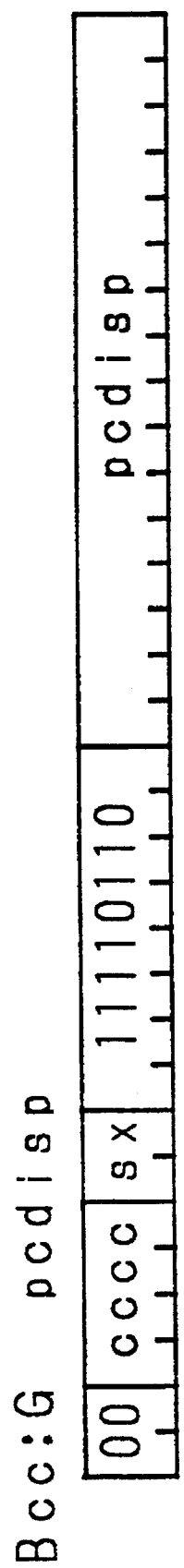
FIG. 31 is a schematic diagram showing bit pattern of Bcc instruction according to an example of one embodiment of a data processor of the present invention.

FIG. 30 is a schematic view showing an instruction format of a contracted type (D format) conditional branch instruction (Bcc instruction), and FIG. 31 is a schematic view showing an instruction format of a general type (G format) conditional branch instruction (Bcc instruction). As the instruction format, they are same as the BRA instruction. Branch conditions are designated in cccc fields in the figures. Branch processing is implemented only when the designated condition is realized. When the condition is not realized, the next instruction is executed.

Figure 32:
FIG. 32 is a schematic diagram showing bit pattern of BSR instruction according to an example of one embodiment of a data processor of the present invention.
Figure 33:
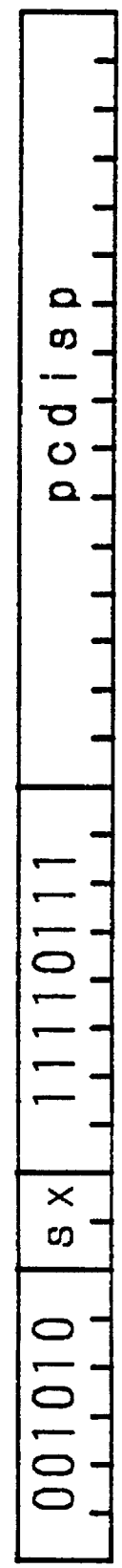
FIG. 33 is a schematic diagram showing bit pattern of BSR instruction according to an example of one embodiment of a data processor of the present invention.

FIG. 32 is a schematic view showing an instruction format of a contracted (D format) subroutine branch instruction (BSR instruction), and FIG. 33 is a schematic view showing an instruction format of a general type (G format) subroutine branch instruction (BSR instruction). As the instruction format, they are same as the BRA instruction. Besides the branch processing, a return target address is pushed to a stack top.

Figure 34:
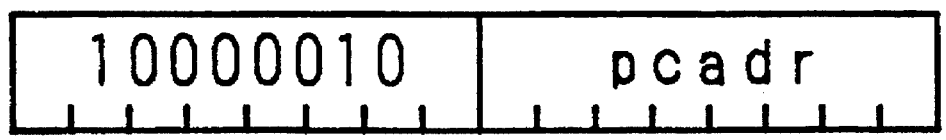
FIG. 34 is a schematic diagram showing bit pattern of JMP instruction according to an example of one embodiment of a data processor of the present invention.
Figure 35:
FIG. 35 is a schematic diagram showing bit pattern of JSR instruction according to an example of one embodiment of a data processor of the present invention.

FIG. 34 is a schematic view showing a format of the jump instruction (JMP instruction), and FIG. 35 is a schematic view showing a format of the subroutine jump instruction (JSR instruction). They are both the instructions of the above-mentioned general type 1 operand instruction (G1 format). In the figures, pcadr shows a branch target address and is designated by the aforementioned general type addressing mode. They jump to the operand address calculated according to designation of the addressing mode. It is also possible to designate a chained mode as the addressing mode. In the JSR instruction, the return target address is pushed to the stack top.

FIG. 36 through FIG. 39 are schematic views showing an instruction format of the ACB instruction which adds, compares and performs conditional branch. This instruction adds a step value to an xreg value and writes the addition result back to xreg, and when the addition result is less than a limit, branches to address obtained by adding the branch displacement designated by pcdisp to a PC value, and is used as a loop control primitive. The branch displacement is designated by sz. Bit allocations of sz are shown hereinbelow.

sz="00": 8 bits sz="01": 16 bits sz="10": 32 bits

When the displacement size is 16 bits or 32 bits, a 16-bit or 32-bit expanded portion is added. When the displacement size is 8 bits, displacement is designated by the field of pcdisp and the expanded portion is not added. The branch displacement is treated as signed number.

Figure 37:
FIG. 37 is a schematic diagram showing bit pattern of ACB instruction according to an example of one embodiment of a data processor of the present invention.

The ACB instruction has four instruction formats. xreg is designated by a register for all formats. FIG. 36 is a schematic view showing a contracted type format (Q format), whereby a step is fixed at "1" and a limit value is designated by a 6-bit literal (a small immediate value encoded in an operation code). FIG. 37 is a schematic view showing a contracted type format (R format), whereby step is fixed at "1" and the limit value is designated by the register.

FIG. 38 is a schematic view showing an instruction format of the aforementioned G format. The step and limit are designated by a general type addressing mode. FIG. 39 is a schematic view showing an instruction format of the aforementioned E format. The step value is designated by an 8-bit literal value, and the limit value is designated by the general type addressing mode.

FIG. 40 through FIG. 43 are schematic views showing instruction formats of the SCB instruction which subtracts, compares and performs conditional branch. The SCB instruction subtracts the step value from the xreg value and writes the subtraction result back to the xreg, and when the subtraction result is above the limit, branches to address obtained by adding the branch displacement designated by pcdisp to the PC value. It is used as a loop control primitive in the same way as the ACB instruction.

Figure 40:
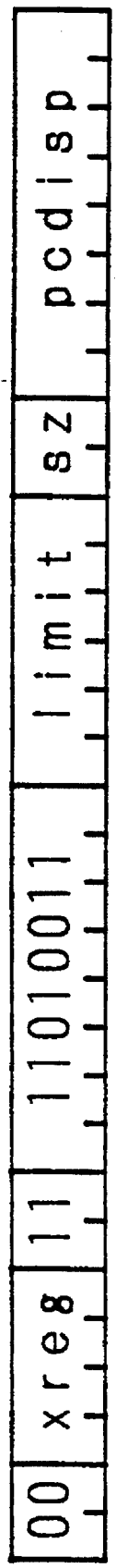
FIG. 40 is a schematic diagram showing bit pattern of SCB instruction according to an example of one embodiment of a data processor of the present invention.
Figure 42:
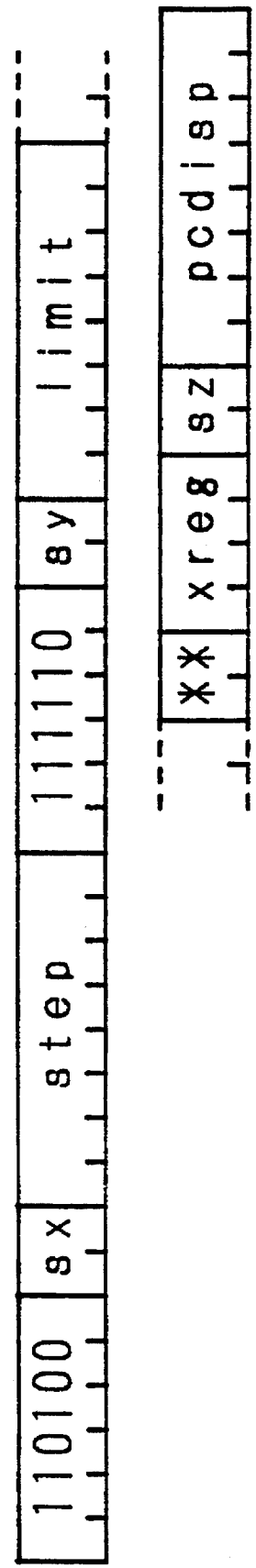
FIG. 42 is a schematic diagram showing bit pattern of SCB instruction according to an example of one embodiment of a data processor of the present invention.
Figure 43:
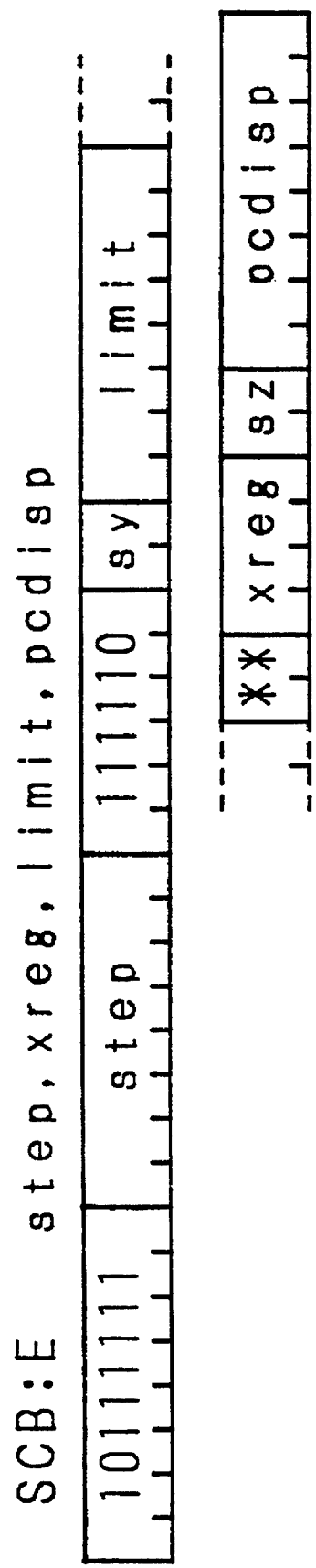
FIG. 43 is a schematic diagram showing bit pattern of SCB instruction according to an example of one embodiment of a data processor of the present invention.

The SCB instruction has four formats as same as the ACB instruction. FIG. 40 is a schematic view showing an instruction format of the Q format, FIG. 41 is a schematic view showing an instruction format of the R format, FIG. 42 is a schematic view showing an instruction format of the G format, and FIG. 43 is a schematic view showing an instruction format of the E format.

FIG. 44 is a schematic view showing an instruction format of the FBcc instruction which executes the conditional branch by the operation result of floating-point numbers. The branch condition is designated by ccccc. When the condition is realized, it branches to address obtained by adding the branch displacement indicated by pcdisp to the PC value. The branch displacement size is designated by sy. The branch displacement is treated as the signed numbers. Though sx is a field from relation with the instruction format of the other instruction, it has no particular meaning in the FBcc instruction. A designating process of the branch displacement is similar to the G format BRA instruction.

sy="00": 8 bits
sy="01": 16 bits
sy="10": 32 bits

In the data processor 100 of the present invention, the instruction is in 16-bit unit and it is forbidden to jump to odd addresses. Thus, when jumping to the odd address occurs, an odd-address jump trap (OAJT) starts to perform exceptional processing.

(3) "Debug Support Function"

The data processor 100 of the present invention comprises various functions which support debugging of programs. It also comprises a debug function using an exclusive incircuit emulator.

The debug support function is constituted by, one debug control register (DBC register), two PC breakpoints (XBP 0, XBP 1) and two operand breakpoints (OBP 0, OBP 1). When a debug event is detected by these functions, a self-debug trap (SDBT) or a DBG debug trap (DDBT: debug trap for incircuit emulator) is started and processed as one of the exceptional processings. Though a certain number of functions are implemented for the incircuit emulator by using a certain number of instructions and exclusive pins, their description is omitted here.

The data processor 100 of the present invention comprises three modes; normal mode, a DBG mode and a DBGACK mode. When a DBGINT# pin (external pin) shows a "H" level at resetting, the data processor 100 of the present invention rises as the normal mode. In the normal mode, the incircuit emulator support function does not work. When the DBGINT# pin shows an "L" level at resetting, the data processor 100 of the present invention rises as the DBG mode. In the normal mode, the incircuit emulator support function is operated. When the exceptional processing or interrupt processing for the incircuit emulator support is started in the DBG mode, it turns into DBGACK mode.

The debug functions of the data processor 100 of the present invention are as follows.

* executed in a trace mode (3 kinds)
* check execution of the instruction of the executable instruction breakpoint
* check reading out of operand from the operand break point
* check writing of operand for the operand break point A schematic view of FIG. 45 shows configurations of processor status words (PSW) and control registers related to debug.

In FIG. 45, "–" and "=" designate undefined fields, wherein "0" must be written. However, in the field shown by "=", even when "1" is tried to be written, it will be neglected. The registers can be operated by the control space operating instruction. FIG. 45(a) shows the PSW. A DBC register shown in FIG. 45(b) is for controlling a debug environment, and is constituted by fields for setting various debug modes and fields showing the detected state of the debug event. The registers XBP 0, XBP 1, OBP 0 and OBP 1 shown in FIG. 45(c) through FIG. 45(f) are used for setting breakpoint addresses related to instruction execution and operand access. Physically, the PSW and DBC registers are arranged in an integer operating unit 117, the XBP 0 and XBP 1 registers in a PC processing unit 116 and the OBP 0 and OBP 1 registers in an operand access unit 120. In the following, the fields of the PSW and DBC registers related to the SDBT and DDBT are described.

PSW

DB: debug mode (self debug)
  0: not being debugged
  1: being debugged

DBC register

D: DBC register valid bit
  0: DBC register is not being used in the DBG mode
  1: DBC register is being used in the DBG mode B: debug trap start inhibiting bit
  0: SDBT and DDBT are started in the DBG mode
  1: SDBT and DDBT are inhibited to start in the DBG mode.

TR: trace valid bit
  00: not trace mode
  01: trace mode
    Instructions are executed one by one sequentially.
    The debug event by trace is not detected.
  10: trace mode.
    Instructions are executed one by one sequentially.
    The debug event by trace is detected only by the instruction (such as branch instruction) which disturbs the instruction sequence.
  11: trace mode.
    The debug event is detected at instructive gaps.

TA: trace status bit
  00: The debug event is not detected in the trace mode.
  01: not defined
  10: The debug event was detected in the trance mode of TR=10.
  11: The debug event was detected in the trace mode of TR=11.

E: Instruction execution break valid bit
  0: disable XBP 0 and XBP 1.
  1: enable XBP 0 and DBP 1.
    When the instruction whose address is set to the XBP 0 and XBP 1 are executed, the debug event is detected.

EA: Instruction execution break status bit
  00: The debut event is not detected in the XBP 0 and XBP 1.
  01: The debug event was detected in the XBP 1.
  10: The debug event was detected in the XBP 0.
  11: The debug event was detected in the XBP 0 and XBP 1.

R: Operand read break valid bit
  0: disable OBP 0 and OBP 1 for the read access.
  1: enable OBP 0 and OBP 1 for the read access,
    When the operands are read out for addresses set to the OBP 0 and OBP 1, the debug event is detected.

RA: Operand read break status bit
  00: The debug event is not detected by reading out from the OBP 0 and OBP 1.
  01: The debug event was detected by reading out from the OBP 1.
  10: The debug event was detected by reading out, from the OBP 0.
  11: The debug event was detected by reading out from the OBP 0 and OBP 1.

W: Operand write break valid bit
  0: disable OBP 0 and OBP 1 for the write access.
  1: enable OBP 0 and OBP 1 for the write access.
    When the operand is written for addresses set to the OBP 0 and OBP 1, the debug event is detected.

WA: Operand write break status bit
  00: The debug event is not detected by writing into the OBP 0 and OBP 1.

01: The debug event was detected by writing into the OBP 1.

10: The debug event was detected by writing into the OBP 0.

11: The debug event was detected by writing into the OBP 0 and OBP 1.

In the normal mode, when PSW.DB=1 the DBC register is in operating state, and when the debug event is detected, detected information is reflected to TA, EA, RA and WA fields of the DBC register, the SDBT is started. When PSW.DB=0, the debug event is not detected. In the normal mode, the incircuit emulator support function does not work and three leftmost bits of the DBC register are always "0" and their values can not be changed.

In the DBG mode, when DBC.D=0, DBC.B=0 and PSW.DB= 1, the DBC register is in operating state, and when the debug event is detected, detected information is reflected to the TA, EA, RA and WA fields of the DBC register and the SDBT is started. When DBC.D=1 and DBC.B=0, the DBC register is in operating state, and when the debug event is detected, detected information is reflected to the TA, EA, RA and WA fields of the DBC register and DDBT is started. When DBC.B=1 and DBC.B=1, the DBC register is in operating state, and though the debug event is detected, this is only informed to the outside of the data processor by asserting an external pin without reflecting detected information to the DBC register, and the DDBT is not started.

In cases other than those mentioned above, the debug event is not detected. In the DBGACK mode, the SDBT and DDBT are never started.

(4) "Configuration of Function Blocks of the Data Processor of the Present Invention"

Figure 46:
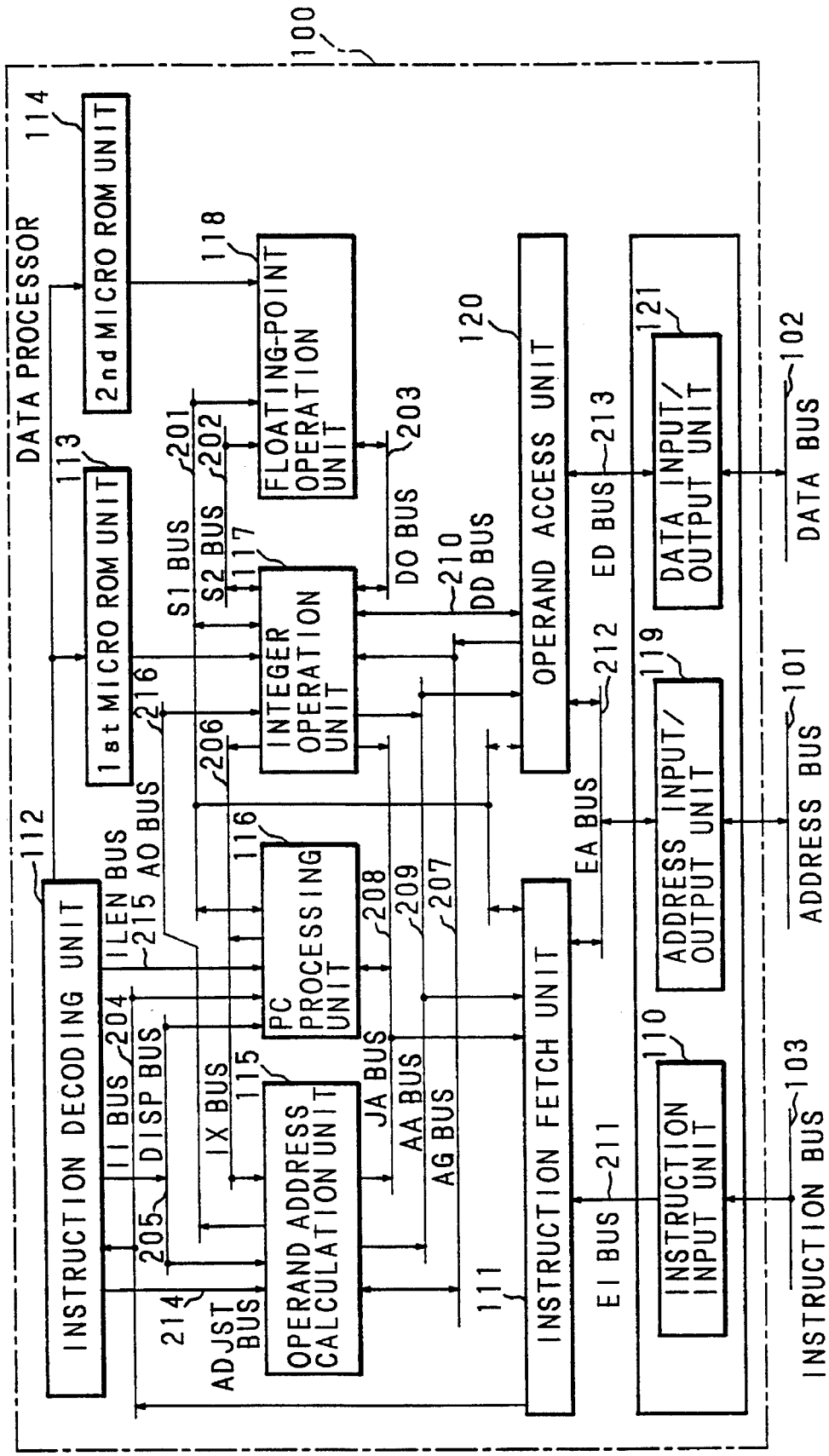
FIG. 46 is a block diagram showing a configuration of an example of one embodiment of a data processor of the present invention.

FIG. 46 is a block diagram showing a configuration of the data processor 100 of the present invention.

When roughly dividing the inner portion of the data processor of the present invention functionally, it can be divided into an instruction input unit 110, an instruction fetch unit 111, an instruction decoding unit 112, a first micro-ROM 113, a second micro-ROM 114, an operand address calculation unit 115, a PC processing unit 116, an integer operating unit 117, a floating-point operating unit 118, an address input/output unit 119, an operand accessing unit 120 and a data input/output unit 121.

Each of the blocks transfers addresses and data via an S1 bus 201, an S2 bus 202, a DO bus 203, an II bus 204, a DISP bus 205, an IX bus 206, an AG bus 207, a JA bus 208, an AA bus 209, a DD bus 210, an EI bus 211, an EA bus 212, an ED bus 213, an ADJST bus 214, an ILEN bus 215 and an AO bus 216. A system configuration shown in FIG. 4 can be accomplished by, connecting the address input/output unit 119 to an address bus 101, the data input/output unit 121 to a data bus 102 and the instruction input unit 110 to an instruction bus 103.

(4.1) "Instruction Input/output Unit"

The instruction input/output unit 110 inputs the instruction code from the external instruction bus 103 to the data processor 100 of the present invention in 32-bit unit. For accessing the instruction cache 106, there are a standard accessing mode which accesses 32-bit instruction code for one address and a quad accessing mode which accesses 32-bit instruction code four times sequentially for one address, and in either case, the input/output unit 110 outputs the inputted instruction code to the instruction fetch unit 111 via the EI bus 211.

(4.2) "Instruction Fetch Unit"

Figure 47:
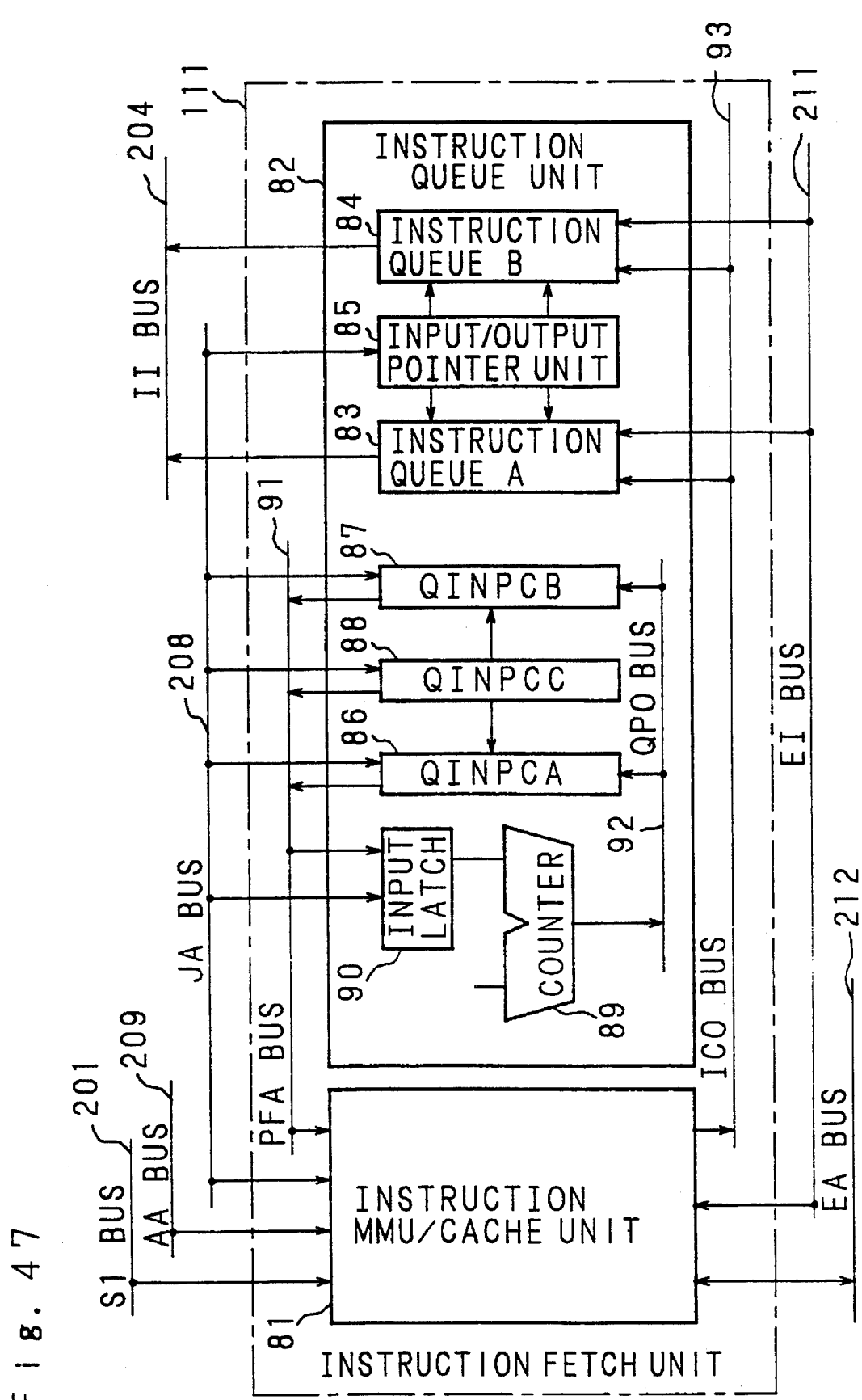
FIG. 47 is a block diagram showing a configuration of an instruction fetch unit based upon an example of one embodiment of a data processor of the present invention.

FIG. 47 is a block diagram showing a configuration of the instruction fetch unit 111. The instruction fetch unit 111 includes an instruction MMU/cache unit 81 containing an address conversion mechanism of instruction address, internal instruction cache and instruction TLB and its control unit, and an instruction queue unit 82.

The instruction MMU/cache unit 81 converts address of the instruction address and fetches the instruction. Usually, a PC value of the next instruction to be fetched is sent to the instruction MMU/cache unit 81 from a QINPCA 86 or a QINPCB 87 via a PFA bus 91. However, when a jump occurs and the jump target address is fetched immediately, a jump target address value outputted from the operand address calculation unit 115, PC processing unit 116 or integer operating unit 117 is taken in directly by the MMU/cache unit 81 via the JA bus 208. In the instruction MMU/cache unit 81, the PC value is converted into the physical address, fetching the instruction code from the internal instruction cache and sending instruction code to an instruction queue A 83 or an instruction queue B 84 via an ICO bus 93.

When the internal instruction cache is missed, physical address is outputted to the address input/output unit 119, the instruction access is required to the outside, and the instruction code inputted through the instruction input unit 110 is registered in the internal instruction cache and sent also to the instruction queue A 83 or the instruction queue B 84. Address conversion and instruction TLB refreshing by the paging when the instruction TLB is missed are also performed by the control circuit included in the instruction MMU/cache unit 81.

The instruction queue unit 82 performs instruction fetch address control and buffering of the fetched instructions. The instruction queue unit 82 includes two instruction queue A 83 and instruction queue B 84 and two address registers QINPCA 86 and QINPCB 87 holding an instruction queue fetch address, so as to enable queuing of the two-way branch/no-branch instruction of the conditional branch instruction. A QINPCC 88 which is a latch for saving the branch target address of the second conditional branch instruction is also included.

Numeral 98 designates a counter for incrementing the instruction pre-fetch address, and numeral 90 designates an input latch of the counter 89.

The instruction queue A 83 and instruction queue B 84 have a 32-byte capacity, and input/output control is effected by an input/output pointer unit 85. An input pointer of the instruction queue is controlled by a word (4 bytes) unit, and at cache hit, the 128-bit instruction code is fetched from the ICO bus 93 and at cache miss, the 32-bit instruction is fetched from the EI bus 211 into the instruction queue A 83 or instruction queue B 84. An input pointer is refreshed responsive to the hit/miss of the instruction cache. An output pointer is controlled by a half word (2 bytes) unit, and the instruction code fetched into the instruction queues A 83 and B 84 are arranged at a 16-bit unit, outputted to the II bus 204 and transferred to the instruction decoding unit 112 and PC processing unit 116. The output pointer is refreshed responsive to output pointer refresh information sent from the instruction decoding unit 112.

The instruction queues A 84 and B 85 are also able to bypass data fetched from the ICO bus 93 or EI bus 211 and output to the II bus 204, when the instruction queue is vacant as immediately after a jump.

The instruction input/output pointer unit 85 also includes two sets of input/output pointers which control the instruction queue A 83 and instruction queue B 84, and a latch saving a pointer value corresponding to the QINPC 88. When a jump occurs, the pointer is initialized by the value fetched from the JA bus 208.

The instruction queue unit 82 processes the branch instruction efficiently by using two instruction queue A 83 and instruction queue B 84 and the QINPCC 88. Though the instruction queue unit 82 fetches two-way instruction at processing of the conditional branch instruction, it preferentially fetches the sequence instruction on the predicted side of the next execution, and when the sequence instruction queue on the predicted side is full, fetches the other sequence instruction. Furthermore, the instruction queue unit 82 saves the branch target address of the second conditional branch instruction in the QINPCC 88 so as to enable pipeline processing of the two conditional branch instructions, and when one of the two instruction queues becomes vacant, fetches the instruction of address saved in the QINPCC 88 immediately.

Usually, when the instruction queue unit 82 fetches the instruction continuously, the value of QINPCA 86 or QINPCB 87 is outputted to the PFA bus 91 and sent to the instruction MMU/cache unit 81, and at the same time, fetched into the counter 89 via the latch 90 so as to be incremented, and written back to the QINPCA 86 or QINPCB 87. When the jump target address is transferred via the JA bus 208, a value on which is fetched into either of the QINPCA 86, QINPCB 87 or QUINPCC 88. That to which register is written are dependent on the kind of requests received by the instruction fetch unit 111 and the internal state of the instruction queue unit 82. When the instruction of the jump target address on the JA bus 208 is fetched in the next cycle, the jump target address on the JA bus 208 is fetched directly into the counter 89 via the latch 90 so as to be incremented, and written into the QINPCA 86 or QINPCB 87.

When a valid address is taken into the QINPCA 86, QINPCB 87 and QINPCC 88 during processing two conditional branch instructions in the instruction queue unit 82, and a branch prediction of the first conditional branch instruction is right, either the instruction queue A 83 or instruction queue B 84 becomes void and the value of QINPCC 88 is written into the QINPCA 86 or QINPCB 87 on the voided side. When starting to fetch the instruction of the address saved in the QINPCC 88 immediately, the value of the QINPCC 88 is outputted to the PFA bus 91 and sent to the instruction MMU/cache unit 81, and at the same time, taken into the counter 89 via the latch 90 so as to be incremented, and written back to the QINPCA 86 or QINPCB 87.

When the data processor 100 of the present invention is in a bus-watch mode, entry of the internal instruction cache hit by physical address inputted through the address input/output unit 119 is voided.

(4.3) "Instruction Decoding Unit"

In the instruction decoding unit 112, the instruction code fetched from the II bus 204 is decoded in a 16-bit (a half word) unit. The instruction decoding unit 112 includes, an OPDEC1 which decodes an operation code included in the first half word, an OPDEC" which decodes an operation code included in the second and third half words an addressing mode decoder which decodes the addressing mode and a SUBDEC1 and SUBDEC2 which decode only the 2-byte instruction limited for decoding the two instructions in parallel.

Furthermore, a second decoder which further decodes outputs of the OPDEC1 and OPDEC2 to calculate entry address of the micro-ROM, a branch predicting unit which performs branch prediction of the conditional branch instruction, and an address calculation conflict check mechanism which checks a pipeline conflict at operand address calculation are also included. In the branch predicting unit, branch prediction of the conditional branch instruction is performed by the past one branch career. This branch prediction information is referred to at decoding of the conditional branch instruction. The branch career stores as a tag a part of instruction address executed immediately before the conditional branch instruction, and PC value which registers and refers to is sent from the PC processing unit 116.

The instruction decoding unit 112 decodes the instruction code outputted from the instruction fetch unit 111 at 0 to 8 bytes for one clock. Information related to operation in the integer operating unit 117 among the decoded results is outputted to the first micro-ROM 113, information related to operation in the floating-point operating unit 118 to the second micro-unit 114, information related to the operand address calculation to the operand address calculation unit 115, information related to the PC calculation to the PC processing unit 116 and output pointer refreshing information of the instruction queue to the instruction fetch unit 111. The instruction decoding unit 112 is able to decode the two instructions in parallel, only when the rear side instruction is the 2-byte instruction having no memory operand, the decade result (called a sub-code) related to the rear side instruction is sent to the first micro-ROM 113. Information related to the jump processing performed at an instruction decoding stage is outputted to the instruction fetch unit 111, PC processing unit 116 or operand address calculation unit 115.

Though the branch prediction unit performs dynamic branch prediction of the conditional branch instruction, it can be set, by the control register in the integer operating unit 117, to predict statically not to branch.

(4.4) "First Micro ROM Unit"

The first micro ROM unit 113 comprises a micro ROM storing microprogram which mainly controls the integer operation unit 117, a microsequencer, a microinstruction decoder, sub-code decoder and the like. A microinstruction is read out from the micro ROM once at every one clock. The microsequencer accepts processings of exception, interruption, and trap (these three are called EIT), besides the sequential processing for execution of the microprogram relating to instruction execution.

To the first micro ROM unit 113, there are inputted interruption independent of the instruction code and branch condition of the microprogram obtained by the result of integer operation execution.

Output of the microinstruction decoder is mainly given to the integer operation unit 117, but some information is outputted also to other blocks at execution of jump instruction and acceptance of execution.

The sub-decoder decodes sub-code. When the sub-code is effective, operation information relating to the sub-code becomes effective in synchronism with the last microstep of one instruction. The output of the sub-decoder is output to the integer operation unit 117.

(4.5) "Second Micro ROM Unit"

In the second micro ROM unit 114, a micro ROM in which various microprogram routines for controlling a floating-point operation unit 118 are stored, a microsequencer, a microinstruction decoder and so on are included. One microinstruction is read from the micro ROM in one clock cycle. The microsequencer also processes the exception relating to the floating-point operation besides the sequence processing specified by the microprogram, and when the unmasked floating point exception is detected, requests the exception processing to the first micro ROM unit 113. The microsequencer of the second micro ROM unit 114 operates in parallel to the microsequencer of the first micro ROM unit 113, and controls the floating-point operation unit 118 in parallel to the integer operation unit 117.

To the second micro ROM unit 113, flag information obtained from the result of the floating-point operation execution is also inputted.

Though output of the microinstruction decoder is mainly outputted to the floating-point operation unit 118, a part of information such as detection of the exception relating to the floating-point operation is also outputted to the other functional blocks.

(4.6) "Operand Address Calculation Unit"

The operand address calculation unit 115 is controlled in hardwired logic by information on operand address calculation outputted from the addressing mode decoder of the instruction decoding unit 112. In this operand address calculation unit 115, operand address calculation other than the memory access for the memory indirect addressing, and jump target address calculation of the jump instruction are executed.

Figure 48:
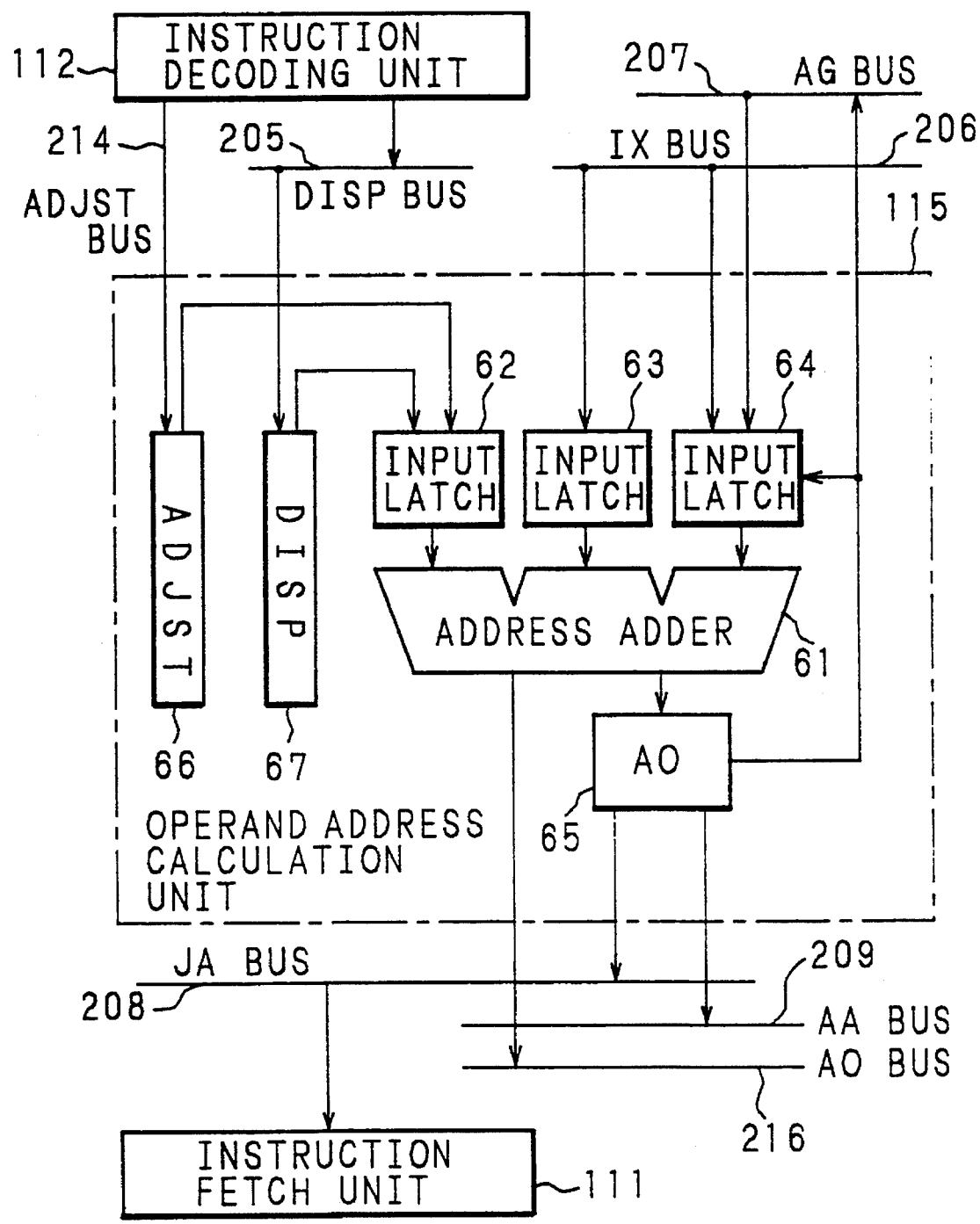
FIG. 48 is a block diagram showing a configuration of an operand address calculation unit based upon an example of one embodiment of a data processor of the present invention.

FIG. 48 is a block diagram showing a detailed configuration of the operand address calculation unit 115. In the figure, reference numeral 61 designates an address adder performing address calculation, 62, 63 and 64 input latches, 65 an output latch (AO latch), 66 an ADJST latch holding compensation values such as a pre-decrement value at push mode, and numeral 57 designates a DISP latch holding displacement and immediate for address calculation, respectively. In addition, in order to process in one cycle address calculation of one stage in chained mode, a three-value adder is used in the address adder 61.

The value of general-purpose register and the PC value referred to at address calculation are taken in from the latch 64 or the latch 63 from the integer operation unit 117 and the PC processing unit 116 through IX bus 206. Into the latch 62, the data held in the ADJST latch 66 or the DISP latch 67 is sign-extended to 32 bits and taken. When indirect reference is performed in chained mode, fetched address is transferred to the operand access unit 120 through the AO latch 65 and the AA bus 209 so as to perform data fetch. The fetched data is taken into the input latch 64 through the AG bus 207. When indirect reference is not performed in chain mode, the address calculation result at previous step is taken intact to the input latch 64. The address calculation result is sent to the integer operation unit 117 through the AO bus 216. And when pre-fetch of operand is performed, the operand address is transferred to the operand access unit 120 through the AO latch 65 and the AA bus 209.

When the operand is an immediate, the data taken in the DISP latch 67 is sent to the integer operation unit 117 through the address adder 61, the AO latch 65 and the AO bus 216. And when an immediate is a double precision floating point number (64 bits), it is divided into two parts, that is, upper 32 bits and lower 32 bits, and taken into the DISP latch 67 at two times. In this case, the upper 32 bits are saved in the AO latch 65 in the first cycle and the upper 32 bits are transferred to the integer operation unit 117 through the AG bus 207 and the lower 32 bits are transferred to the integer operation unit 117 through the AO bus 216 in the second cycle.

When jump is performed at the stage where the operand address calculation is finished, the calculation result of the jump target address is outputted to the instruction fetch unit 111 and the PC processing unit 116 through the AO latch 65 and the JA bus 208.

(4.7) "PC Processing Unit"

Figure 49:
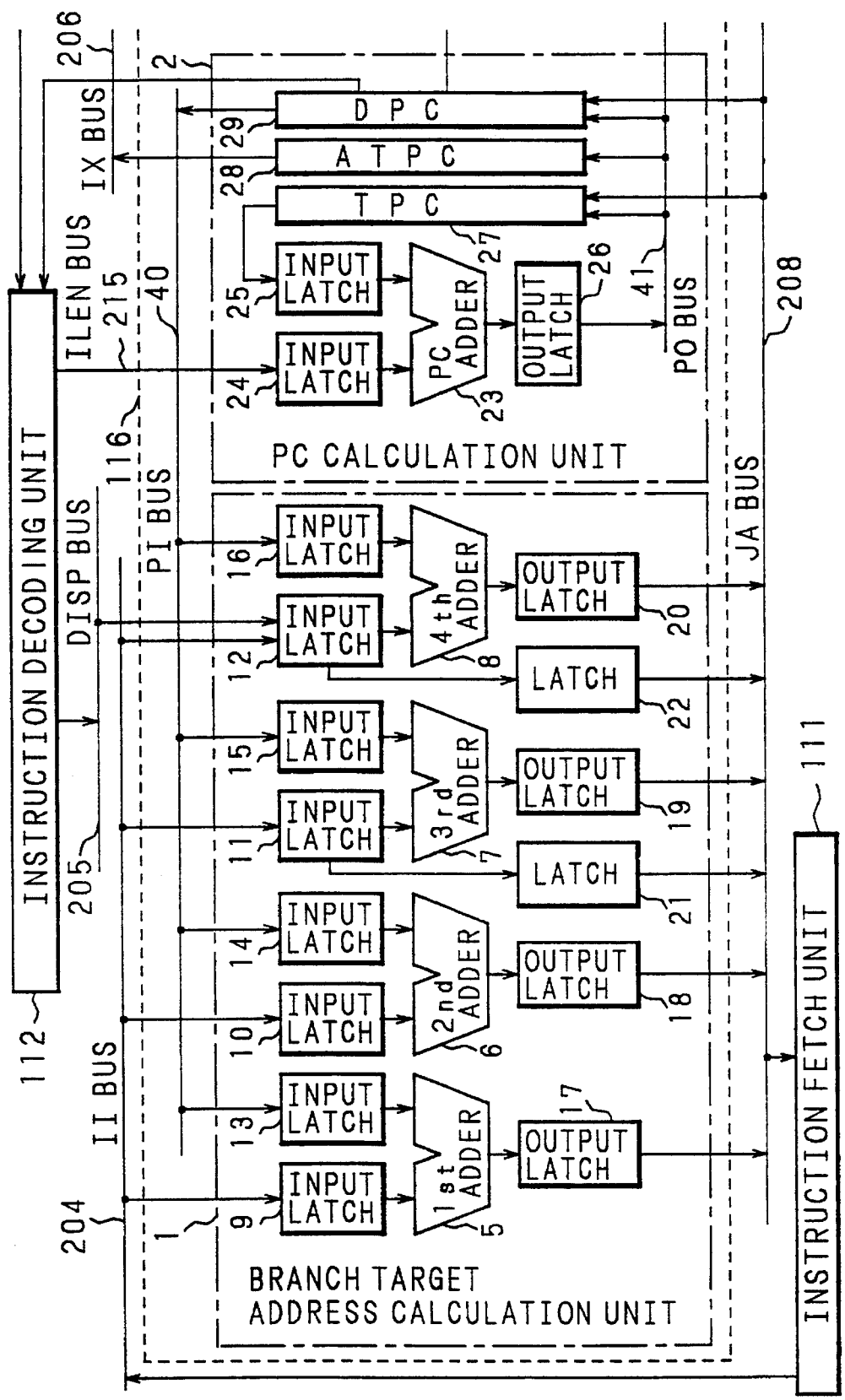
FIG. 49 is a block diagram showing a configuration of a PC processing unit based upon an example of one embodiment of a data processor of the present invention.
Figure 50:
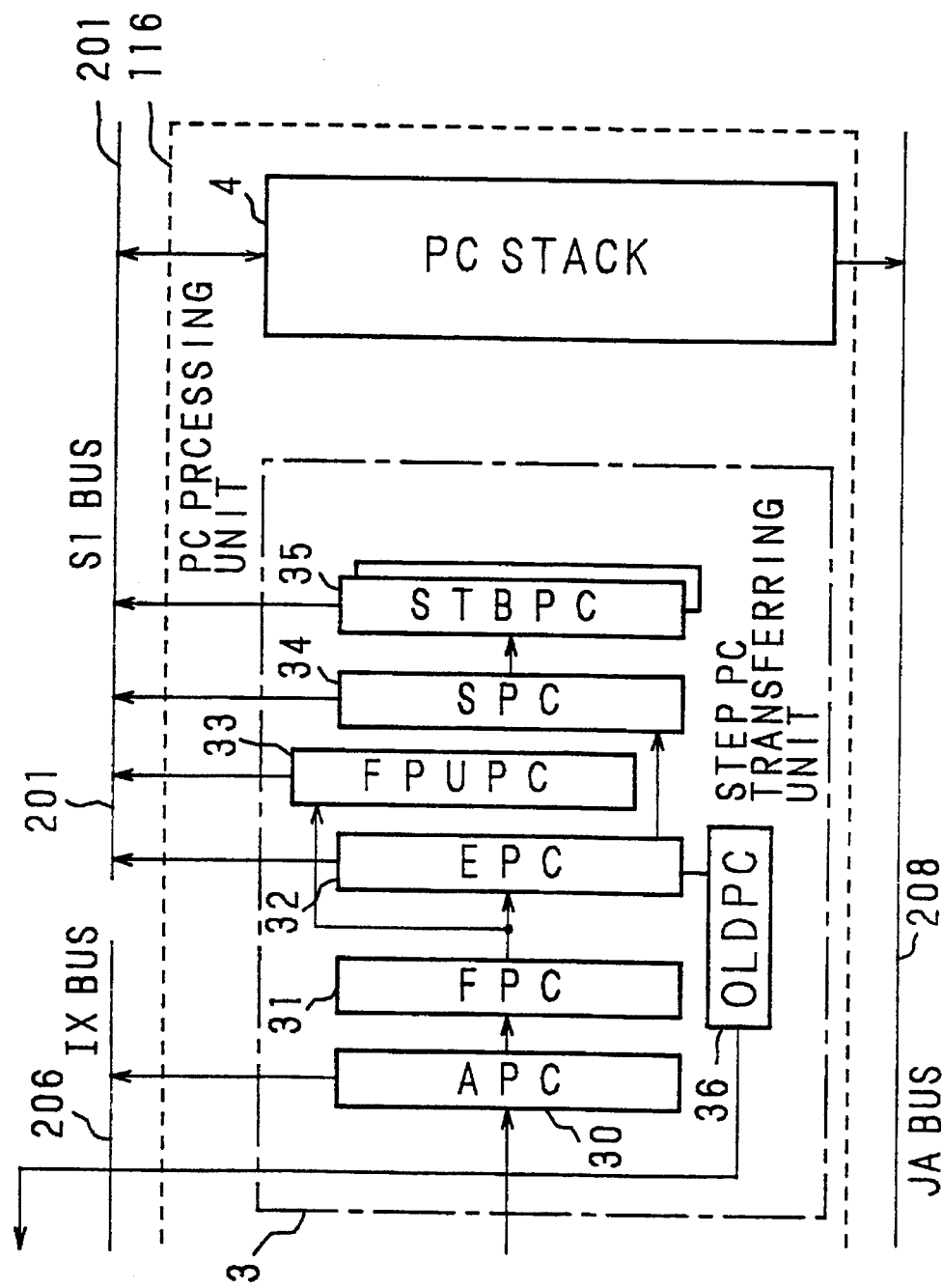
FIG. 50 is a block diagram showing a configuration of a PC processing unit based upon an example of one embodiment of a data processor of the present invention.

FIG. 49 and FIG. 50 are block diagrams showing configuration of the PC processing unit 116. The PC processing unit 116 roughly comprises a branch target address calculation unit 1, a PC calculation unit 2, a step PC transferring unit 3 and a PC stack 4.

The PC calculation unit 2 is controlled in hardwired logic using information on PC calculation outputted from the instruction decoding unit 112 so as to calculate the PC value of an instruction. The instruction of the data processor 100 of the present invention is a variable-length instruction, and the length of that instruction can be found only after the instruction is decoded. The PC calculation unit 116 calculates the PC value of the next instruction by adding the length of the instruction outputted from the instruction decoding unit 112 to the PC value of the instruction being decoding.

In the PC calculation unit 1, the DPC 29 holds a head address of the instruction being decoded. The TPC 27 holds a head address of the code to be decoded, including the case where an instruction code of one instruction is divided into a plural number of processing units so as to be processed. That is, the head address of the code taken in from II bus 204 into the instruction decoding unit 112 is held.

The PC adder 23 adds an instruction length taken in from the instruction decoding unit 112 through ILEN bus 215 and a value of the TPC 27, and the addition result is written back to the TPC 27 and the ATPC 28. And, at decode completion of one instruction, since the addition result indicates a head address of the next instruction, it is also written back to the DPC 29. The ATPC 28 is referred to as the PC value of the next instruction at address calculation. When jump occurs, a jump target address is taken in from the JA bus 208, and the TPC 27 and the DPC 29 are initialized. But the ATPC 28 is not initialized even when jump occurs. A part of the DPC 29 is also transferred to the instruction decoding unit 112 so as to be used for branch prediction.

The branch address calculation unit 1 is a block in which branch target address is calculated at instruction decoding stage. The branch target address calculation unit 1 calculates a branch target address by cutting out data of a branch displacement position from an instruction code on the II bus 204 to be sent from the instruction fetch unit 111 to the instruction decoding unit 112 and by adding it to the DPC 29. The data processor 100 of the present invention comprises four adders of the first to fourth adders 5, 6, 7 and 8 so as that jump target address can be calculated at the same time with instruction decoding as to all instruction of BRA, BSR and Bcc instructions. In addition, reference numerals 9 to 16 designate input latches of the respective adders of 5, 6, 7 and 8 and numerals 17 to 20 designate output latches.

Figure 51:
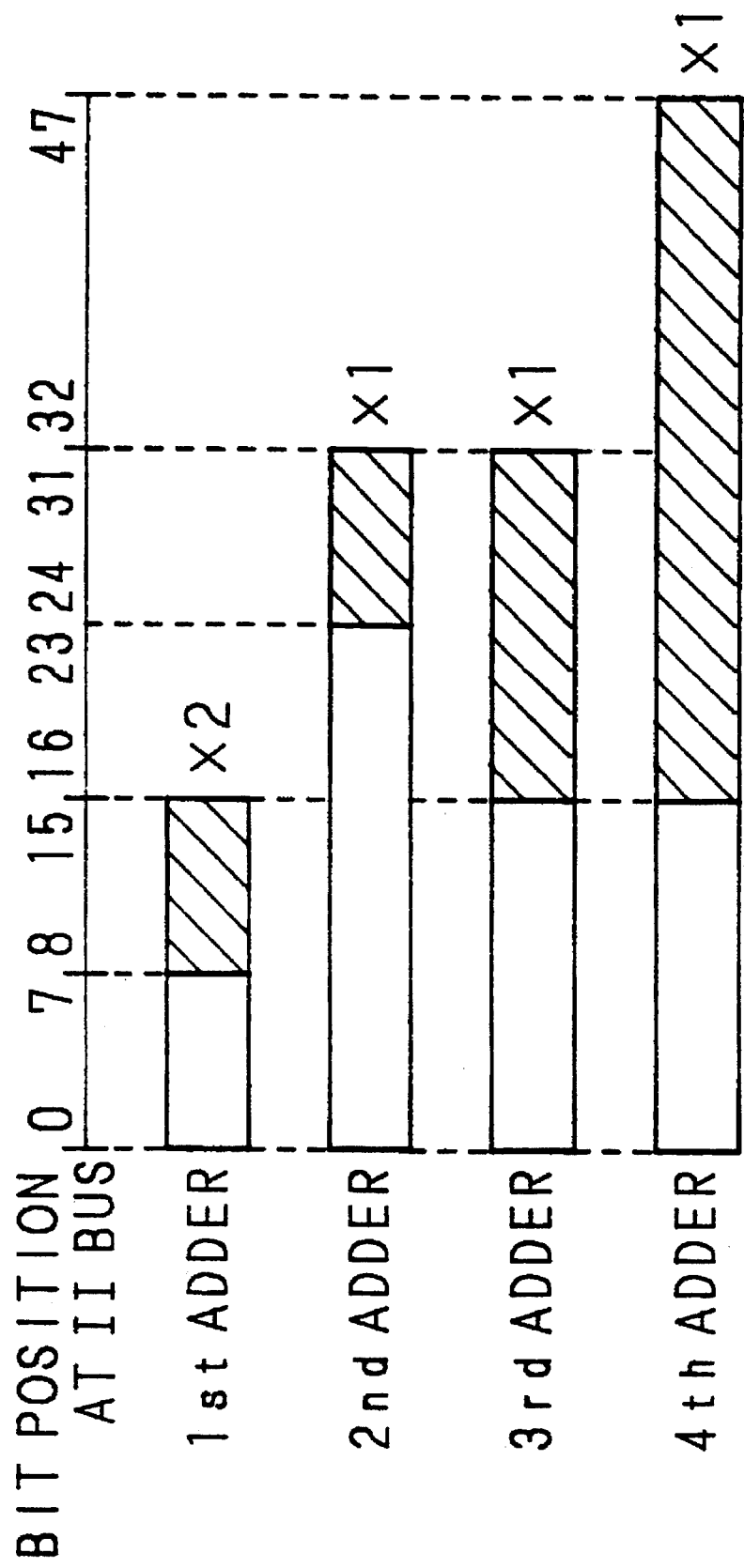
FIG. 51 is a schematic diagram showing a bit position on II bus which is inputted as a branch displacement to each adder of branch target address calculation unit based upon an example of one embodiment of a data processor of the present invention.

The branch target address calculation unit 1 operates in synchronism with the decoding of an instruction code. Value of the DPC 29 is taken into the input latches 13 to 16 through the PI bus 40, in synchronism with the respective instruction decoding cycles. And data on the II bus 204 are taken into the input latches 9 to 12. FIG. 51 is a schematic diagram in which bit position of the II bus 204 to be inputted to the respective adders as branch displacements are shown.

The input latch 9 takes in bits (8:15)(eight bits from bit 8 to bit 15) of the II bus 204 to make it sign-extended to be 32 bits after making it to be double (shift to left by one bit). The input latch 10 takes in bits (24:31) of the II bus 204 to make is sign-extended to be 32 bits. The input latch 11 takes in bits (16:31) of the II bus 204 to make it sign-extended to be 32 bits. The input latch 12 takes in bits (16:47) of the II bus 204. The first to fourth adders 5 to 8 add the contents of the respective input latches and output it to the output latches 17 to 20. And in the latches 21, the data taken in the input latch 11 and sign-extended is held intact. In the latch 22, the data taken in the input latch 12 is held intact.

When a branch target address can't be calculated by the first to fourth adders 5 to 8 in branch target decoding cycle, the input latch 12 takes in a branch displacement from the instruction decoding unit 112 through the DISP bus 205. The input latch 16 takes in the DPC value through the PI bus 40. The fourth adder 8 adds the contents of the respective input latches 12 and 16 so as to output the result to the output latch 20.

When jump processing is performed at instruction decoding stage, one of the output latches 17 to 22 is detected by control signal inputted from the instruction decoding unit 112, and the content thereof is outputted to the JA bus 208, thereby jump target address is transferred to the instruction fetch unit 111. A value on the JA bus 208 is taken into the TPC 27 and the DPC 29.

The PC stack 4 is a buffer for holding a copy of a return target PC value from subroutine pushed to a stack at execution of a jump instruction for subroutine, the return target PC value is read out from the PC stack 4 so as to be transferred to the instruction fetch unit 111 through the JA bus 208. And a value on the JA bus 208 is taken into the TPC 27 and the DPC 29.

The step PC transferring unit 3 is provided with a plurality of latched for holding PC values corresponding to the respective pipeline stages, and value of the DPC 29 calculated at instruction decoding stage is transferred as PC value of the respective instructions as pipeline processing advances. The OLDPC 36 holds PC value of the instruction executed immediately before at execution stage, and outputs it to the instruction decoding unit 112. By using this value, the branch carrier table in the instruction decoding unit 112 is refreshed.

(4.8) "Integer Operation Unit"

The integer operation unit 117 is controlled by the microprogram stored in a micro ROM of the first micro ROM unit 113, and executes operations necessary for realizing the function of each integer operation instruction, using the register file and arithmetic unit in the integer operation unit 117. In the register file, a general register and a working register are included. The integer operation unit 117 is provided with as operation devices, a main operation device comprising an ALU, a shifter, a priority encoder and the like controlled by microprogram, and with a sub-operation device comprising an ALU, a shifter and the like for executing sub-code.

And the integer operation unit 117 is so configured that two instructions can be executed i parallel with each other by using the main operation device and the sub-operation device. The sub-operation device can also be controlled by a microprogram. In the integer operation unit 117, a processor status word (PSW) including a flag which is varied by the result of integer operation and the bits which decide the external interruption mask level, and the buffer memory control register are included.

When an operand to be calculated by an instruction is an address or an immediate, the immediate or calculated address is inputted from the operand address calculation unit 115. Also, when an operand to be calculated by an instruction is data on the memory, its address calculated in the address calculation unit 115 is outputted to the operand access unit 120, and the operand fetched from a built-in data cache or the outside is inputted to the integer operation unit 117 through the DD bus 210.

In operation, in the case where the built-in data cache, external data caches 107, 108 or the main memory 109 must be read, the address is outputted to the operand access unit 120 through the AA bus 209 and target data is taken in From the DD bus 210, under the control of the microprogram. When it is necessary to store the operation result in the built-in data cache, external data caches 107, 108 or the main memory 109, the address is inputted through the AA bus 209 to the operand access unit 120, and the data through the bus 210 to the same, under the control of the microprogram.

When external interruption or exception is processed and the integer operation unit 117 and receives a new instruction address, the integer operation unit 117 outputs the new address to the instruction fetch unit 111 and the PC calculation unit 116.

(4.9) "Floating Point Operation Unit"

The floating-point operation unit 118 is controlled by the microprogram stored in a micro ROM of the second micro ROM unit 114, and executes operations necessary for realizing the function of each floating-point operation instruction, using the register file and operation device in the floating-point operation unit 118. Also, the floating-point operation unit is provided with a floating-point operation mode control register (FMC) which sets a mode of the rounding method of flowing-point operation and detection allowance of floating-point operation exception and with a floating-point operation status word (FSW) comprising status bits indicating generation states of flag for the floating-point operation result and of the floating-point exception.

When an operand to be calculated by an instruction is an immediate or data on the memory, the operand value is inputted to the floating-point operation unit 118 from the integer operation unit 117 through the bus 201 or the S2 bus 202.

In storing-operation, the floating-point operation unit 118 and the integer operation unit 111 operate in cooperation with each other. When it is necessary to store the operand in the built-in data cache, external data caches 107, 108 or the main memory 109, the floating-point operation unit 118 outputs data to the integer operation unit 117 through the DO bus 203 under the control of the microprogram. The integer operation unit 117 outputs an operand address through the AA bus 209 and operand data through the DD bus 210 to the operand access unit 120, respectively.

(4.10) "Operand Access Unit"

An operand access unit 120 includes the operand address translation mechanism, the built-in data cache, a data TLB, a pre-fetch data buffer, a store buffer and an operand breakpoint register and their control units. In loading-operation of data, a logical address of data to be loaded outputted from the operand address calculation unit 115 or the integer operation unit 117 to the AA bus 209 is converted into a physical address, thereby data is fetched from the built-in data cache and is outputted to the integer operation unit 117.

When cache miss occurs at the built-in data cache, the physical address is outputted to the address input/output unit 119, and the data access to the outside is required and data inputted through the data input/output unit 121 is registered in the built-in data cache. When storing the data, the logical address of data to be stored outputted from the integer operation unit 117 is converted into the physical address, and data outputted from the integer operation unit 117 or the floating-point operation unit 118 is stored in the built-in data cache, and the physical address is outputted to the address input/output unit 119 through the store buffer and the data is outputted to the outside through the data input/output unit 121. When a miss occurs in the storing operation, the data is not updated.

In the store buffer, data to be stored and its address, and more over, the PC value of the instruction having executed the storing operation are managed in a set. The storing operation in the store buffer is managed in a first-in first-out (FIFO) manner.

Address translation by paging for the data TLB miss and the update of the data TLB are also performed by the control circuit in the operand access unit 120. It is also checked whether or not the memory access address is in an I/O area mapped in the memory.

When the data buffer is made to be operated as the built-in data cache, in the case where the data processor 100 of the present invention is under a bus watching mode, the entry of the built-in data cache hit by the physical address inputted through the address input/output unit 119 is invalidated.

(4.11) "Address Input/Output Unit"

The address input/output unit 119 outputs the address outputted from the instruction fetch unit 111 and the operand access unit 120 to the outside of the data processor 100 of the present invention. The address is outputted in accordances with a bus protocol defined in the data processor 100 of the present invention. The bus protocol is controlled by an external bus control circuit in the address input/output unit 119. In the external bus control circuit, page fault exception, bus access exception and external interruption are also received.

When external device other than the data processor 100 of the present invention is a bus master and the data processor 100 of the present invention is under the bus watching mode, the address outputted on the address bus 101 is taken in when the external device executes the data write cycle, and transfers it to the instruction fetch unit 111 and the operand access unit 120.

(4.12) "Data Input/Output Unit"

The data input/output unit 121, at operand loading operation, fetches data from the data bus 102 and transfers it to the operand access unit 120, and at operand storing operation, outputs the operand outputted from the operand access unit 120 to the data bus 102.

As the accessing methods of the data caches 107, 108, there are a single access mode in which a 64-bit data is accessed for one address, and a quad access mode in which four 64-bit data are accessed continuously for one address, and in either case, the data input/output unit 121 controls the input and output of the data between the operand access unit 120 and the external memory.

(5) "Pipeline Processing"

The data processor 100 of the present invention performs the pipeline processing of the instruction and operates very efficiently, by effective accessing of the memory using various buffer memories, the instruction bus 103 and the data bus 102. Here, a pipeline processing method of the data processor 100 of the present invention will be described.

(5.1) "Pipeline Processing Mechanism"

A pipeline processing mechanism of the data processor 100 of the present invention is constituted as shown schematically in FIG. 27.

The pipeline processing is executed in six-stage configuration of an instruction fetch stage (IF stage) 131 which prefetches instructions, a decoding stage (D stage) 132 for decoding the instruction, an operand address calculation stage (A stage) 133 which performs address calculation of the operand, an operand fetch stage (F stage) 134 which performs the micro ROM access (particularly referred to as an R stage 137) and the operand prefetch (particularly referred to as an OF stage 138), an execution stage (E stage) 135 for executing the instruction and a store stage (S stage) 136 which stores the memory operand. In addition, in the S stage 136, there is a three step store buffer.

Each stage operates independently of the other stages and, theoretically, the six stages operate completely independently.

Each stage other than the S stage 136 performs one processing in one clock cycle at a minimum. The S stage 136 performs one operand storing in two clock cycle at a minimum. But, until the store buffer becomes full, the S stage 136 can receive one storing in every clock cycle. Accordingly, theoretically, the pipeline processing is proceeded in every clock cycle.

In the data processor 100 of the present invention, though there are instructions which can not be processed by only one basic pipeline processing such as the memory-memory operation or the memory indirect addressing, it is so constituted that the balanced pipeline processing can also be performed for these instruction if possible. For the instruction having a plural number of memory operands, the data processor 100 of the present invention performs pipeline processing by decomposing it into plural pipeline processing unit (step code) at the decoding stage in response to the number of memory operands.

Information given to the D stage 132 from the IF stage 131 are instruction code. Informations given from the D stage 132 to the A stage 133 are the one (referred to as a D code 141) relating to the operation specified by the instruction, the one (referred to as an A code 142) relating the operand address calculation and a program counter value (PC) of the instruction being processed. In the A code 142, information relating to pre-jump processing performed at the A stage 133 is also included.

Informations given to the F stage 134 from the A stage 133 are, an R code 143 including the entry address of the microprogram routine and parameters to the microprogram, an F code 144 including the operand address and accessing indicating information, and the program counter (PC) value of the instruction being processed. Informations given to the E stage 135 from the F stage 134 are, an E code 145 including operation control information and literal, S code 146 including the operand and its address and the program counter (PC) value of the instruction being processed. The S codes 146 comprises an address and data.

Information given to the S stage 136 from the E stage 135 are W code 147 which is the operation result to be stored and the PC value of the instruction being outputted the operation result. The W codes 147 comprises an address and data.

An EIT (Exception, Interruption and Trap) detected at the stages before the E stage 135 does not start EIT processing until the code thereof reaches the E stage 135. It is because that, only the instruction processed at the E stage 135 is the instruction at the execution step, and the instruction processed at the IF stage 131 through F stage 134 is still not in the execution step. Accordingly, detection of the EIT before the E stage 135 is registered in the step code and just transmitted to the next stage. The EIT detected at the S stage 136 is received at the time point when execution of the instruction being processed in the E stage 135 is completed or at cancellation of the processing of the instruction, and restored to the E stage 135 for processing.

(5.2) "Processings in Each Pipeline Stage"

Figure 52:
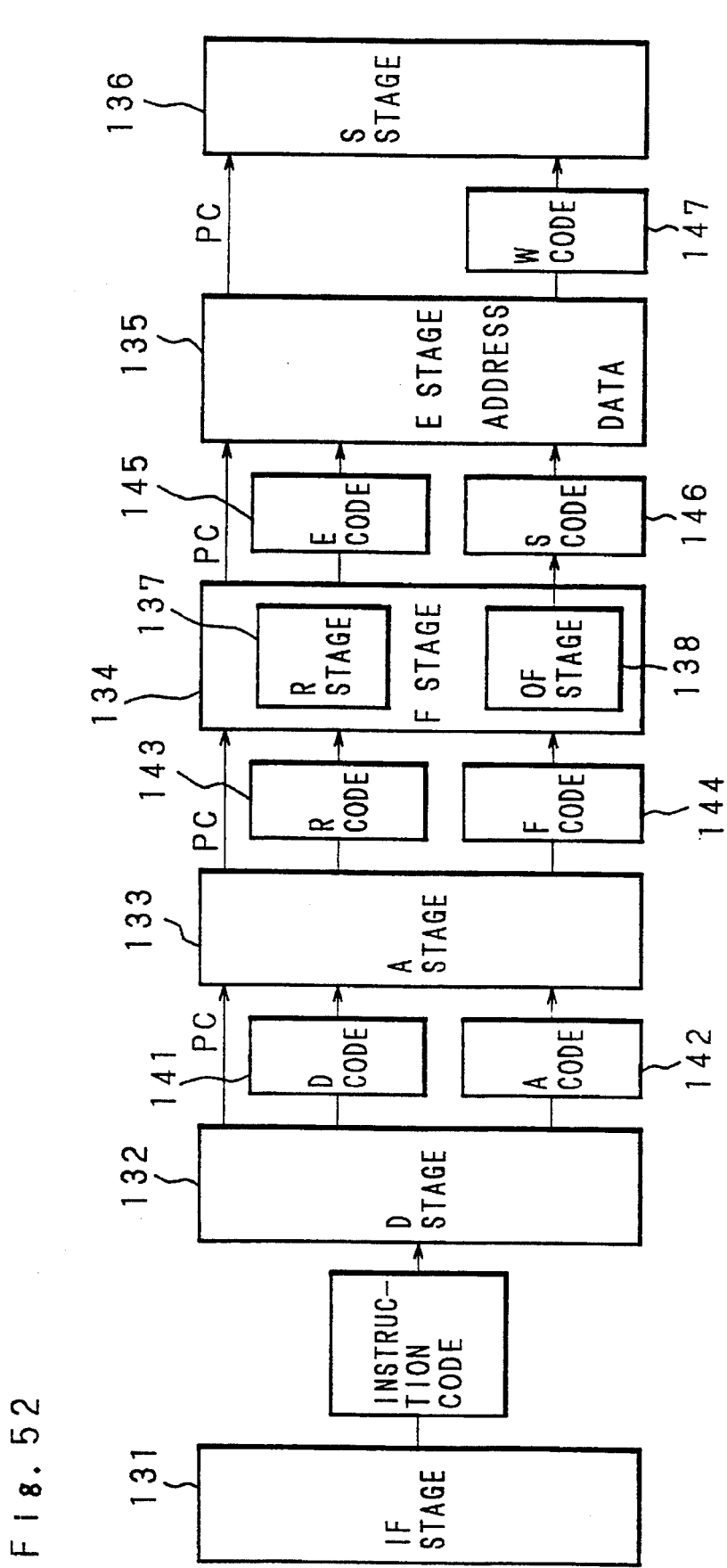
FIG. 52 is a schematic diagram showing a pipeline configuration based upon an example of one embodiment of a data processor of the present invention.

The input/output step codes to respective pipeline stages are named, as shown in FIG. 52, for the sake of convenience. In the step codes, there are two kinds, the one which becomes the entry address of micro-ROM or its parameters for the E stage 135, and the other which becomes the operand to be processed at the E stage 135. Between the D stage 132 and the S stage 136, the PC value of the instruction being processed is received and given.

(5.2.1) "Instruction Fetch Stage"

At the instruction fetch stage (IF stage) 131, the instruction fetch unit 111 is operated. The IF stage 131 fetches the instruction from the built-in instruction cache or the outside and inputs it to an instruction queue, and outputs the instruction code to the D stage 132 in a unit of 0 to 8 bytes. Input to the instruction queue is performed in a unit of aligned 4 bytes.

When the instruction from the outside under a standard access mode, it requires at least 2 clock cycles for the aligned 4 bytes. Under a quad access mode, at least 5 clock cycles are necessary for 16 bytes. When the built-in instruction cache is hit, fetch is possible in one clock cycle for the aligned 16 bytes. Output unit of the instruction queue is variable by every 2 bytes, and can be outputted to 8 bytes in 1 clock at a maximum. Right after the jump, the instruction queue may be bypassed and the 2-byte or 4-byte instruction code can be transferred directly to the instruction decoder.

Translation of the logical address of the instruction into the physical address, control of the built-in instruction cache and instruction TLB, management of the prefetch target instruction address, and control of the instruction queue are performed at the IF stage 131.

In addition, the EIT detected at the IF stage 131 includes an address translation exception relating to the instruction fetch page fault exception and bus access exception.

(5.2.2) "Instruction Decoding Stage"

The instruction decoding stage (D stage) 132 decodes an instruction code inputted from the IF stage 131. The instruction code is decoded once for one clock using the OPDEC1, OPDEC2, addressing mode decoder, SUBDEC1 and SUBDEC2 of the instruction decoding unit 112, and the instruction codes of 0 to 8 bytes are consumed at one decoding processing. The instruction succeeding the instruction decoded in the OPDEC1 or OPDEC2 is decoded in the SUBDEC1 or SUBDEC2, and when an interference does not occur related to the register operand, two instructions are processed at one decoding processing (the decade result by the OPDEC1 or OPDEC2 is called a main code, the decade result by the SUBDEC1 or SUBDEC2 is called a sub-code).

In some instructions, there is the case that a step code is generated without consuming the instruction code after a second decoding cycle of one instruction. An A code 142 which is address calculating information and a D code 141 which is an intermediate decade result of the operation code are outputted to the A stage 133 at one decoding.

At the D stage 132, the PC processing unit 116 is controlled and output control of the instruction code from the instruction queue is also performed. At the D stage 132, pre-jump processing for the unconditional branch instruction and the return instruction from the subroutine is also performed. For the unconditional branch instruction to which pre-jump processing is performed, neither D code 141 nor A code 142 is outputted and the instruction processing is finished at the D stage 132.

However, when the jump target address is odd numbers or the debug event detecting mode (DBC, D=1 or PSW, DB=1), the D code 141 and A code 142 are outputted for the unconditional branch instruction.

In exception detected at the D stage 132, there is an odd address jump trap related to the prediction instruction exception and pre-jump.

(5.2.3) "Operand Address Calculation Stage"

Processings of an operand address calculation stage (A stage) 133 are roughly divided into two. First is the post-stage decoding processing of the operation code using the second decoder of the instruction decoding unit 112, and second one is the calculation processing of the operand address in the operand address calculation unit 54.

In the post-stage decoding processing of the operation code, the D code 141 is inputted and the R code 143 including the address of the write reservation of the register and memory, the entry address of microprogram routine, and parameters for the microprogram is outputted. Incidentally, the write reservation of the register and memory is for preventing, when the content of the register or the memory referred at address calculation is rewritten by the preceding instruction in the pipeline, the wrong address calculation.

In the operand address calculation processing, the A code 142 is inputted and in accordance with the A code 142, the operand address is calculated in the operand address calculation unit 54 to output the calculation result as the F code 144. At this time, the write reservation is checked when the register is read in connection with the address calculation, and when the preceding instruction has been indicated that there is the reservation because the writing processing for the register or memory is not completed, the following instruction is in the waiting states until the writing processing of the preceding instruction is completed at the E stage 135.

At the A stage 133, for the jump instruction which has not pre-jumped at the D stage 132, the pre-jump processing is performed. For a jump to the register indirect address, pre-jumping is performed at the A stage 133. To an unconditional jump instruction having performed pre-jumping, the R code 143 are the F code 144 are not outputted, and the processing of the instruction is finished at the A stage 133. But, when the jump target address is an odd number, or the debug event detection mode (DBC.D=1 or PSW.DB=1), the R code 143 and the F code 144 are outputted to the unconditional jump instruction.

The EIT detected at the A stage 133 includes a reservation instruction exception, a privileged instruction exception, an odd number address jump trap relating to the pre-jump, an address translation exception relating to indirect reference, a page fault exception, a bus access exception. Also, a comparison checking of the indirect reference address and the operand breakpoint is performed at the A stage 133.

(5.2.4) "Micro ROM Access Stage"

Processings of an operand fetch stage (F stage) 134 are also divided roughly into two. First is the access processing of the micro ROM, particularly referred to as an R stage 137, and second one is the operand prefetch processing, particularly referred to as an OF stage 138. The R stage 137 and the OF stage 138 do not necessarily operate simultaneously, the operation timing being different from each other depending upon miss and hit of the data cache, and miss and hit of data TLB.

The micro ROM access processing which is the processing at the R stage 137 is the micro ROM access and the microinstruction decode processing for generating the E code 145, which is the execution control code used in execution at the next E stage 135 for the R code 143.

In the case where one processing for one R code is decomposed into two or more microprogram steps, there may be a case where the first micro ROM unit 113 and the second micro ROM unit 114 are used at the E stage 135 and the next R code 143 is in the waiting state of micro ROM access. Micro ROM access for the R code 143 is performed when it is not performed at the E stage 135. In the data processor 100 of the present invention, since a number of integer operation instructions are executed in one microprogram step and many floating-point operation instructions are executed in two microprogram steps, in practice, there is a high frequency of performing of the micro ROM access sequentially for the R code 143.

When two instruction are decoded in parallel with each other and the sub-code is effective, the decode result at the sub-decoder is effective. When a processing for one R code is divided into two or more microprogram steps, the E code 145 relating to the sub-code at the last microprogram step is effective.

At the R stage 137, a breakpoint check relating to the execution PC is performed.

(5.2.5) "Operand Fetch Stage"

The operand fetch stage (OF stage) 138 executes the operand prefetch processing of the aforesaid two processings performed at the F stage 134.

At the OF stage 138, the logical address of the F code 144 is translated into the physical address by data TLB, and by the physical address, the built-in data cache or the external memory is accessed to fetch the operand, which is combined with the logical address transferred as the F code 144 and outputted as the S codes 146.

At one F code 144, the operand may cross an 8-byte boundary, but the operand fetch equal to or less than 8 bytes is fetched. At the F code 144, selection whether or not to access the operand is involved, and when the operand address itself or the immediate calculated at the A stage 133 is transferred to the E stage 135, the operand prefetch is not performed and the content of F code 144 is transferred as the S code 146.

The EIT detected at the OF stage 138 includes an address translation exception relating to operand prefetch, page fault exception and bus access exception.

(5.2.6) "Execution Stage"

The execution stage (E stage) 135 operates with the E code 145 and the S code 146 as inputs. The E stage 135 is the instruction executing stage, thus the processings performed at stages before and at the F stage 134 are all pre-processings for the E stage 135. When a jump is performed or the EIT processing is started at the E stage 135, the processings from the IF stage 131 to the F stage 134 are all repealed. The E stage 135 is controlled by the microprogram and executes the instruction by executing a series of microinstructions from the entry address of the microprogram routine specified in the E code 145.

In the E code 145, there are a code (particularly referred to as an EI code) which controls the integer operation unit 117, and a code (particularly referred to as an EF code) which controls the floating-point operation unit 118. The EI code and EF code are able to outputted independently, and at this time, at the E stage 135, the integer operation unit 117 and the floating-point operation unit 118 operate in parallel. For example, when executing the floating-point instruction having no memory operand in the floating-point operation unit 118, this operation is executed independently from the operation of the integer operation unit 117.

In both the integer operation and the floating-point operation, read-out of the micro ROM and execution of the microinstruction are executed in the pipeline processing. Accordingly, when the branch occurs in the microprogram, there is a space of one microstep, however, it is so configurated that an effective processing can be performed in this spaced step. In the E stage 135, the write reservation for the register or memory performed at the A stage 133 is released after writing the operand.

When two instructions are decoded in parallel with each other, and sub-code is effective, the two instructions are executed in parallel by the main operation device and the sub-operation device. When a processing for one R code is divided into two or more microprogram steps, operation relating to the sub-decode is executed in the last microprogram step.

Each of the interruption is directly received by the E stage 135 at the timing of the instruction end, and a processing necessary is executed by the microprogram. When the debug event is detected in a mode which detects in the DBC register, and the SDBT or the DDBT is actuated. The other EIT processings are performed by the microprogram at the E stage 135.

When the operation result must be stored in the memory, the E stage 135 outputs the W code 147 and the program counter value of the instruction performing the storing processing to the S stage 136.

(5.2.7) "Operand Store Stage"

The operand store stage (S stage) 136 translates the logical address of the W code 147 into the physical address by data TLB, and stores the data of the W code 147 in the built-in data cache by address obtained in the above. Simultaneously, the W code 147 and the value of the program counter are inputted to the store buffer, and processes to store the data of the W code 147 to the external memory using the physical address outputted from the data TLB.

The operation of the S stage 136 is performed in the operand access unit 120, and also the address translation processing and the permuting processing of the built-in data buffer, in the case where a miss of the data TLB or the built-in data cache occurred.

When an EIT is detected at the store processing of the operand, while holding the W code and the program counter value in the store buffer, the EIT detection is noticed to the E stage 135.

(5.3) "State control of Each Pipeline Stage"

Each pipeline stage includes an input latch and an output latch, and basically, operates independently of the other stages. Each of the stages, when the processing performed one before is completed, transfers the processing result to the input latch of the next stage from the own output latch, and starts the next processing when all of the input signals necessary for the next processing are ready in the input latch of the own stage.

That is, each stage starts the next processing when all of the input signals for the next processing outputted from the preceding stage become effective, and the processing result at that time point is transferred to the input, latch of the later stage, and the output latch becomes empty.

In other words, all input signals must be ready at the timing immediately before each of the stages starts the operation. In the case where the input signals are not ready, this stage becomes the waiting state (input waiting). When transferring from the output latch to the input latch of the next stage, the input latch of the next stage must be empty. Even in the case where the next stage input latch is not empty, the pipeline stage is in the waiting state (output waiting). When the cache or the TLB misses or data interference occurs between the instructions being processed in the pipeline, a plural number of clocks are necessitated for the processing of one stage, results in delay of the pipeline processing.

In executing the BRA instruction and JMP instruction, when the jump target address is the odd number or the debug event detecting mode (DBC, D=1, or PSW, DB=1), though a step code is outputted after finishing the pre-jump processing for the instruction, in other cases the step code is not outputted after finishing the pre-jump processing and instruction processings are finished at that stage. In executing the NOP (No operation) instruction, though the D code 141 and A code 142 are outputted for the NOP instruction at debug event detecting mode, in other cases the processings are finished at the D stage 132. Odd address jump trap (OAJT), SDBT and DDBT start or trace execution (execute sequentially for every instruction) control is performed in the E stage 135. Address comparison related to the PC break point is performed in the R stage.

Thus, though valid processings are not performed for the BRA, JMP and NOP instructions in the E stage 153, when the jump target address at pre-jump is the odd number or the debug event detecting mode (DBC, D=1, or PSW, DB=1), processings in the E stage 135 are performed.

(6) "Detailed Operation of Pre-jump Processing Mechanism"

In the data processor 100 of the present invention, jump processings performed before the E stage 135 are generally called the pre-jump processings. In the following description, the instruction generating the jump is generally called the jump instruction, and the jump instruction whose jump target address is limited to the PC relative mode is defined as the branch instruction.

As shown in Table 1, the instructions which are subject to the pre-jump processing are roughly classified into three. First one is the unconditional jump instruction which jumps surely to the designated jump target. As the competent instructions, there are BRA, BSR, JMP and JSR instructions. Second one is the conditional branch instruction which is dependent on a flag state at execution whether to branch to the branch target address or not. As the competent instructions, there are the Bcc, ACB, SCB and FBcc instructions. Third one is the return instruction from a subroutine. As the competent instructions, there are RTS and EXITD instructions.

TABLE 1

| SORT | CORRESPONDING INSTRUCTION |
|---|---|
| UNCONDITIONAL JUMP INSTRUCTION | BRA, BSR, JMP, JSR |
| CONDITIONAL BRANCH INSTRUCTION | Bcc, ACB, SCB, FBcc |
| SUBROUTINE RETURN INSTRUCTION | RTS, EXITD |

In the data processor 100 of the present invention, all instructions shown in Table 1 are subject to pre-jump processing.

As to the unconditional jump instruction, an unconditional pre-jump is performed. Furthermore, there are the case where the unconditional pre-jump is performed at the D stage 132 and the case where the unconditional pre-jump is performed at the A stage 133. As to the conditional jump instruction, a branch prediction is performed, and when it is predicted to branch, a conditional pre-branch is performed and when it is predicted not to branch, a branch target instruction pre-fetch is performed.

A branch prediction method of the conditional branch instruction of the data processor 100 of the present invention can be classified into three cases; predicting statically to branch, predicting statically not to branch and predicting dynamically according to the past branch career as shown in Table 2.

However, it is possible to set to predict statically that the conditional branch instruction does not branch by the control register in the integer operating unit 117.

TABLE 2

| SORT | CORRESPONDING INSTRUCTION |
|---|---|
| predict to branch | ACB, SCB |
| predict not to branch | FBcc |
| dinamic prediction | Bcc |

A conditional pre-branch is performed at the D stage 132. The branch target instruction pre-fetch is performed in two cases, one at the D stage 132 and the other at the A stage 133. As to the subroutine return instruction, pre-return processing is performed in the D stage 132 using a PC stack 4 in which return target address is registered at subroutine call.

Classifications of the jump instruction which is subject to the processing method are shown in Table 3. The method of pre-jump processings is described in the following. However, as to the pre-return processing, since it is not so important in the present invention, it is not described particularly.

TABLE 3

| PROCESSING SORT | PROCESSING STAGE | CORRESPONDING INSTRUCTION (CONDITION) |
|---|---|---|
| UNCONDITIONAL PREJUMP | D STAGE | BRA, JSR, JMP, JSR (absolute, relative mode) |
| | A STAGE | JMP, JSR (except absolute, relative mode) |
| CONDITIONAL JUMP | D STAGE | Bcc (predict to branch) ACB, SCB |
| BRANCH TARGET INSTRUCTION PRE-FETCH | D STAGE | Bcc (predict not to branch) |
| | A STAGE | FBcc |
| PRE-RETURN | D STAGE | RST, EXITD |

Figure 53:
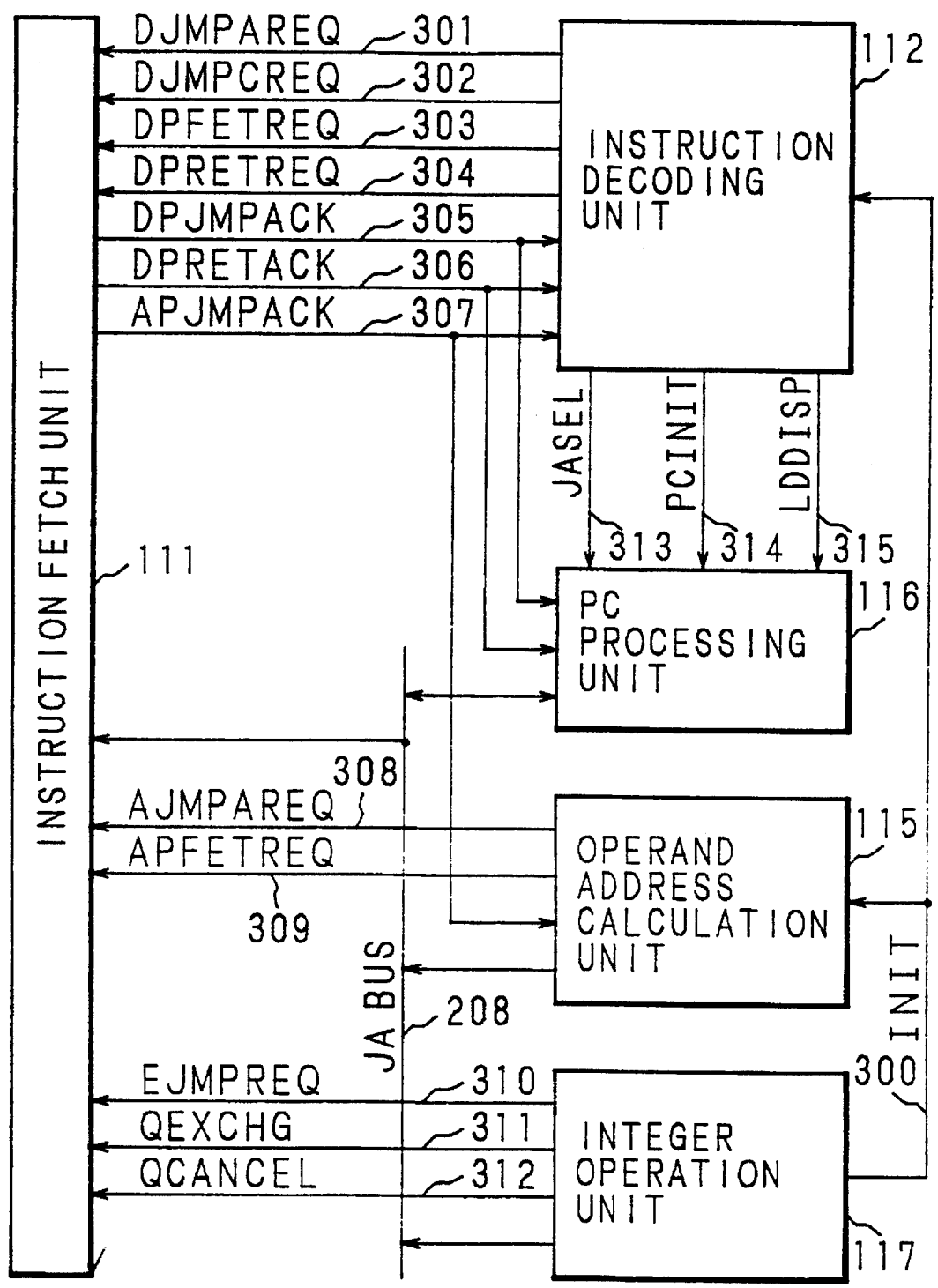
FIG. 53 is a block diagram showing a relation of delivering and receiving of control signals relating to jump processing and jump target address between each block based upon an example of one embodiment of a data processor of the present invention.

FIG. 53 is a block diagram showing, pre-jump processings between the instruction fetch unit 111, instruction decoding unit 112, PC processing unit 116, operand address calculation unit 115 and integer operating unit 117, or control signals associated with the instruction processing sequence control of the execution stage jump and the like, and relationships of giving and receiving jump target addresses.

(6.1) "D Stage Unconditional Pre-jump"

In the BRA instruction, BSR instruction, JMP instruction and JSR instruction whose jump target address is shown in the absolute mode or PC relative mode, unconditional pre-jump processing is performed at the D stage 132. In processing these instructions, the valid jump target address is generated in the branch target address calculation unit 1 is an instruction decoding cycle.

The instruction decoding unit 112, when decoding these instructions, transmits a D stage unconditional pre-jump request to the instruction fetch unit 111 by making a DJMPAREQ signal to be "1". The instruction decoding unit 112 outputs a JASEL signal 313 for selecting a storing position of jump target address to be outputted to the JA bus 208 to the PC processing unit 116. The instruction fetch unit 111 arbitrates jump requests from respective stages, and when the unconditional pre-jump request at the D stage can be accepted, transmits to the instruction decoding unit 112 and the PC processing unit 116 that the D stage unconditional pre-jump request is accepted, by making a DPJMPACK signal 305 to be "1". The instruction decoding unit 112 maintains the DJMPAREQ signal 301 at "1" till the DPJMPACK signal 305 becomes "1".

When the DPJMPACK signal 305 becomes "1", in the PC processing unit 116, an output latch value in the branch target address calculation unit 1 selected by the JASEL signal 313 is outputted to the JA bus 208 and transferred to the instruction fetch unit 111.

The instruction fetch unit 111 starts instruction fetching processing according to the jump target address taken in from the JA bus 208, and takes the fetched instruction into an instruction queue on the side being outputted to the instruction decoding unit 112. The instruction fetch unit 111 initializes an input/output pointer of the instruction queue and an instruction queue fetch address register, according to the jump target address taken in from the JA bus 208.

The instruction decoding unit 112 makes a PCINIT signal to be "1" by the fact that the DPJMPACK signal 305 becomes "1" so as to instruct the PC processing unit 116 to initialize the PC value. When the PCINIT signal 314 becomes "1", the PC processing unit 116 takes the value on the JA bus 208 into the TPC 27 and DPC 29 for initialization. After these processings, the instruction decoding unit 112 is in instruction waiting state and decodes the jump target instruction as soon as the valid instruction is fetched and transferred from the instruction fetch unit 111.

The instruction decoding unit 112 judges whether or not the jump address is the odd number, and transfers information showing whether a jump occurs to the odd address or not to the D code 141.

In the BRA instruction and the JMP instruction in which the jump target address is shown in the absolute mode or PC relative mode, when the jump target address is not the odd number nor the debug event detecting mode (DBC, D=1, or PSW, DB 1), the D code 141 and A code 142 are not outputted for the BRA and JMP instructions, and instruction processing is finished at the D stage 132. When the jump target address is the odd number or the debug event detecting mode, a step code of no operation (NOP) is outputted.

In this way, since processings of the BRA and JMP instruction are usually finished at the D stage 132, when processing of the preceding instruction in a pipeline is delayed, it is valid because the processing time of the BRA and JMP instructions is zero at the E stage 135.

At the E stage, an odd address jump is detected. Information showing whether or not the odd address jump is detected at pre-jump processing is sent via the D code 141, R code 143 and E code 145. When the odd address jump has been detected at pre-jump processing, processing related to the odd address jump trap is performed at the time point when processing related to the jump instruction is finished.

(6.2) "A stage Unconditional Pre-jump"

In processing the JMA and JSR instructions in which the jump target address is shown in addressing modes other than the absolute mode and PC relative mode, the unconditional pre-jump is processed at the A stage 133.

When the instruction decoding unit 112 decodes the instructions, information showing that the unconditional pre-jump is to be made at the A stage 133 is sent to the operand address calculation unit 115 as the A code 142. In this case, since the pipeline processing sequence is changed, the instruction decoding unit 112 stops the decoding processing temporarily. In processing the instructions, the jump target address is calculated in the operand address calculation unit 115. It is also possible to designate the jump target address using the chained mode.

The operand address calculation unit 115 transmits an A stage unconditional pre-jump request to the instruction fetch unit 111 by making the AJMPAREQ signal 308 to be "1" in a cycle where a valid jump target address is calculated. The instruction fetch unit 111 arbitrates jump requests from respective stages, and when the A stage unconditional pre-jump request can be accepted, transmits to the instruction decoding unit 112 and PC processing unit 116 that the A stage unconditional pre-jump request has been accepted, by making the APJMPACK signal 307 to be "1".

The operand address calculation unit 115 maintains the AJMPAREQ signal 308 at "1" till the APJMPACK signal becomes "1". In the operand address calculation unit 115, when the APJMPACK signal 307 becomes "1", a value of the AO latch 65 showing the jump target address is outputted to the JA bus 208 and transferred to the instruction fetch unit 111. The instruction fetch unit 111 starts instruction fetching according to the jump target address taken in from the JA bus 208, and takes the fetched instruction into an instruction queue on the outputting side to the instruction decoding unit 112. The instruction fetch unit 111 also initializes the input/output pointer of the instruction queue and the instruction queue fetch address register, according to the jump target address taken in from the JA bus 208.

The instruction decoding unit 112 restarts instruction decoding which has been interrupted, by the fact that the APJMPACK signal 307 becomes "1", and makes the PCNIT signal 314 to be "1" to instruct initialization of the PC value to the PC processing unit 116. When the PCINIT signal 314 becomes "1", the PC processing unit 116 takes a value on the JA bus 208 into the TPC 27 and DPC 29 for initialization. After these processings, the instruction decoding unit 112 is in instruction wait state, and decodes the jump target instruction as soon as the valid instruction code is fetched and transferred from the instruction fetch unit 111.

The operand address calculation unit 115 judges whether or not jump address is the odd address, and transfers information showing whether a jump occurs to the odd address or not as the R code 143.

In processing the JMP instruction in which the jump target address is shown in the mode other than the absolute mode or the PC relative mode, when the jump target address is not the odd number nor the debug event detecting mode (DBC, D=1 or PSW, DB=1), neither the R code 143 nor the F code 144 is outputted for the JMP instruction, and instruction processing is finished at the A stage 133. When the jump target address is the odd number or the debug event detecting mode, a step code of no operation (NOP) is outputted.

In this way, since processing of the JMP instruction is usually finished at the A stage 133, when processing of the preceding instruction in a pipeline is delayed, it is valid because the processing time of the JMP instruction at the E stage 135 is zero.

At the E stage 135, an odd address jump is detected. Information showing whether or not the odd address jump is detected at pre-jump processing is sent via the R code 143 and E code 145. When the odd address jump has been detected at the pre-jump processing, processing related to the odd address jump trap is performed at the time point when processing related to the jump instruction is finished.

(6.3) "D stage Conditional Pre-jump"

When it is predicted to branch in processing the Bcc instruction and when the ACB instruction and SCB instruction are processed, conditional pre-jump processing is performed at the D stage 132. In the conditional pre-jump, following processings vary according to the fact that whether or not the branch target address is calculated and that in which of the four address 5 to 8 of the branch target address calculation unit 1, the aforesaid calculation is performed in a cycle wherein the instruction decoding unit 112 takes in branch displacement.

When the branch target address is calculated in the cycle wherein the branch displacement is taken in, the instruction decoding unit 112, after decoding the instructions, transmits the D stage conditional pre-jump request to the instruction fetch unit 111 by making the DJMPCREQ signal 302 to be "1". The instruction decoding unit 112 outputs the JASEL signal 313 for selecting a storing position of the jump target address to be outputted to the JA bus 208 to the PC processing unit 116.

Meanwhile, when the branch target address can not be calculated in the cycle wherein the branch displacement is taken in, only cut-out processing of the branch displacement is performed in that cycle. The cut-out branch displacement is sent to the branch target address calculation unit 1 via the DISP bus 205. The LDDISP signal 315 is maintained at "1". In this cycle, the addition result by the PC adder 23 is never written back to the DPC 29, which holds the PC value of the jump instruction.

The branch target address calculation unit 1 calculates the branch target address in the next cycle. By the fact that the LDDISP signal 315 is "1", the branch displacement is taken into the input latch 12 of the fourth adder 8 from the DISP bus 205 in place of the II bus 204. The branch displacement and the value of DPC 29 are added in the fourth adder 8, and the calculated branch target address value is taken into the output latch 20. The instruction decoding unit 112 transmits the D stage conditional pre-jump request to the instruction fetch unit 111, by making the DJMPCREQ signal 302 to be "1" in this cycle. A value selecting the output latch 20 is outputted to the PC processing unit 116 as the ASEL signal 313.

Processings hereinafter are same in all cases.

The instruction fetch unit 111 arbitrates jump requests from respective stages, and when the D stage conditional pre-jump request can be accepted, by making the DPJMPACK signal 305 to be "1", transmits to the instruction decoding unit 112 and PC processing unit 116 that the D stage conditional pre-jump request is accepted.

The instruction fetch unit 111 includes two instruction queues and one address saving mechanism (QINPCC) 88, and is constituted such that three sequence information related to two conditional branch instructions can be held. When three sequence information is taken in already, the D stage conditional pre-jump request is not accepted till branch prediction hit-miss of the preceding conditional branch instruction is transmitted from the integer operating unit 117. The instruction decoding unit 112 maintains the DJMPCREQ signal 302 at "1" till the DPJMPACK signal 305 becomes "1".

When the DPJMPACK signal 305 becomes "1", in the PC processing unit 116, a value of output latch in the branch target address calculation unit 1 selected by the JASEL signal 313 is outputted to the JA bus 208 and transferred to the instruction fetch unit 111.

When the instruction fetch unit 111 is holding only one sequence information, the instruction fetch unit 111 switches the instruction queue. With maintaining the contents of the instruction queue A 83 or instruction queue B 84 used at present, values of the two registers QINPCA 86 or QINPCB 87 holding the instruction queue fetch address and an input/output pointer value of the instruction queue, the instruction fetch unit 111 starts instruction fetch according to the jump target address taken in from the JA bus 208, and takes the fetched instruction into the instruction queue on the unused side so as to output to the instruction decoding unit 112. Also, according to the jump target address taken in from the JA bus 208, it initializes the input/output pointer of the instruction queue on the unused side and the instruction queue fetch address register. The instruction fetch unit 111 fetches the sequence instruction on the branch target instruction side preferentially, and by utilizing a period during which the instruction queue is full, performs instruction fetch of the sequence on the side succeeding the conditional branch instruction.

When the instruction fetch unit 111 holds two sequence information already, the instruction fetch unit 111 saves the jump target address taken in from the JA bus 208 in the QINPCC 88 and input/output pointer unit 85, and brings switching processing of the instruction queue in the pending state. When the branch condition of the preceding conditional branch instruction is fixed and the branch prediction is true, the pending processing is restarted. When the prediction is missed, the address value having been saved in the QINPCC 88 is also voided.

The instruction decoding unit 112, by the fact that the DPJMPACK signal 305 becomes "1", makes the PCINIT signal 314 to be "1" and instructs the PC processing unit 116 to initialize the PC value. When the PCINIT signal 314 becomes "1", the PC processing unit 116 takes the value on the JA bus 208 into the TPC 27 and DPC 29 for initialization. The instruction decoding unit 112, after performing these processings, becomes the instruction code waiting state, and decodes the jump target instruction as soon as the valid instruction code is fetched and transferred from the instruction fetch unit 111.

The instruction decoding unit 112 judges whether the jump address is the odd address or not, and transfers information showing whether or not a jump occurs to the odd address as the D code 141.

In the instruction fetch unit 111, though the sequence on the predicted side is fetched preferentially till the conditional branch instruction which has performed conditional pre-jump processing is processed at the E stage 135 and the branch condition is fixed, during the period in which the instruction queue is full, the original sequence is also fetched continuously.

At processing the instruction which has performed the conditional pre-jump processing, since it is necessary to initialize the PC calculation unit 2 when the branch prediction is missed, next instruction address of the conditional branch instruction is calculated at the A stage 133. This processing is implemented by transferring the value of ATPC 28 to the integer operating unit 117 via the IX bus 206, address adder 61 and AO bus 216.

Judging the branch condition of the conditional branch instruction which has performed the conditional pre-jump processing is performed at the E stage 135. When the branch prediction is right, the integer operating unit 117, by making the QCANCEL signal to be "1", instructs the instruction fetch unit 111 to void sequence information succeeding the conditional branch instruction. When the QCANCEL signal 312 becomes "1", the instruction fetch unit 111 releases the instruction queue on the sequence side succeeding the conditional branch instruction. When the address has been saved in the QINPCC 88, information related to the instruction queue on the side voided by the information is initialized. Instruction being processed in the pipeline is processed continuously as it is.

When the branch prediction is missed, switching processing of the instruction queue is performed.

The integer operating unit 117, by making the QEXCHG signal 311 to be "1", informs the instruction fetch unit 111 that the branch prediction is missed. The integer operating unit 117 makes the INIT signal 300 to be "1" so as to void pipeline processings after the D stage 132, and outputs a PC value of the next instruction of the conditional branch instruction to the JA bus 208 so as to initialize the PC calculation unit 2. In respective stages after the D stage 132 of the pipeline mechanism, initialization takes place by the fact that the INIT signal 300 becomes "1".

When the QEXCHG signal 311 becomes "1", the instruction fetch unit 111 releases the instruction queue on the branch target sequence side, fetches on the sequence side succeeding the branch target instruction and sends the instruction code to the instruction decoding unit 112. When the address has been saved in the QINPCC 88, which is also voided. In many cases the instruction code is already taken into the instruction queue on the sequence side succeeding the conditional branch instruction.

The instruction decoding unit 112 performs initialization by the fact that the INIT signal 300 becomes "1", and instructs initialization of the PC calculation unit 2 by making the PCINIT signal 314 to be "1". When the PCINIT signal 314 becomes "1", the PC processing unit 116 takes the value on the JA bus 208 into the TPC 27 and DPC 29 for initialization.

At the E stage 135, an odd address jump is detected. Information showing whether or not the odd address jump has been detected at pre-jump processing is sent via the D code 141, R code 143 and E code 145. When the branch prediction is right and the odd address jump is detected at pre-jump processing, processing related to the odd address jump trap is performed at the time point when processing related to the jump instruction is finished. When the branch prediction is missed, even when the odd address jump is detected at pre-jump processing, the odd address jump is not processed.

(6.4) "D Stage Branch Destination Instruction Pre-fetch"

When it is predicted that a branch does not occur by the Bcc instruction, branch target instruction pre-fetch is processed at the D stage 132. In this case, the branch target address is calculated by either of four adders 5 to 8 of the branch address calculation unit 1 in an instruction decoding cycle.

The instruction decoding unit 112 decodes the Bcc instruction, and when it has been predicted that the branch does not occur according to the past branch career, by making the DPFETREQ signal 303 to be "1", transmits the D stage branch target instruction pre-fetch request to the instruction fetch unit 111. The instruction decoding unit 112 outputs the JASEL signal 313 for selecting a storing position of the jump target address outputted to the JA bus 208 to the PC processing unit 116.

The instruction fetch unit 111 arbitrates jump requests from respective stages, and when the D stage branch target instruction pre-fetch request can be accepted, by making the DPJMPACK signal 305 to be "1", transfer to the instruction decoding unit 112 and PC processing unit 116 that the D stage branch target instruction pre-fetch request has been accepted.

The instruction fetch unit 11I is designed to hold three sequence information related to two conditional branch instructions as aforementioned. When three sequence information is already taken in, the instruction fetch unit 111 does not accept the D stage conditional pre-jump request, till branch prediction hit-miss of the preceding conditional branch instruction is transmitted from the integer operating unit 117. The instruction decoding unit 112 maintains the DPFETREQ signal 303 at "1" till the DPJMPACK signal 305 becomes "1".

When the DPJMPACK signal 305 becomes "1", the PC processing unit 116 outputs an output latch value in the branch target address calculation unit 1 selected by the JASEL signal 313, and transfers it to the instruction fetch unit 111.

When the instruction fetch unit 111 holds only one sequence information, the instruction fetch unit 111 initializes the fetch address registers QINPCA 86 or QINPCB 87 of the instruction queue on the unused side and the input/output pointer value of the instruction queue, according to the jump target address taken in from the JA bus 208. The instruction queue A 83 or instruction queue B 84 used at present fetch the succeeding instruction and output the instruction which has been fetched in the instruction decoding unit 112. The instruction fetch unit ill fetches the sequence instruction on the side succeeding the conditional branch instruction preferentially, and by utilizing the period during which the instruction queue is full, fetches the branch target instruction.

When the instruction fetch unit 111 already holds two sequence information, the instruction fetch unit 111 saves the jump target address taken in from the JA bus 208 in the QINPCC 88 and input/output pointer unit 85, and leaves pre-fetch processing of the instruction queue in a pending state. When the branch condition of the preceding conditional branch instruction is fixed and the branch prediction is right, the pending processing is started again. When the prediction is missed, an address value having been saved in the QUINPCC 88 is also voided.

In the branch target instruction pre-fetch, since the sequence itself which performs pipeline processing does not change, the PC processing unit 116 does not initialize the PC value. The instruction decoding unit 112 processes the succeeding instruction. In this case, since the processing sequence is not switched, it is not judged in the instruction decoding unit 112 whether the jump address is an odd address or not.

Since it is necessary to initialize the PC calculation unit 2 when the branch prediction is missed, in the instruction having performed the branch target pre-fetch processing, the branch target address is recalculated at the A stage 133. This processing is implemented by adding a value of APC 30 inputted via the IX bus 206, and a value of branch displacement taken in from the instruction decoding unit 112 via the DISP bus 205 and DISP latch 67.

The branch condition of the conditional branch instruction which has performed branch target instruction pre-fetch processing is judged at the E stage 135. When the branch prediction is right, the integer operating unit 117, by making the QCANCEL signal 312 to be "1", instructs the instruction fetch unit 111 to void sequence information succeeding the branch target instruction. When the QCANCEL signal 312 becomes "1", the instruction fetch unit 111 releases the instruction queue on the sequence side succeeding the branch target instruction. When address is saved in the QINPCC 88, information related to the instruction queue on the side voided by the information is initialized. Instruction processing being processed in the pipeline is continued as it is.

When the branch prediction is missed, the instruction queue is switched.

The integer operating unit 117, by making the QEXCHG signal 311 to be "1", informs to the instruction fetch unit 111 that the branch prediction has been missed. The integer operating unit 117 makes the INIT signal 300 to be "1" so as to void the pipeline processing after the D stage 132, and outputs the branch target address to the JA bus 208 so as to initialize the PC calculation unit 2. Respective stages performing the pipeline processing after the D stage 132 of the pipeline processing mechanism are initialized by the fact that the INIT signal 300 becomes "1".

When the QEXCHG signal 311 becomes "1", the instruction fetch unit 111 releases the instruction queue on the sequence side succeeding the conditional branch instruction, fetches the sequence side succeeding to branch target instruction, and sends the instruction code to the instruction decoding unit 112. When address is saved in the QINPCC 88, which is voided. In most cases the instruction code is already fetched in the instruction queue on the sequence side succeeding the conditional branch instruction.

The instruction decoding unit 112 performs initialization by the fact that the INIT signal 300 becomes "1", and by making the PCINIT signal 314 to be "1", instructs initialization of the PC calculation unit 2. When the PCINIT signal 314 becomes "1", the PC processing unit 116 takes the value on the JA bus 208 into the TPC 27 and DPC 29 for initialization.

At the E stage, an odd address jump is detected. When the branch prediction is missed and the branch target address outputted to the JA bus 208 is the odd number, processing related to the odd address jump trap is performed at the time point when processing related to the jump instruction is finished. Even when the branch target address is the odd number and the branch has not practically occurred, the odd address jump is not processed.

(6.5) "A Stage Branch Destination Instruction Pre-fetch"

In processing the FBcc instruction, branch target instruction pre-fetch processing is performed at the A stage 133. A reason why the branch target instruction is pre-fetched at the A stage 133 and not at the D stage 132 is that, the branch target address can not be calculated by either of the four addressee 5 to 8 of the branch target address calculation unit 1 in an instruction decoding cycle by the FBcc instruction.

When the instruction decoding unit 112 decodes the FBcc instruction, information showing that the branch target instruction pre-fetch is performed at the A stage 133 is sent to the operand address calculation unit 115 as the A code 142. In this case, the instruction decoding unit 112 inhibits to output the pre-jump processing request at the D stage 132 to the instruction fetch unit 111, till the pre-fetch request of the instruction is accepted, so that the pre-jump processing request outputted to the instruction Fetch unit 111 is in processing order of the instruction.

By the instruction performing the branch target instruction pre-fetch processing at the A stage 133, the branch target address is calculated at the A stage 133. This processing is implemented by adding the value of APC 30 inputted via the IX bus 206 and the branch displacement value taken in from the instruction decoding unit 112 via the DISP bus 205 and the DISP latch 67.

The operand address calculation unit 115, by making the APFETREQ signal 309 to be "1", in the cycle wherein the branch target address is calculated, transmits the A stage branch target instruction pre-fetch request to the instruction fetch unit 111.

The instruction fetch unit 111 arbitrates jump requests from respective stages, and when the A stage branch target pre-fetch request can be accepted, by making the APJMPACK signal 307 to be "1", transmits that the A stage branch target instruction pre-fetch request has been accepted to the instruction decoding unit 112 and the operand address calculation unit 115. The operand address calculation unit 115 maintains the APFETREQ signal 309 at "1" till the APJMPACK signal 307 becomes "1".

When the APJMPACK signal 307 becomes "1", in the operand address calculation unit 115, a value of the AO latch 65 is outputted to the JA bus 208 and transferred to the instruction fetch unit 111. Processings in the instruction fetch unit 111 are same as the case of D stage branch target instruction pre-fetch. Since the PC calculation unit 2 must be initialized when the branch prediction is missed, the branch target address is also sent to the integer operating unit 117 via the AO bus 216.

The instruction decoding unit 112, by the fact that the DPJMPACK signal 305 becomes "1", stops to inhibit the pre-jump processing at the D stage 132. At the branch target pre-fetch, since the sequence itself which performs pipeline processing does not change, the PC processing unit 116 does not initialize the PC value. In this case, since the processing sequence is not switched, in the operand address calculation unit 115 it is not judged whether the jump address is an odd address or not.

The branch condition of the conditional branch instruction having performed the branch target instruction pre-fetch processing is judged at the E stage 135. Processings at the E stage 135 are entirely same as the case of processing the D stage branch target instruction pre-fetch.

(6.6) "Operation of Instruction Queue"

Figure 54:
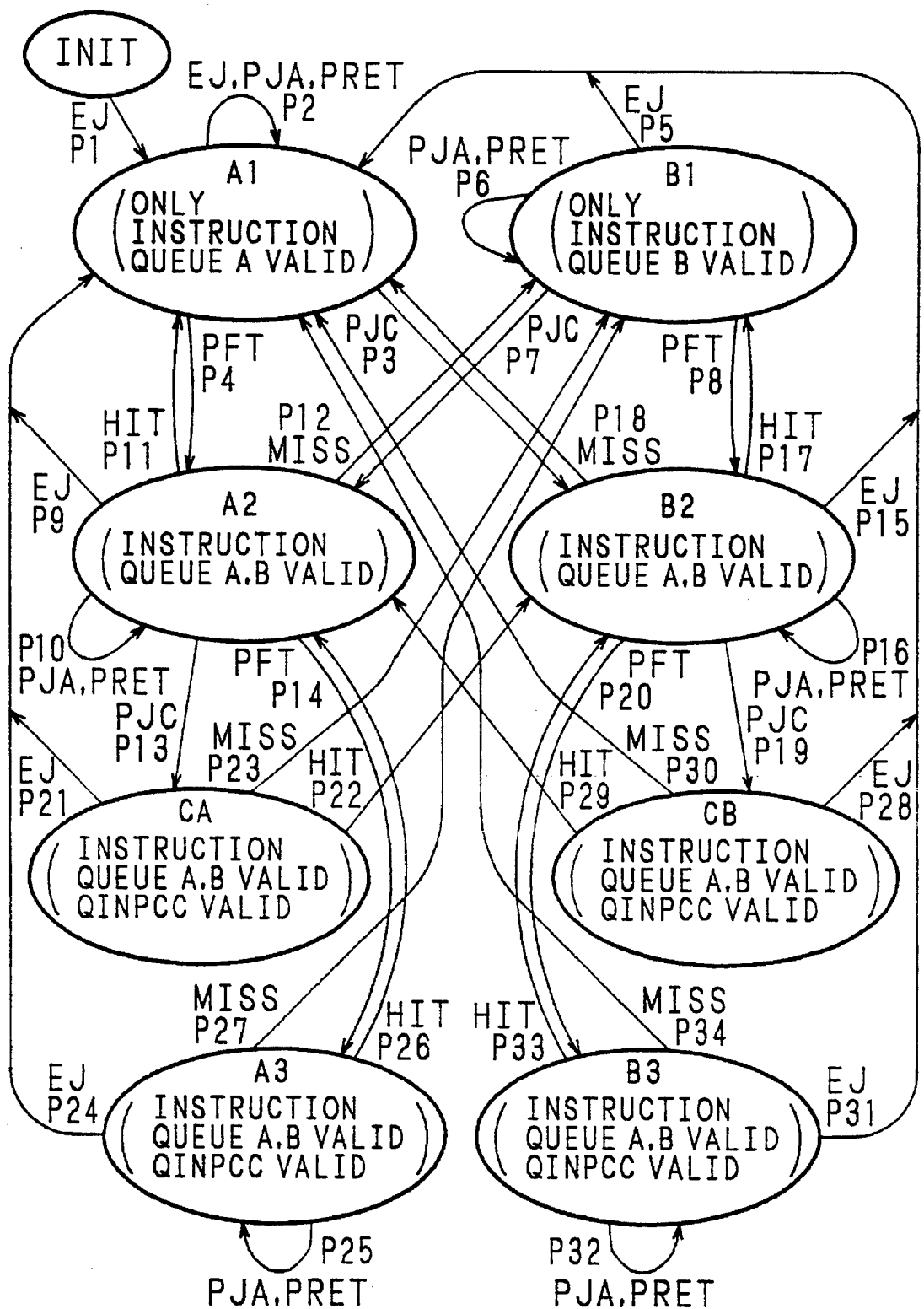
FIG. 54 is a schematic diagram showing a status transition at pre-jump processing of an instruction queue based upon an example of one embodiment of a data processor of the present invention.

Next, the operation of the instruction queue unit 82 at pre-jump processing is described referring to a schematic view of FIG. 54 showing its state transition.

Respective states shown in FIG. 54 are as follows.

INIT: initial state (state immediately after reset)
  * internal state is indefinite A1: instruction queue A 83/QINPCA 86: valid
  instruction queue B 84/QINPCB 87: void
  QINPCC 88: void
  * According to address of the QINPCA 86, the instruction is fetched in the instruction queue A 83, and this instruction is outputted to the instruction decoding unit 112.

B1: instruction queue A 83/QINPCA 86: void
  instruction queue B 84/QINPCB 87: valid
  QINPCC 88: void
  * According to address of the QINPCB 87, the instruction is fetched in the instruction queue B 84, and this instruction is outputted to the instruction decoding unit 112.

A2: instruction queue A 83/QINPCA 86: valid
  instruction queue B 84/QINPCB 87: void
  QINPCC 88: void
  priority: instruction queue A 83> instruction queue B 84.
  * According to address of the QINPCA 86, the instruction is fetched in the instruction queue A 83. However, when the instruction queue A 83 is full, according to address of the QINPCB 87, the instruction is fetched in the instruction queue B 84. The instruction fetched in the instruction queue A 83 is outputted to the instruction decoding unit 112.

B2: instruction queue A 83/QINPCA 86: valid
  instruction queue B 84/QINPCB 87: valid
  QINPCC 88: void
  priority: instruction queue B 84> instruction queue A 83
  * According to address of the QINPCB 87, the instruction is fetched in the instruction queue B 84. However, when the instruction queue B 84 is full, according to address of the QINPCA 86, the instruction is fetched in the instruction queue A 83. The instruction fetched in the instruction queue B 84 is outputted to the instruction decoding unit 112.

A3: instruction queue A 83/QINPCA 86: valid
  instruction queue B 84/QINPCB 87: valid QINPCC 88: valid
priority: instruction queue A 83> QINPCC 88>instruction B 84
* According to address of the QINPCA 86, the instruction is fetched in the instruction queue A 83. However, when the instruction queue A 83 is full, according to address of the QINPCB 87, the instruction is fetched in the instruction queue B 84. The instruction fetched in the instruction queue A 83 is outputted to the instruction decoding unit 112.

B3: instruction queue A 83/QINPCA 86: valid
instruction queue B 84/QINPCB 87: valid
QINPCC 88: valid
priority: instruction queue B 84> QINPCC 88>instruction queue A 83
* According to address of the QINPCB 87, the instruction is fetched in the instruction queue B 84. However, when the instruction queue B 84 is full, according to address of the QINPCA 86, the instruction is fetched in the instruction queue A 83. The instruction fetched in the instruction queue B 84 is outputted to the instruction decoding unit 112.

CA: instruction queue A 83/QINPCA 86: valid
instruction queue B 84/QINPCB 87: valid
QINPCC 88: valid
priority: QINPCC 88>instruction queue A 83> instruction queue B 84
* According to address of the QINPCA 86, the instruction is fetched in the instruction queue A 83. However, when the instruction queue B 83 is full, according to address of the QINPCB 87, the instruction is fetched in the instruction queue B 84. A valid instruction code is not outputted to the instruction decoding unit 112.

CB: instruction queue A 83/QINPCA 86: valid
instruction queue B 84/QINPCB 87: valid
QINPCC 88: valid
priority: QINPCC 88>instruction queue A 83> instruction queue B 84
* According to address of the QINPCB 87, the instruction is fetched in the instruction queue B 84. However, when the instruction queue B 84 is full, according to address of the QINPCA 86, the instruction is fetched in the instruction queue A 83. A valid instruction code is not outputted to the instruction decoding unit 112.

Arrows in FIG. 54 show directions of transitions which may be generated between aforementioned states, and symbols attached to the arrows show the transition conditions. Meaning and priority of the symbols showing the transition conditions ape as shown as follows. Three conditions of the priority "high" are respectively produced exclusively at the E stage 135. Two conditions of the priority "medium" are produced exclusively at the A stage 133. Four conditions of the priority "low" are produced exclusively at the D stage 132.

Priority

High: EJ: E stage jump (EJMPREQ="1")

High: MISS: branch prediction miss (QEXCHG= "1")

High: HIT: branch prediction hit (QCANCEL="1")

Medium: PJA: A stage unconditional pre-jump (AJMPAREQ="1" & APJMPACK="1")

Medium: PFT: A stage branch target instruction pre-fetch (APFETREQ="1" & APJMPACK="1")

Low: PJA: D stage unconditional pre-jump (DJMPAREQ="1" & DPJMPACK="1")

Low: PTC: D stage conditional pre-jump (DJMPCREQ="1" & DPJMPACK="1")

Low: PFT: D stage branch target instruction pre-fetch (DPFETREQ="1" & DPJMPACK="1")

Low: PRET: pre-return (DPRETREQ="1" & DPRETACK="1")

When the instruction queue A 83 (QINPCA 86), instruction queue B 84 (QINPCB 87) and QINPCC 88 are all valid, the instruction fetch unit 11 does not accept the conditional pre-jump and jump target instruction pre-fetch requests.

Processings in the instruction queue unit 82 at state transition are described hereinbelow.

* Processing 1 (p1)

input/output pointer of the instruction queue A 83 is initialized.

Jump target address on the JA bus 208 is taken into the QINPCA 86.

The instruction queue B 84 and QINPCC 88 are voided.

* Processing 2 (p2)

Input/output pointer of the instruction queue A 83 is initialized.

Jump target address on the JA bus 208 is taken into the QINPCA 86.

* Processing 3 (p3)

Input/output pointer of the instruction queue B 84 is initialized.

Jump target address on the JA bus 208 is taken into the QINPCB 87.

Priority of a fetch of the instruction queue B 84 is raised.

Contents of the instruction queue B 84 are outputted to the instruction decoding unit 112.

* Processing 4 (p4)

Input/output pointer of the instruction queue B 84 is initialized.

Jump target address on the JA bus 208 is taken into the QINPCB 87.

* Processing 5 (p5)

The instruction queue B 84 is voided.

Input/output pointer of the instruction queue A 83 is initialized.

Jump target address on the JA bus 208 is taken into the QINPCA 86.

* Processing 6 (p6)

Input/output pointer of the instruction queue B 84 is initialized.

Jump target address on the JA bus 208 is taken into the QINPCB 87.

* Processing 7 (p7)

Input/output pointer of the instruction queue A 83 is initialized.

Jump target address on the JA bus 208 is taken into the QINPCA 86.

Priority of a fetch of the instruction queue A 83 is raised.

Contents of the instruction queue A 83 are outputted to the instruction decoding unit 112.

* Processing 8 (p8)

Input/output pointer of the instruction queue A 83 is initialized.

Jump target address on the JA bus 208 is taken into the QINPCA 86.

* Processing 9 (p9)

The instruction queue B 84 is voided.

Input/output pointer of the instruction queue A 83 is initialized.

Jump target address on the JA bus 208 is taken into the QINPCA 86.

* Processing 10 (p10)

Input/output pointer of the instruction queue A 83 is initialized.

Jump target address on the JA bus 208 is taken into the QINPCA 86.

* Processing (p11)

The instruction queue B 84 is voided.

* Processing 112 (p12)

The instruction queue A 83 is voided.

Contents of the instruction queue B 84 are outputted to the instruction decoding unit 112.

* Processing 13 (p13)

Jump target address on the JA bus 208 is taken into the QINPCC 88.

Output to the instruction decoding unit 112 from the instruction queue A 83 is stopped.

* Processing 14 (p14)

Jump target address on the JA bus 208 is taken into the QINPCC 88.

* Processing 15 (p15)

The instruction queue B 84 is voided.

Input/output pointer of the instruction queue A 83 is initialized.

Jump target address on the JA bus 208 is taken into the QINPCA 86.

* Processing 16 (p16)

Input/output pointer of the instruction queue B 84 is initialized.

Jump target, address on the JA bus 208 is taken into the QINPCB 87.

* Processing 17 (p17)

The instruction queue A 83 is voided.

* Processing 18 (p18)

The instruction queue B 84 is voided.

Contents of the instruction queue A 83 are outputted to the instruction decoding unit 112.

* Processing 19 (p19)

Jump target address on the JA bus 208 is taken into the QINPCC 88.

Output to the instruction decoding unit 112 from the instruction queue B 84 is stopped.

* Processing 20 (p20)

Jump target address on the Ja bus 208 is taken into the QINPCC 88.

* Processing 21 (p21)

The instruction queue B 84 is voided.

The QINPCC 88 is voided.

Input/output pointer of the instruction queue A 83 is initialized.

Jump target address on the JA bus 208 is taken into the QINPCA 86.

* Processing 22 (p22)

The instruction queue B 84 is voided.

Input/output pointer of the instruction queue B 84 is initialized.

A value of the QINPCC 88 is transferred to the QINPCB 87.

The QINPCC 88 is voided.

Contents of the instruction queue B 84 are outputted to the instruction decoding unit 112.

Priority of a fetch of the instruction queue B 84 is raised.

* Processing 23 (p23)

The instruction queue A 83 is voided.

The QINPCC 88 is voided.

Contents of the instruction queue B 84 are outputted to the instruction decoding unit 112.

* Processing 24 (p24)

The instruction queue B 84 is voided.

The QINPCC 88 is voided.

Input/output pointer of the instruction queue A 83 is initialized.

Jump target address on the JA bus 208 is taken into the QINPCA 86.

* Processing 25 (p25)

Input/output pointer of the instruction queue A 83 is initialized.

Jump target address on the JA bus 208 is taken into the QINPCA 86.

* Processing 26 (p26)

The instruction queue B 84 is voided.

Input/output pointer of the instruction queue B 84 is initialized.

A value of the QINPCC 88 is transferred to the QINPCB 87.

The QINPCC 88 is voided.

* Processing 27 (p27)

The instruction queue A 83 is voided.

The QINPCC 88 is voided.

Contents of the instruction queue B 84 are outputted to the instruction decoding unit 112.

* Processing 28 (p28)

The instruction queue B 84 is voided.

The QINPCC 88 is voided.

Input/output pointer of the instruction queue A 83 is initialized.

Jump target address on the JA bus 208 is taken into the QINPCA 86.

* Processing 29 (p29)

The instruction queue A 83 is voided.

Input/output pointer of the instruction queue A 83 is initialized.

A value of the QINPCC 88 is transferred to the QINPCA 86.

The QINPCC 88 is voided.

Contents of the instruction queue A 83 are outputted to the instruction decoding unit 112.

Priority of fetch of the instruction queue A 83 is raised.

* Processing 30 (p30)

The instruction queue B 84 is voided.

The QINPCC 88 is voided.

Contents of the instruction queue A 83 are outputted to the instruction decoding unit 112.

* Processing 31 (p31)

The instruction queue B 84 is voided.

The QINPCC 88 is voided.

Input/output pointer of the instruction queue A 83 is initialized.

Jump target address on the JA bus 208 is taken into the QINPCA 86.

* Processing 32 (p32)

Input/output pointer of the instruction queue B 84 is initialized.

Jump target address on the JA bus 208 is taken into the QINPCB 87.

* Processing 33 (p33)

The instruction queue A 83 is voided.

Input/output pointer of the instruction queue A 83 is initialized.

A value of the QINPCC 88 is transferred to the QINPCA 86.

The QINPCC 88 is voided.

* Processing 34 (p34)

The instruction queue B 84 is voided.

The QINPCC 88 is voided.

Contents of the instruction queue A 83 are outputted to the instruction decoding unit 112.

When pre-fetching the jump target instruction immediately after accepting the jump request at conditional pre-jump, unconditional pre-jump or E stage jump, address on the JA bus 208 is transferred directly to the instruction MMU/cache unit 81. In this case, address on the JA bus 208 is inputted to an incrementer to be incremented.

When the branch prediction is right and the instruction of the address saved in the QINPCC 88 is started to be fetched immediately after accepting the QCANCEL signal 312, the address is outputted directly to the PFA bus 91 from the QINPCC 88.

Complicated state control, transfer, operation and fetch control of the instruction queue unit 82 as shown in aforementioned FIG. 54, are performed by a control unit (not shown) included in the instruction fetch unit 111.

(7) "Processing Methods of Jump Instructions"

Respective processing methods for the jump instructions are particularly described in the following.

(7.1) "BRA Instruction"

Figure 55:
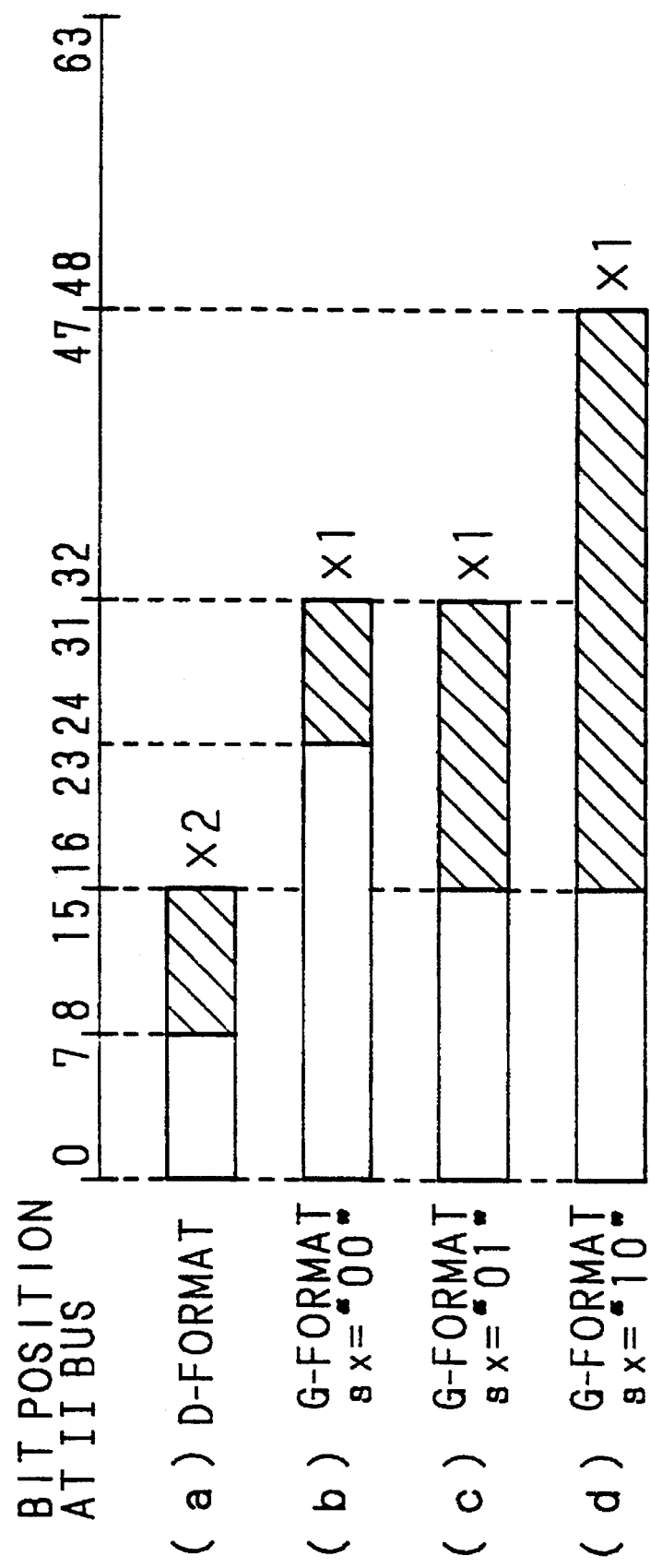
FIG. 55 is a schematic diagram showing branch displacement positions on II bus at processing of BRA, BSR and Bcc instruction based upon an example of one embodiment of a data processor of the present invention.

Though instruction formats of the BRA instruction are shown in FIG. 28 and FIG. 29, this instruction is decoded in one cycle. Branch displacement positions on the II bus 204 at processing the BRA instruction is shown in a schematic view of FIG. 55. FIG. 55(*a*) shows the case of D format, and FIG. 55(*b*) through FIG. 55(*d*) respectively show the case where the branch displacements of the G format are respectively 8 bits, 16 bits and 32 bits. As it is apparent from comparing these with FIG. 51, the branch target address can be calculated about at instruction decoding all cases.

Figure 56:
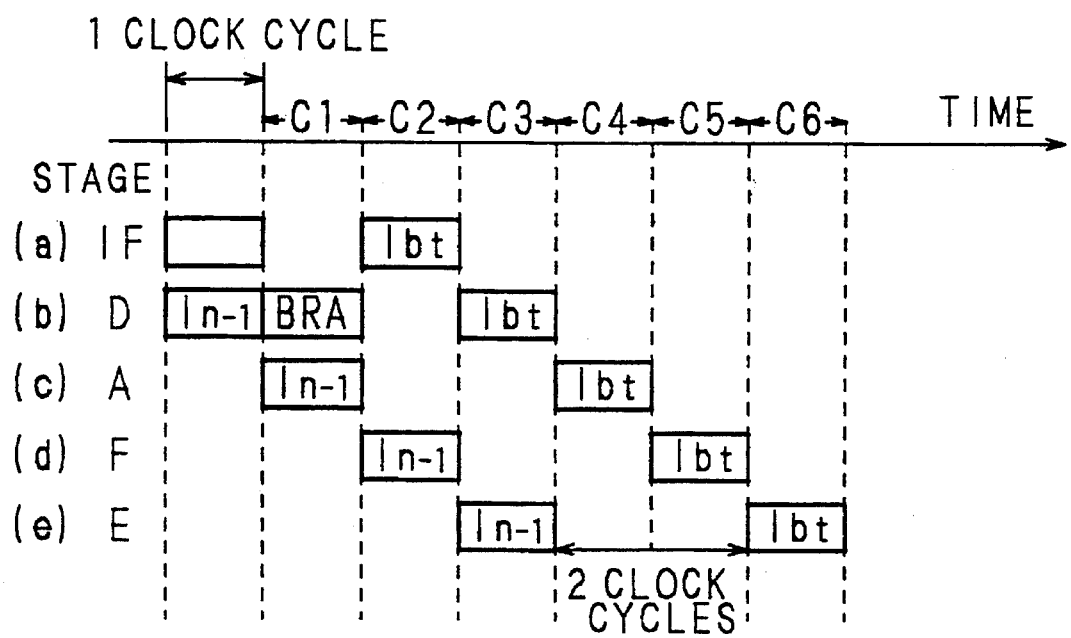
FIG. 56 is a timing chart at processing of BRA instruction based upon an example of one embodiment of a data processor of the present invention.

Timings at processing the BRA instruction are shown in a timing chart in FIG. 56. As shown in FIG. 56(*b*), at the D stage 132, the instruction decoding unit 112 decodes the BRA instruction, and the branch target address calculation unit 1 calculates the branch target address in the C1 cycle. In case of the D format, the branch target address is calculated by the first adder 5, by the second adder 6 in the case where the displacement size is 8 bits in the G format, by the third adder 7 in the case where the displacement size is 16 bits in the G format, and by the fourth adder 8 in the case where the displacement size is 32 bits in the G format.

Since the decoded instruction is the BRA instruction, the D stage unconditional jump processing is performed in the C1 cycle. When the branch target address is the odd number or a debug event detecting mode, the D code 141 and A code 142 for the BRA instruction are outputted, but when it is not so the BRA instruction processing is finished at the D stage 132, and neither the D code 141 nor the A code 142 is outputted. As shown in FIG. 56(*a*), a branch target instruction fetch is performed at the IF stage 131 in the C2 cycle, and at cache hit, as shown in FIG. 56(*b*), decoding of the branch target instruction is started in the C3 cycle. That is, processing of the BRA instruction is finished in two cycles at cache hit.

When an odd address jump is detected, the pipeline stages output a dummy step code which does not do any processing, and by transferring information showing that the jump to the odd address has been made by the step code, processing of the odd address jump trap is started.

(7.2) "BSR instruction"

Though instruction formats of the BSR instruction are shown in FIG. 32 and FIG. 33, this instruction is decoded in one cycle. Branch displacement positions on the II bus 204 at BSR instruction processing are same as the BRA instruction and are shown in FIG. 55. Also in the BSR instruction, in the same way as the case of BRA instruction, the branch target address can be calculated at instruction decoding about all cases.

Figure 57:
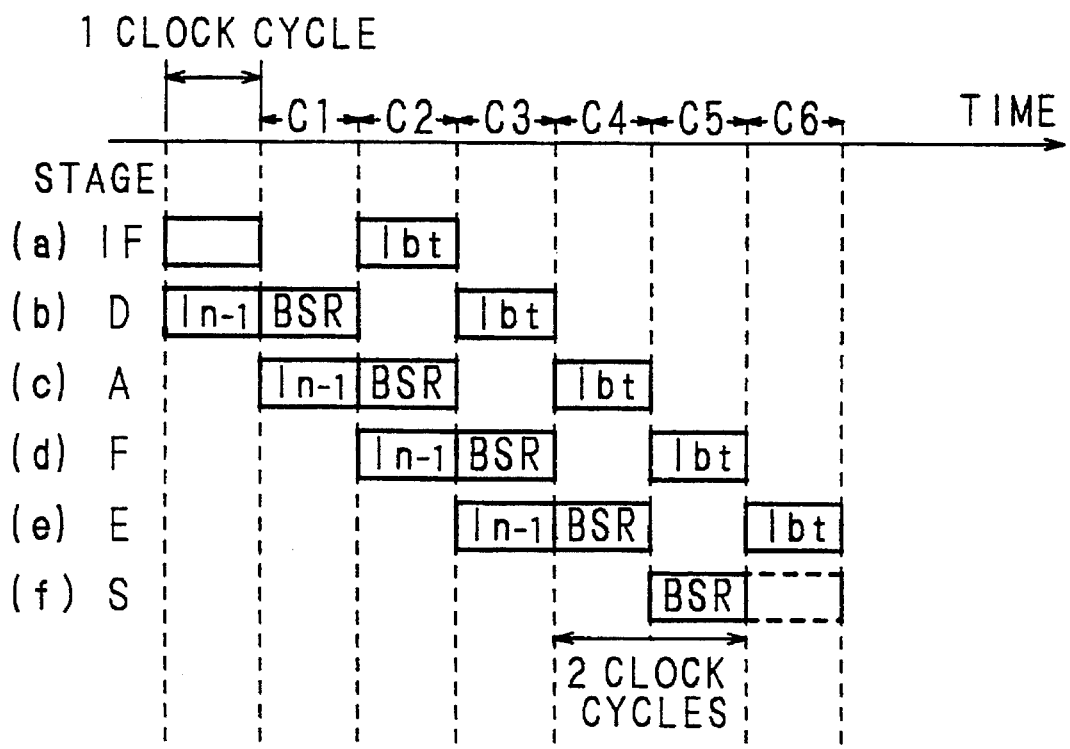
FIG. 57 is a timing chart at processing of BSR instruction based upon an example of one embodiment of a data processor of the present invention.

Timings at BSR instruction processing are shown in a timing chart of FIG. 57. As shown in FIG. 57(*b*), the instruction decoding unit 112 decodes the BSR instruction in the C1 cycle, and the branch target address calculation unit 1 calculates the branch target address at the D stage 132.

Since the decoded instruction is the BSR instruction, the D stage unconditional jump processing is performed in the C1 cycle. As shown in FIG. 57(*a*), the branch target instruction fetch is performed in the C2 cycle. At this time, a return target address from a subroutine is calculated at the A stage 133. This processing is performed by transferring a value of ATPC 28 in the PC calculation unit 2 via the IX bus 206 and address adder 61. As shown in FIG. 57(*e*), a value of the return target address is registered in the PC stack 201 in the C4 cycle. As shown in FIG. 57(*f*), the return target address is written in a cache and memory in the C5 cycle. At least two clock cycles are necessary for writing in the memory.

As shown in FIG. 57(*b*), at cache hit, decoding of the branch target instruction can be started in the C3 cycle. Thus, the processing of the BSR instruction is finished in two cycles at cache hit.

When an odd address jump is detected, by transferring information showing that the jump to the odd address has been performed by the step code, processing of the odd address jump trap is started after finishing the BSR instruction processing.

(7.3) "Bcc Instruction"

Though instruction formats of the Bcc instruction are shown in FIG. 30 and FIG. 31, this instruction is decoded in one cycle. Branch displacement positions on the II bus 204 at Bcc instruction processing are same as the case of the BRA instruction, and are shown in FIG. 55. Also in the Bcc instruction, as same as the case of BRA instruction, the branch target address can be calculated about all cases at instruction decoding.

Figure 58A:
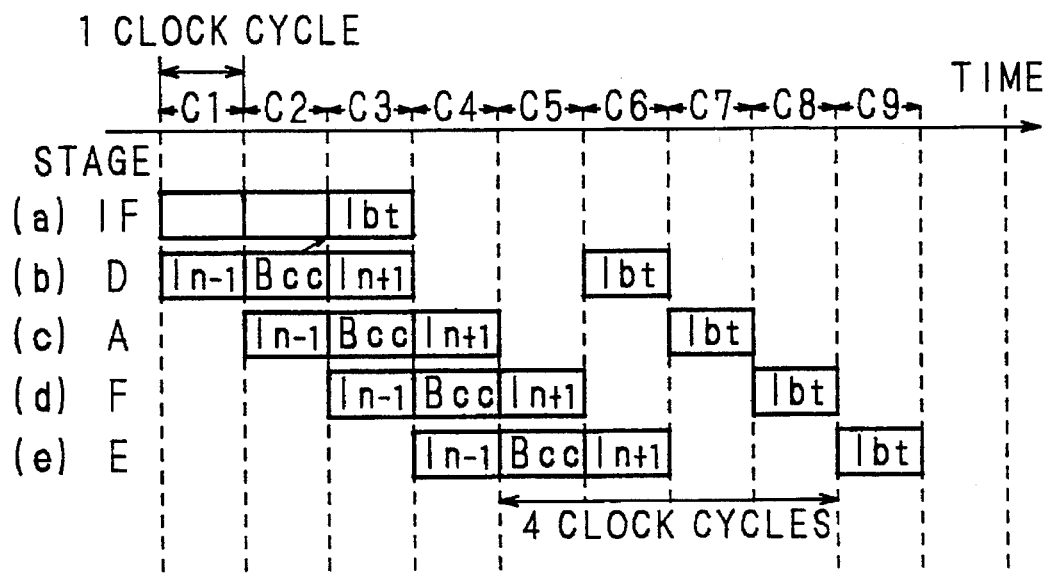
FIGS. 58(a) and 58(b) are timing charts at processing of Bcc instruction based upon an example of one embodiment of a data processor of the present invention.
Figure 58B:
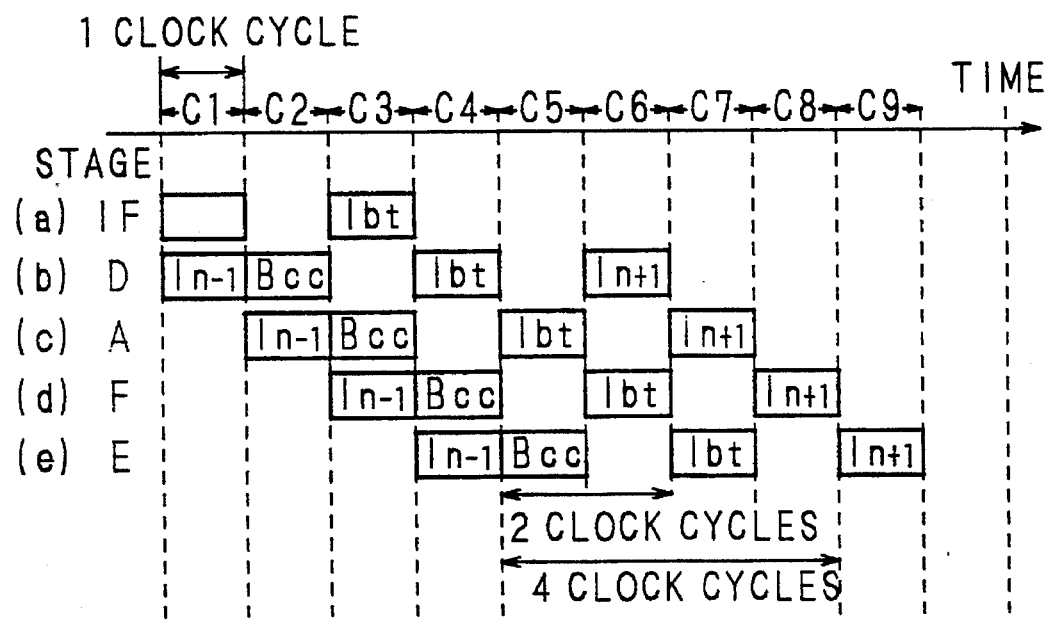

Timings at Bcc instruction processing are shown in timing charts in FIGS. 58(A) and 58(B). In the C1 cycle, the instruction decoding unit 112 retrieves a branch career table according to address of the DPC 29, and performs branch prediction of the Bcc instruction to be decoded next. In the first half of the C1 cycle, the address immediately before the Bcc instruction is stored in the DPC 29. That is, branch prediction of the Bcc instruction is performed by the instruction address immediately before the Bcc instruction. Since this processing is performed before decoding the instruction, it is performed at every decoding cycle and valid information is outputted only when the next instruction is the Bcc instruction. Related to the Bcc instruction, it is also possible to set so as to predict statically that it is not branched by the control register in the integer operating unit 117. When branch prediction is not made, a value read out from the branch career table is not taken but a value showing that the branch prediction result is not forcibly branched is taken.

FIG. 58(A) shows a timing chart when it is predicted not to branch. As shown in FIG. 58(A)(b), the instruction decoding unit, 112 decodes the Bcc instruction and the branch target calculation unit 1 calculates the branch target address in the C2 cycle. When it is predicted not to branch, as shown in FIG. 58(A)(b), D stage branch target instruction pre-fetch processing is performed in the C2 cycle. As shown in FIG. 58(A)(c), the branch target address of the Bcc instruction is calculated at the A stage 133 in the C3 cycle. The branch condition is judged in the C5 cycle, and when the branch prediction is right and the branch does not occur, the instruction fetch unit 111 voids the instruction queue on the branch target sequence side. In this case, the Bcc instruction is processed in one cycle. When the branch prediction is missed, the instruction fetch unit 111 voids the instruction queue on the sequence side succeeding the conditional branch instruction, and the processing sequence is switched. The branch career table is also refreshed. In the C5 cycle, the instruction address executed immediately before the Bcc instruction is stored in the OLDPC 36 of the step PC transfer unit 3, and the branch career table is refreshed by that value. When the branch target instruction is already fetched in the instruction queue in the C5 cycle, apparently 4 cycles have been spent for processing of the Bcc instruction.

FIG. 58(B) is a timing chart showing a case where a branch is predicted. As shown in FIG. 58(B)(b), the instruction decoding unit 112 decodes the Bcc instruction and the branch target address calculation unit 1 calculates the branch target address in the C2 cycle. When the branch is predicted, D stage conditional jump processing is performed in the C2 cycle. As shown in FIG. 58(A)(c), in the C3 cycle, a PC value of the next instruction of the Bcc instruction is calculated at the A stage by transferring the address held in he ATPC 28 at start of the cycle. The branch condition is judged in the C5 cycle, and when the branch prediction is right, the instruction fetch unit 111 voids the instruction queue on the sequence side succeeding the conditional branch instruction. In this case, processing of the Bcc instruction is finished in 2 cycles at cache hit. When the branch prediction is missed and the instruction succeeding the Bcc instruction must be processed, the instruction fetch unit 111 voids the instruction queue on the branch target sequence side and switches the processing sequence. The branch career table is also refreshed. Refresh processing is same as the case where it is predicted not to branch but the branch has occurred. When the instruction succeeding the Bcc instruction is fetched already in the instruction queue in the C5 cycle, apparently 4 cycles have been spent for processing of the Bcc instruction.

Only when the branch target address is the odd number and the branch occurs practically, processing of the odd address jump trap is started after processing the Bcc instruction.

(7.4) "JMP Instruction"

As shown in FIG. 34, though the JMP instruction is able to designate the jump target address in a general type addressing mode, a timing for performing the pre-jump processing differs by the addressing mode.

First, the case where the addressing mode is a PC relative indirect mode or an absolute mode is described. A schematic view of FIG. 59 shows designated positions of the branch displacement and absolute address on the II bus 204 at processing the JMP instruction. FIG. 59(a) and FIG. 59(b) respectively show the cases where the branch displacement is 16 bits and 32 bits in the PC relative indirect mode, and FIG. 59(c) and FIG. 59(d) respectively show the cases where address is designated by 16 bits and 32 bits in the absolute mode. As it is apparent from comparing these with FIG. 51, in these cases the branch target address can be calculated at decoding the instruction.

When the jump target is shown in the PC relative indirect mode or absolute mode, a timing chart at JMP instruction processing shows entirely the same processing timing of the BRA instruction shown in FIG. 56, the BRA instruction in FIG. 56 may just be replaced by the JMP instruction. The instruction decoding unit 112 decodes the JMP instruction and the branch target address calculation unit 1 calculates the jump target address in C1 cycle at the D stage 132. When the branch displacement is 16 bits in the PC relative indirect mode, the jump target address is calculated by the third adder 7, and when the branch displacement is 32 bits by the fourth adder 8. When it is 16 bits in the absolute mode, the jump target address is held in the output latch 21, and when it is 32 bits in the output latch 22, as the 32-bit address.

In these cases, the D stage unconditional jump processing is performed in the C1 cycle. A processing method is entirely same as the case of BRA instruction. Though the D code 141 and A code for the JMP instruction are outputted when the jump target address is the odd number or the debut event detecting mode, when it is not so, processing of the JMP instruction is finished at the D stage 132, and neither the D code 141 nor the A code 142 is outputted. At cache hit, processing of the JMP instruction is finished in two cycles.

Next, the case where the addressing mode is designated by the mode other than the PC relative indirect mode or the absolute mode, is described. In this case, the jump target of the absolute mode is described. In this case, the jump target address can not be calculated in the branch target address calculation unit 1. Thus, in this case, A stage unconditional pre-jump processing is performed.

Figure 60:
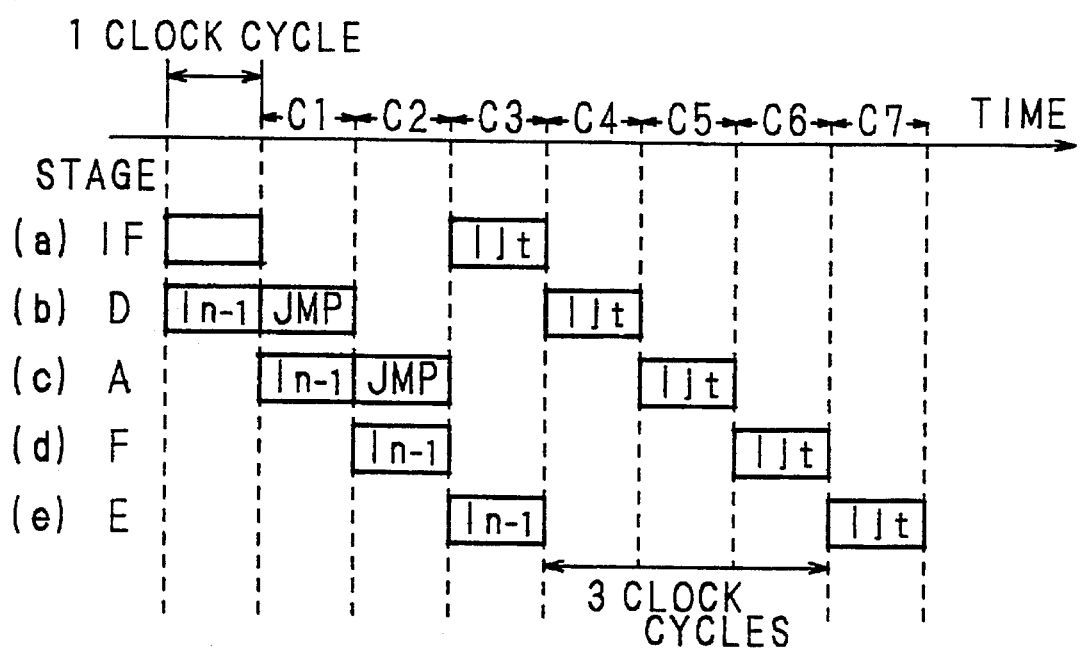
FIG. 60 is a timing chart at processing of JMP instruction based upon an example of one embodiment of a data processor of the present invention.

A timing chart at JMP instruction processing where the jump target address is designated in the mode other than the PC relative indirect mode or the absolute mode is shown in FIG. 60.

As shown in FIG. 60(b), at the D stage 132, the instruction decoding unit 112 decodes the JMP instruction in the C1 cycle. As shown in FIG. 60(c), the jump target address is calculated and the A stage unconditional pre-jump processing is performed in the C2 cycle. When the jump target address is the odd number or the debug event detecting mode, though the R code 143 and F code 144 for the JMP instruction are outputted, when it is not so, processing of the JMP instruction is finished at the A stage 133 and neither the R code 143 nor the F code 144 are outputted. As shown in FIG. 60(a), the branch target instruction fetch is performed at the IF stage 131 in C3 cycle, and at cache hit, as shown in FIG. 60(b), branch target instruction decoding is started in the C4 cycle. That is, the JMP instruction processing is finished in three cycles at cache hit. When the jump target address is designated in the chained addressing mode, since the A stage unconditional jump processing is performed in the cycle where the jump target address calculation is finished, the processing time of the JMP instruction is prolonged.

When the odd address jump is detected, a dummy step code which performs no processing in the pipeline stages is outputted, and by transferring information showing that the jump has occurred to the odd address by the step code, the odd address jump trap processing is started.

(7.5) "JSR Instruction"

In the same way as the JMP instruction, the JSR instruction is also able to designate the jump target address in a general type addressing mode, a timing for performing the pre-jump processing differs according to the addressing mode.

First, the case where the addressing mode is the PC relative indirect mode or the absolute mode is described. In these cases, in the same way the JMP instruction, the branch target address can be calculated at instruction decoding.

When the jump target address is shown in the PC relative indirect mode or the absolute mode, a timing at JMP instruction processing is entirely same as the BSR instruction processing timing shown in FIG. 56, and the BRA instruction in FIG. 56 may just be replaced by the JMP instruction.

At the D stage 132, the instruction decoding unit 112 decodes the JMP instruction and the branch target address calculation unit 1 calculates the jump target address in the C1 cycle. When the branch displacement is 16 bits in the PC relative indirect mode, the jump target address is calculated by the third adder 7, and when the branch displacement is 32 bits by the fourth adder 8. When it is 16 bits in the absolute mode, the jump target address is held in the output latch 21, and when it is 32 bits in the output latch 22, as the 32-bit address.

D stage unconditional jump processing is performed in the C1 cycle. The branch target instruction fetch is performed in the C2 cycle. At this time, return target address from the subroutine is calculated at the A stage 133. Following processings are also entirely same as the case of BSR instruction. The JSR instruction processing is finished in two cycles at cache hit.

Next, the case where the addressing mode is designated in the mode other than the PC relative indirect mode or absolute mode is described. In this case, the jump target address can not be calculated by the branch target address calculation unit 1. Thus, in this case, A stage unconditional pre-jump processing is performed. In this case, it is divided into two step codes for processing till the A stage 133, wherein it is merged in one step code and outputted.

Figure 61:
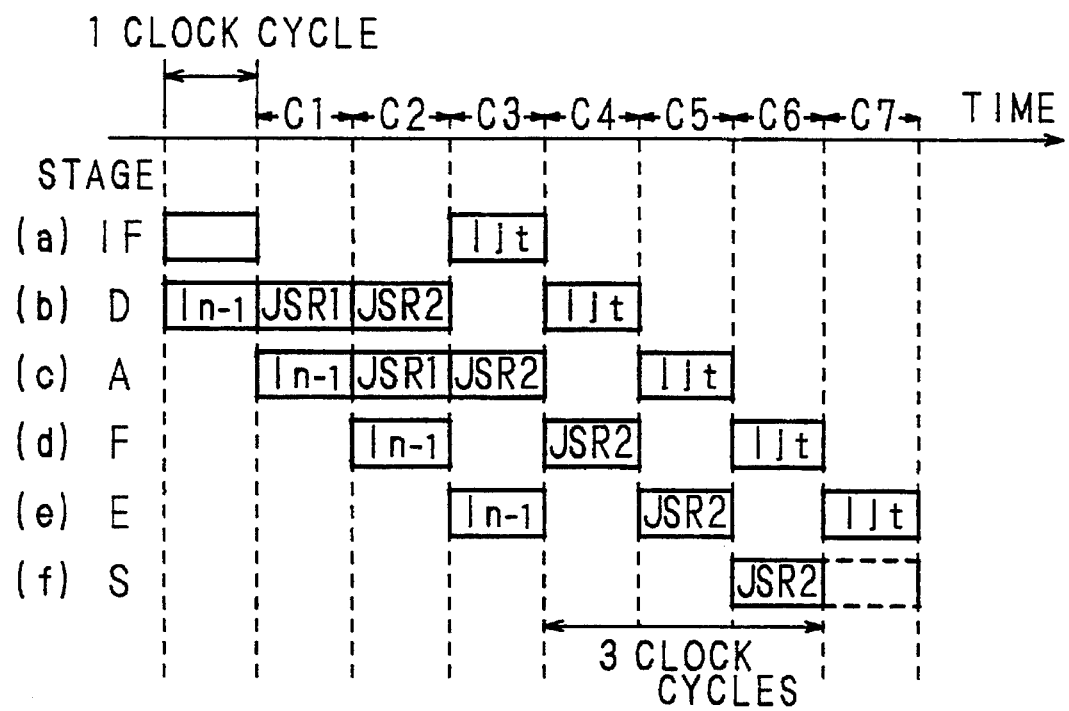
FIG. 61 is a timing chart at processing of JSR instruction based upon an example of one embodiment of a data processor of the present invention.

A timing chart at JSP instruction processing where the jump target address is designated in the mode other than the PC relative indirect mode or absolute mode is shown in FIG. 61.

As shown in FIG. 61(*b*), at the D stage 132, the instruction decoding unit 112 decodes the JSP instruction in the C1 cycle. As shown in FIG. 61(*c*), the jump target address is calculated and A stage unconditional pre-jump processing is performed in the C2 cycle. In the C2 cycle, the R code 143 and F code 144 are not outputted. At the D stage, a control signal for calculating return target address in the C2 cycle is generated. As shown in FIG. 61(*c*), at the A stage 133, the return target address from the subroutine is calculated in the C3 cycle is calculated, and the R code 143 and F code 144 are outputted. When the odd address jump is detected in the C2 cycle, its information is reflected to the R code 143 outputted in the C3 cycle. Following processings are entirely same as the case of the BSR information.

As shown in FIG. 61(*a*), in the C3 cycle, the branch target instruction fetch is performed in the IF stage 131, and at cache hit, as shown in FIG. 61(*b*), the branch target instruction decoding is started in the C4 cycle. That is, at cache hit, the JSR instruction processing is finished in three cycles. When the jump target address is designated in the chained mode, since the A stage unconditional jump processing is performed in a cycle where the jump target address calculation is finished, the processing time of the JSR instruction is prolonged.

When the odd address jump is detected, by transferring information showing that a jump to the odd address is made by the step code, after finishing the JSR instruction processing, the odd address jump trap processing is started.

(7.6) "ACB, SCB Instructions"

Since the ACB instruction and SCB instruction are used as a primitive of loop control, in these instruction it is predicted to branch statically to perform D stage conditional pre-jump processing. In the ACB and SCB instructions, though a number of formats are included as shown in FIG. 36 to FIG. 43, it can be roughly classified into a contracted type (Q, R formats) and a general type (G, E formats). In case of contracted type formats, decoding is finished in one cycle, but in case of general type formats, two-cycle or three-cycle time is required for decoding one instruction even when the chained mode is not used in designating the operand. In this case, branch displacement fetch and conditional pre-jump processing are performed in the last decoding cycle.

In schematic views in FIGS. 62(*a*), (*b*), (*c*), (*d*), (*e*) and (*f*), branch displacement positions on the II bus 204 at the last decoding cycle of the ACB and SCB instructions, in case of sz="00": 8 bits, sz="01": 16 bits and sz="10": 32 bits of the Q, R format, and sz="00": 8 bits, sz="01": 16 bits and sz="10": 32 bits of the G, E formats, are shown. As it is apparent by comparing with FIG. 51, though the branch target address can be calculated in the take-in cycle of the branch displacement when the displacement size is 8 bits in the contracted type and the displacement size is 16 bits or 32 bits in the general type, in other cases, the branch target address can not be calculated in the branch target address calculation unit 1. Thus, the processing methods differ between the former and the latter cases.

In case of general type, since only the operand saving processing is performed in the processings except at the last step, the contracted type instruction is described.

First, the former case is described.

Figure 63A:
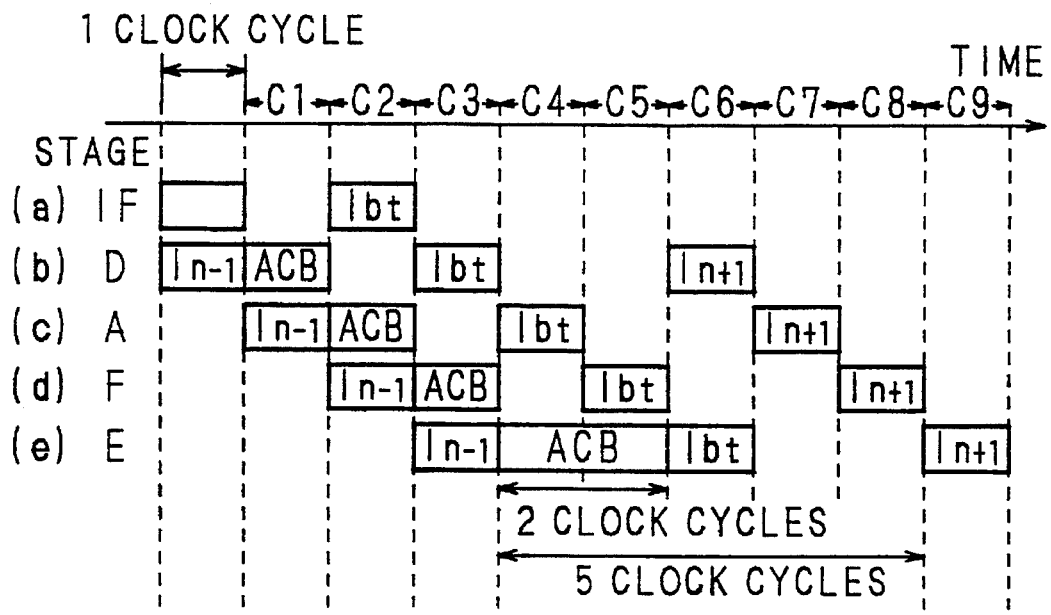
FIGS. 63(a) and 63(b) are timing charts at processing of ACB instruction based upon an example of one embodiment of a data processor of the present invention.

A timing chart of the ACB instruction processing when the branch displacement is 8 bits in the contracted type is shown in FIG. 63(A).

As shown in FIG. 63(A)(*b*), the instruction decoding unit 112 decodes the ACB instruction and the branch target address calculation unit 1 calculates the branch target address in the C1 cycle. D stage conditional jump processing is performed in the C1 cycle. A PC value of the next instruction of the ACB instruction is calculated in the C2 cycle. As shown in FIG. 63(A)(*e*), operation is performed in the C4 cycle, and the branch condition is judged in the C5 cycle. When the branch prediction is right, the instruction fetch unit 111 voids the instruction queue of the sequence on the side succeeding the ACB instruction. In this case, the ACB instruction processing is finished in two cycles at cache hit. When the branch prediction is missed and the instruction succeeding the ACB instruction must be processed, the processing sequence is returned to the origin in the C5 cycle. When the instruction succeeding the ACB instruction is already fetched in the instruction queue in the C5 cycle, apparently five cycles have been spent for processing the ACB instruction.

Next, the latter case is described. A timing chart of the ACB instruction processing when the branch displacement is 16 bits or 32 bits in the contracted type is shown in FIG. 63(B).

Figure 63B:
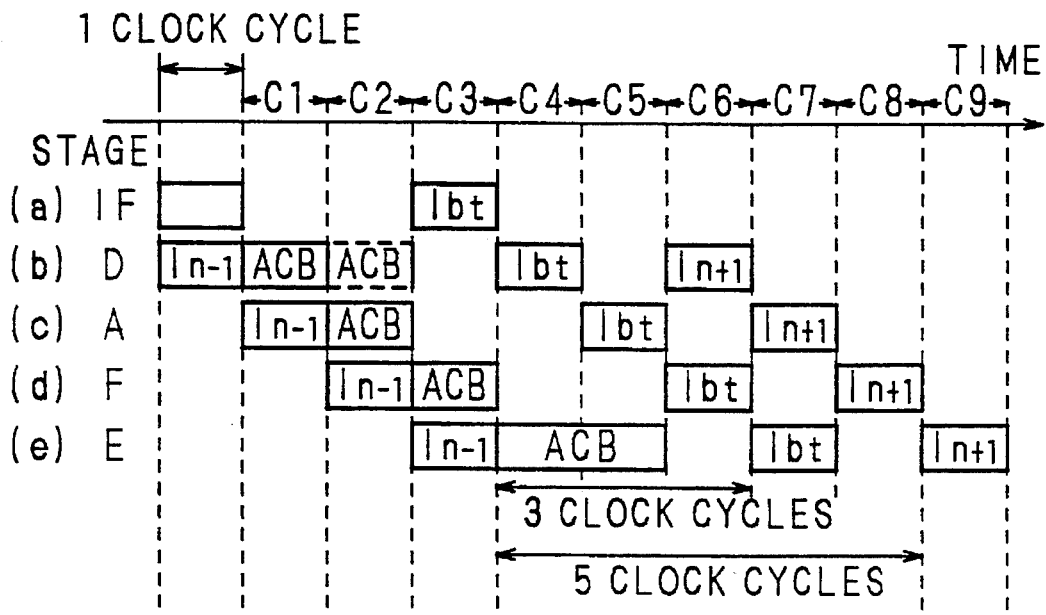

As shown in FIG. 63(B)(*b*), in the C1 cycle, the instruction decoding unit 112 decodes the ACB instruction and cuts out a branch displacement field. In the C2 cycle, a PC value of the next instruction of the ACB instruction is calculated at the A stage 138. At the D stage, the branch target address is calculated in the branch target address calculation unit 1 on the basis of the cut-out branch displacement so as to perform the D stage conditional jump processing. As shown in FIG. 63(B)(e), operation is performed in the C4 cycle and the branch condition is judged in the C5 cycle. When the branch prediction is right, the instruction fetch unit 111 voids the instruction queue of the sequence on the succeeding side of the ACB instruction. In this case, the ACB instruction processing is finished in 3 cycles at cache hit. When the branch prediction is missed and the instruction succeeding the ACB instruction must be processed, the processing sequence is returned to the origin in the C5 cycle. When the instruction succeeding the ACb instruction is already fetched in the instruction queue in the C5 cycle, apparently five cycles have been spent for processing the ACB instruction.

In either of the cases, only when the branch target address is the odd number and the branch occurs practically, the odd address jump trap processing is started after finishing the ACB instruction processing.

(7.7) "FBcc Instruction"

Though the FBcc instruction is decoded in 1 cycle, as the case, where sy="00": 8 bits, sy="01": 16 bits and sy="10": 32 bits, is shown in schematic views of FIGS. 64(a), (b), and (c), regardless of the branch displacement size, the branch target address can not be calculated in the decoding cycle. Processing is performed by predicting that there is no static branch in this instruction. In the conditional branch instruction, since a rapid conditional judgment is important and processing is performed by predicting not to branch, the step code is advanced to perform the branch target instruction prefetch processing at A stage 133.

Figure 65:
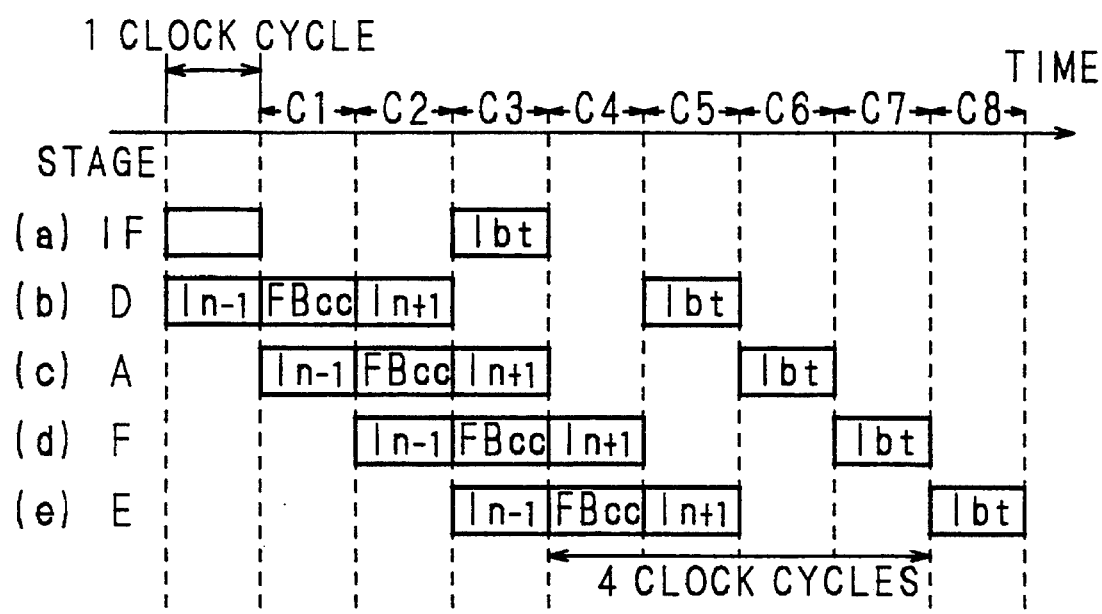
FIG. 65 is a timing chart at processing of FBcc instruction based upon an example of one embodiment of a data processor of the present invention.

FIG. 65 shows a timing chart of the FBcc instruction processing. As shown in FIG. 65(b), at the D stage, the instruction decoding unit 112 decodes the FBcc instruction in the C1 cycle. As shown in FIG. 65(c), in the C2 cycle, the branch target address is calculated and A stage branch target instruction pre-fetch processing is performed at the A stage 133. The branch condition is judged in the C4 cycle. When the branch prediction is right, the instruction fetch unit 111 voids the instruction queue of the branch target sequence. In this case, the FBcc instruction is processed in one cycle. When the branch prediction is missed and the branch occurs, the processing sequence is switched in the C4 cycle. When the branch target instruction is already fetched in the instruction queue in the C4 cycle, apparently four cycles have been spent for processing the FBcc instruction.

In either of the cases, only when the branch target address is the odd number and the branch occurs practically, the odd address jump trap processing is started after finishing the FBcc instruction processing.

(8) "Example of Pipeline Processing of Jump Instruction"

Figure 66:
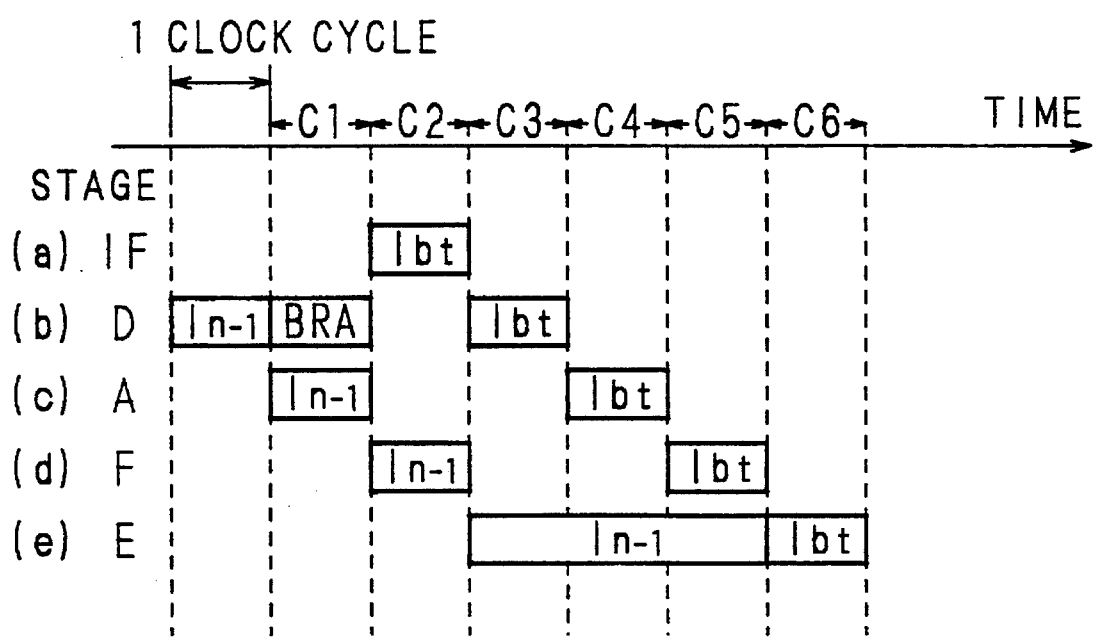
FIG. 66 is a schematic diagram showing branch displacement positions on II bus at processing of BRA instruction based upon an example of one embodiment of a data processor of the present invention.

A schematic view of FIG. 66 shows an example of pipeline processing at BRA instruction processing.

In this example, three clock cycles are required for processing of the instruction immediately before the BRA instruction at the E stage 135, apparently the processing time of the BRA instruction at the E stage 135 is zero. That is, by finishing the BRA instruction processing of the D stage 132, execution of the branch target instruction can be started immediately after executing the instruction immediately before the BRA instruction. When processing of the instruction preceding the BRA instruction is delayed due to conflicts occurred in a register which is to be referred to at address calculation, in the same way as this example, the processing time of the BRA instruction at the E stage 135, becomes zero and a processing efficiency at the E stage 135 is improved.

Figure 67:
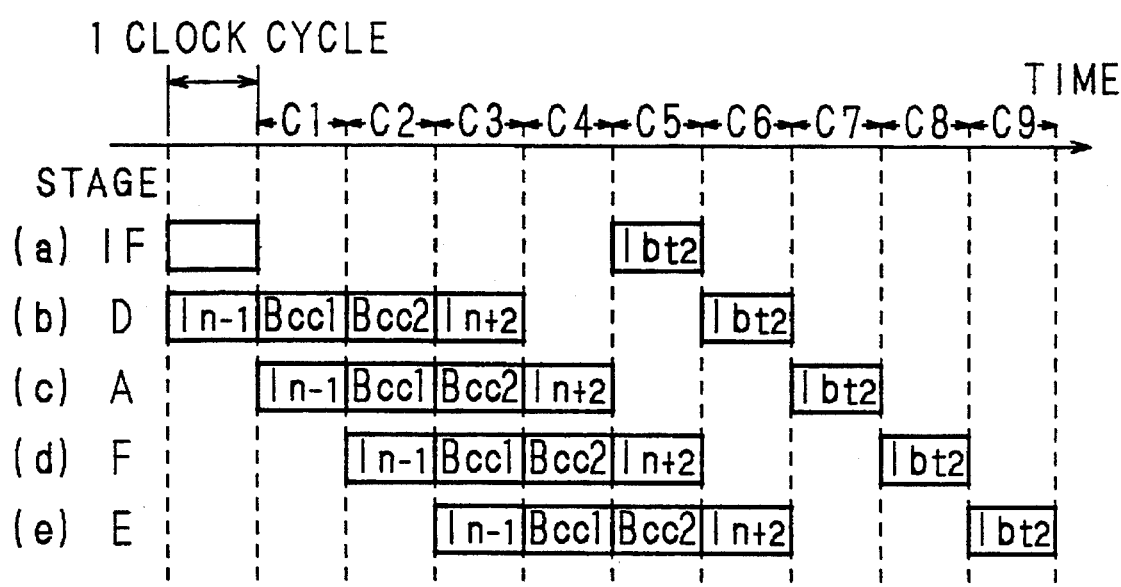
FIG. 67 is a timing chart of the case where two Bcc instructions are processed successively based upon an example of one embodiment of a data processor of the present invention.

A state of pipeline processing in the case where the conditional branch instruction is continued is shown in a schematic diagram in FIG. 87. In FIG. 67, the case where the Bcc1 and Bcc2 are predicted not to branch and the branch prediction for the Bcc1 was right is shown.

In the C1 cycle, the branch target instruction pre-fetch processing related to the Bcc1 is performed, and the branch target instruction pre-fetch processing related to the Bcc2 is performed in the C2 cycle. Though two instruction queues are being used already in the C2 cycle, since the branch target address of the Bcc2 is saved by the instruction fetch unit 111, pipeline processing of the instruction succeeding the Bcc2 can be continued. In the C4 cycle, the branch condition related to the Bcc1 is fixed, and the instruction queue of the sequence on the branch target side of the Bcc1 is voided. The conditional judgment of the Bcc2 is performed in the C5 cycle. When the branch prediction is right, the instruction succeeding the Bcc2 can be processed in the C6 cycle. When the branch prediction is missed, the branch target instruction can be fetched in the C5 cycle when sooner, and execution of the branch target instruction can be started in the C9 cycle.

In this way, two conditional branch instructions can be processed efficiently by two instruction queues and one address saving mechanism. When checking exception by the program, since there are many cases in which the conditional branch instructions not branching by the normal operation are continued, such a method is effective.

Figure 68:
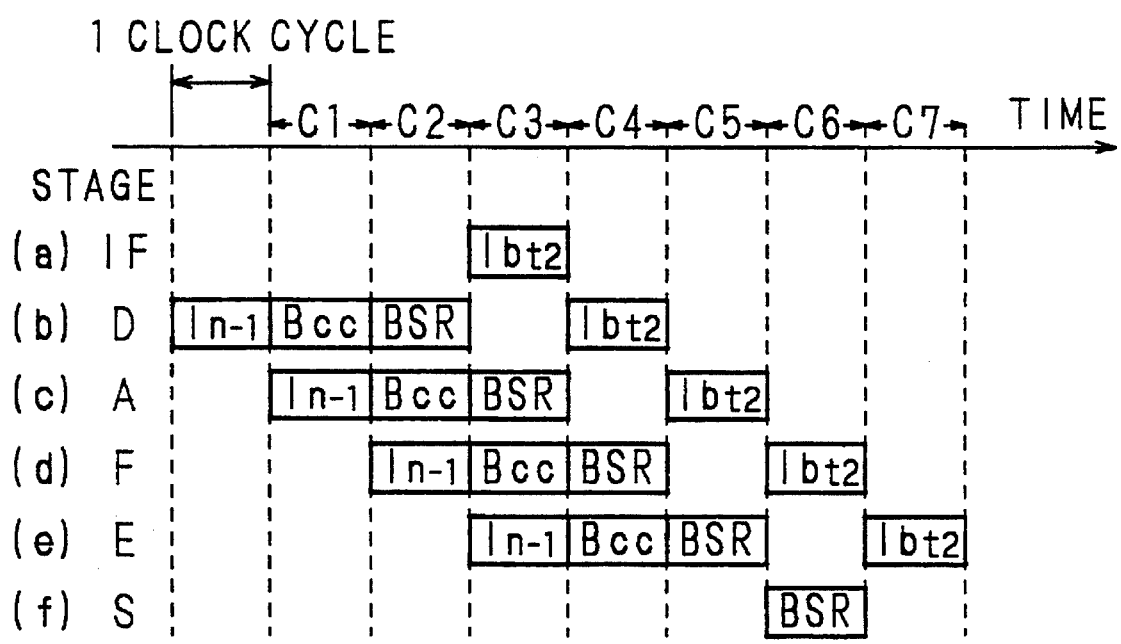
FIG. 68 is a timing chart of the case where Bcc instruction and BSR instruction are processed successively based upon an example of one embodiment of a data processor of the present invention.

A schematic view of FIG. 68 shows a state of pipeline processing when the BSR instruction is succeeding immediately after the Bcc instruction. In this example, the case where the Bcc instruction is predicted not to branch and the branch prediction was right is shown.

The branch target instruction pre-fetch processing related to the Bcc instruction is performed in the C1 cycle. In the C2 cycle, the unconditional pre-jump processing is performed For the BSR instruction. Though two instruction queues are being used, since the instruction queue now being used can be used because of the unconditional pre-jump, the BSR branch target instruction can be pre-fetched in the C3 cycle. Thus, after executing the BSR instruction in the C5 cycle, the branch target instruction is executed in the C7 cycle.

In this way, since the branch target instruction is fetched by using the instruction queue on the side being used in the unconditional pre-jump processing, the unconditional jump instruction immediately after the conditional branch instruction can be pipeline processed efficiently.

Embodiment 2

Figure 69:
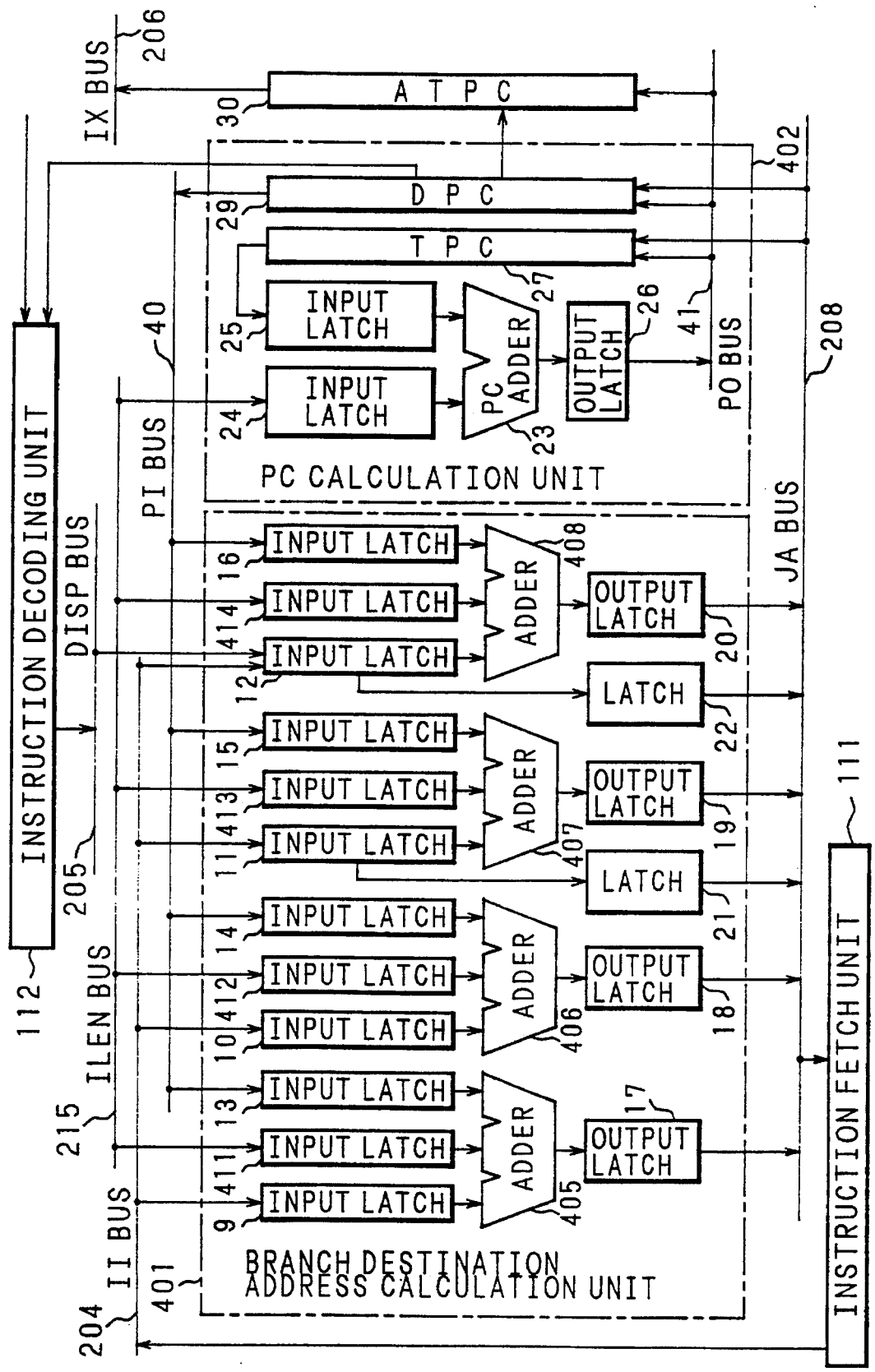
FIG. 69 is a block diagram showing a configuration of PC processing unit based upon an example of one embodiment of a data processor of the present invention.

In the aforementioned embodiment, additions of the code length processed in respective decoding cycles in the PC calculation unit 2 are performed in respective cycles. However, when it is difficult to add the code length during the cycle because of requiring relatively a long time for fixing the processing code length in the decoding cycles, it can be coped with the above case by constructing the branch designation address calculation unit 1 and the PC calculation unit 2 shown in FIG. 49 and FIG. 50 in the embodiment 1 to have configuration as shown in FIG. 69. In the configuration shown in FIG. 69, though a basic processing method of the jump instruction is equal to that of the embodiment 1, the addition timing of the PC calculation and the branch target address calculating method are different. In the following, descriptions are made in view of the difference with the embodiment 1.

The PC calculation unit 402, after instruction decoding, adds the processing code length of the instruction decoded immediately before in the next cycle so as to control the PC value. Thus, at the start of instruction decoding, the TPC 27 shows the head address of code decoded immediately before, and address obtained by adding the code length which has been processed immediately before to the value of TPC 27, becomes the head address of the instruction to be decoded. And hence, the address 405 to 408 of the branch target address calculation unit 401 employ a ternary adder, and add the value of TPC 27 transferred via the PI bus 40, the code length of the code decoded immediately before being transferred via the ILEN bus 215, and the branch displacement field of the branch instruction transferred via the II bus 204. Processings related to the position of the branch displacement field taken into the address 405 to 408, absolute address and so on are similar to those in the embodiments shown in FIG. 49 and FIG. 50. In such a manner, at processing the jump instruction, the adders 405 to 408 can obtain the same addition results as the first to fourth adders 5 to 8 shown in FIG. 49 and FIG. 50.

When the branch target address is calculated after instruction decoding, it is performed by adding the value of DPC 29 which is a head address value of the branch instruction transferred via the PI bus 40, "0" transferred via the ILEN bus 215 and the branch displacement field of the branch instruction transferred via the DISP bus 205 by the adder 408. Calculation of the next instruction PC value may be performed by adding the value of APC 30 and the code length of the branch instruction outputted from the instruction decoding unit 112 via the ADJST bus 24 in the address calculation unit 115.

In this way, the jump instruction can be processed also by the embodiment 2 in entirely the same way as the aforementioned embodiment 1.

In the above-mentioned embodiment, though four adders are implemented so as to calculate the branch target address at instruction decoding, taking into account of the cost of hardwares, concentrating on the instructions which are particularly used frequently, the number of adders may be decreased. For example, only when the contracted type BRA instruction, Bcc instruction and BSR instruction are to be speed- upped, the adder which calculates the branch target address simultaneously with the instruction decoding may be one. On the contrary, responding to branch displacements of the ACB instruction, SCB instruction, and further, the FBcc instruction, the adders may be implemented more.

Also, for processing the instruction in which the jump target address is designated by the absolute address, the jump processing at the instruction decoding stage may be performed for only one field, or when there are many absolute address fields to be processed, field cut-out means may be provided more.

In the above-mentioned embodiment, though dynamic branch prediction is made for the Bcc instruction, static prediction is made for the FBcc instruction not to branch and static prediction is made for the ACB and SCB instructions, it does not matter what prediction is made. For example, it doesn't matter that static prediction is made for all of the branch instructions to branch and they are processed. Concerning to the configuration of the instruction queue, it is effective for the conventional general processing method which statically predict that all branch instructions do not branch.

In the above-mentioned embodiment, though the dynamic branch prediction is made at the instruction decoding stage for the Bcc instruction, the configuration of the instruction queue of the present invention is effective even when the hardware such as a branch target buffer which makes branch prediction and generates the branch target address at the instruction fetch stage is used. Even when calculating all of the branch target addresses at the address calculation stage and performing jump processing at the A stage 133, the configuration of the instruction queue of the present invention is effective.

In the above-mentioned embodiment, when DBC.D=1, or PSW.DB=1, though the unconditional branch instruction is ended, more detailed conditions may be set to increase the cases of ending the unconditional branch instruction. For example, when DBC.TR=00, DBC.E=0, DBC.R=0, and DBC.W= 0, it may be designed not to detect the debug event even when the DBC.D=1 or PSW.DB=1.

In the above-mentioned embodiment 2, though one instruction is divided into one or plural portions so as to decode them and PC calculation is performed in instruction code unit which is the decoding target of the cycles, the PC calculation may be controlled in instruction unit. For example, in the next cycle of the last decoding cycle of one instruction, head address of the instruction decoded immediately before and its instruction length may be added. Particularly, such configuration is logical when all of the instructions can be decoded in one cycle. Though the PC calculation unit 2 controls the PC value in the above-mentioned embodiment, the instruction fetch unit 111 may control the PC value and output to the branch target address calculation unit 1 as the instruction address outputted by the instruction queue.

In the above-mentioned embodiment, though a latch in which branch target address of the second branch instruction is saved is included in the instruction fetch unit 111, from a view point of hardware, this latch may be provided at any position.

In the above-mentioned embodiment, though the branch target address is saved even when using two instruction queues and at conditional pre-jump processing, since the branch target instruction can not be fetched unless either of the two instruction queues is vacant, when the two instruction queues are both used, control of the instruction fetch unit may be simplified by saving the branch target address only at the branch target instruction pre-fetch. In this case, even when the second conditional branch instruction can not accept the conditional pre-jump processing request, it is preferable to continue only the conditional pre-jump processing, and for the purpose of fixing the processing direction of the instruction immediately after executing the conditional branch instruction in an early stage, it is better to output the step code.

Furthermore, in the example of state transition of the instruction queue unit 82 shown in FIG. 54, though it is constituted such that, when a branch prediction miss and pre-jump related request are overlapped, the branch prediction miss is accepted preferentially, it is to be understood that a configuration, whereby the instruction fetch unit 111 accepts the branch prediction miss and pre-jump related request simultaneously for processing, can be employed.

As particularly described hereinabove, according to the first, second, sixth, seventh and eighth inventions of the present invention, since decoding of the instruction and calculation of the branch target address, assuming that the instruction is the branch instruction, are performed in parallel, at branch instruction processing, the branch target instruction can be fetched immediately after decoding the instruction. And hence, a high-function data processor which is inexpensive and capable of pipeline processing of the branch instruction rapidly by only adding a small amount of hardwares can be obtained.

According to the third and ninth inventions of the present invention, since decoding of the instruction and calculation of the branch target address, assuming that the instruction is the branch instruction, can be performed in parallel, the branch target instruction can be fetched immediately after decoding the instruction at the first branch instruction processing, and also for the second branch instruction, the same adder can be used for calculating the branch target address. And hence, a high-function data processor which is inexpensive and capable of pipeline processing of the branch instruction rapidly by only adding a small amount of hardwares can be obtained.

According to the fourth invention of the present invention, since decoding of the instruction and cut out of an absolute address field, assuming that the instruction is the jump instruction, are performed in parallel, at jump instruction processing where the jump target address is designated in the absolute address, the jump target instruction can be fetched immediately after decoding the instruction. And hence a high-function data processor which is inexpensive and capable of pipeline processing of the jump instruction rapidly by only adding a small amount of hardwares can be obtained.

According to the fifth and tenth inventions of the present invention, since decoding of the instruction, calculation of the branch target address and cut out of the absolute address field, assuming that the instruction is the jump instruction, are performed in parallel, at jump instruction processing where the jump target address is designated in a PC relative mode or an absolute mode, the jump target instruction can be fetched immediately after decoding the instruction. And hence, a high-function data processor which is inexpensive and capable of pipeline processing of the jump instruction rapidly by only adding a small amount of hardwares can be obtained.

According to the eleventh invention of the present invention, by including pre-branch means, two instruction pre-fetch queues and a branch target address saving latch, during processing the first conditional branch instruction, the second branch instruction processing can be continued with the second branch instruction branch target address being saved in the branch target address saving latch. And hence, a high-function data processor which is inexpensive and capable of pipeline processing of the two conditional branch instructions efficiently can be obtained.

According the twelfth invention of the present invention, since pre-branch means and two instruction pre-fetch queues are included, the branch target instruction is fetched in by using the instruction pre-fetch queue which is different from the instruction pre-fetch queue used at present at the conditional branch instruction processing, and the branch target instruction is fetched in by using the instruction pre-fetch queue used at present at the unconditional branch instruction processing, also for the unconditional branch instruction immediately after the conditional branch instruction, the branch target instruction can be fetched and outputted to the instruction decoding unit. And hence, a high-function data processor which is inexpensive and capable of pipeline processing of the conditional branch instruction and the unconditional branch instruction efficiently can be obtained.

According to the thirteenth invention of the present invention, since pre-jump means is included, pre-jump processing is performed at unconditional jump instruction processing and the unconditional jump instruction is processed in the instruction executing unit only when a mode register is showing a first mode, a high-function data processor capable of processing of the unconditional jump instruction efficiently and properly responsive to the operation modes can be obtained.

According to the fourteenth invention of the present invention, since pre-jump means is included, pre-jump processing is performed at the unconditional jump instruction processing, and the unconditional jump instruction is processed in the instruction executing unit only when exception is detected by judging means, a high-function data processor which processes the unconditional branch instruction efficiently and operates properly even when detecting the exception can be obtained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A data processor for processing a first branch instruction which includes a first operation code field and a first branch displacement field and branches to an address obtained by adding a value of said first branch displacement field to its address, and a second branch instruction which includes a second operation code field and a second branch displacement field different from said first displacement field, and branches to an address obtained by adding a value of said second branch displacement field to its address, comprising:

a memory for storing instructions;

an instruction fetch unit for fetching the instructions from said memory;

an instruction decoding unit for decoding the instructions fetched by said instruction fetch unit and outputting a decoded result;

an instruction execution unit for executing the instructions on the basis of the said decoded result inputted from said instruction decoding unit;

a program counter for holding an address of the instruction being decoded in said instruction decoding unit; and a branch target address calculation unit including first adding means for calculating a first address in parallel with decoding of a first instruction in said instruction decoding unit, by adding a value of the first branch displacement field of said first instruction inputted from said instruction fetch unit, and an address of said first instruction inputted from said program counter, said first adding means starting calculation of said first address before said first instruction is identified as said first branch instruction, second adding means for calculating a second address in parallel with decoding of said first instruction in said instruction decoding unit, by adding a value of the second branch displacement field of said first instruction inputted from said instruction fetch unit, and an address of said first instruction inputted from said program counter, said second adding means starting calculation of said second address before said first instruction is identified as said second branch instruction, and transferring means for selectively transferring said first and second address to said instruction fetch unit in accordance with a part of said decoded result of said first instruction, said transferring means transferring said first address when said first instruction is said first branch instruction, and transferring said second address when said first instruction is said second branch instruction, wherein said instruction fetch unit fetches an instruction of said first address when said first instruction is said first branch instruction, and fetches an instruction of said second address when said first instruction is said second branch instruction.

2. A data processor for processing a first branch instruction which includes a first operation code field and a first branch displacement field and branches to an address obtained by adding a value of said first branch displacement field to its address, and a second branch instruction which includes a second operation code field and a second branch displacement field different from said first displacement field, and branches to an address obtained by adding a value of said second branch displacement field to its address, comprising:

a memory for storing instructions;

an instruction fetch unit for fetching the instructions from said memory;

an instruction decoding unit for decoding the instructions fetched by said instruction fetch unit, outputting a decoded result, and outputting a value of said second branch displacement field when the decoded instruction is said second branch instruction;

an instruction execution unit for executing the instructions on the basis of said decoded result inputted from said instruction decoding unit;

a program counter for holding an address of the instruction being decoded in said instruction decoding unit; and a branch target address calculation unit including adding means (a) for calculating a first address in parallel with decoding of a first instruction in said instruction decoding unit, by adding a value of said first branch displacement field of said first instruction inputted from said instruction fetch unit, and an address of said first instruction inputted from said program counter, said adding means starting calculation of said first address before said first instruction is identified as said first branch instruction, and (b) for calculating a second address after calculating said first address, by adding a value of said second branch displacement field of said first instruction inputted from said instruction decoding unit, and an address of said first instruction inputted from said program counter, when said first instruction is said second branch instruction; and transferring means for selectively transferring said first and second address to said instruction fetch unit in accordance with a part of said decoded result of said first instruction, said transferring means transferring said first address when said first instruction is said first branch instruction, and transferring said second address when said first instruction is said second branch instruction, wherein said instruction fetch unit fetches an instruction of said first address when said first instruction is said first branch instruction, and fetches an instruction of said second address when said first instruction is said second branch instruction.

3. A data processor for processing a branch instruction which includes an operation code field and a branch displacement field, and branches to an address obtained by adding a value of said branch displacement field to its address, comprising:

a memory for storing instructions;

an instruction fetch unit for fetching the instructions from said memory;

an instruction decoding unit for decoding the instructions fetched by said instruction fetch unit and outputting a decoded result including a code length of the decoded instruction;

an instruction execution unit for executing the instructions on the basis of said decoded result inputted from said instruction decoding unit;

a program counter for holding an address of the instruction being decoded in said instruction decoding unit; and a branch target address calculation unit including adding means for calculating a first address in parallel with decoding of a first instruction in said instruction decoding unit, by adding a value of said branch displacement field of said first instruction inputted from said instruction fetch unit, an address of a second instruction preceding to said first instruction inputted from said program counter, and said code length of said second instruction inputted from said instruction decoding unit, said adding means stating calculation of said first address before said first instruction is identified as said branch instruction; and transferring means for transferring said first address to said instruction fetch unit when said first instruction is said branch instruction, wherein said instruction fetch unit fetches an instruction of said first address when said first instruction is said branch instruction.

4. A data processor for processing a branch instruction which includes an operation code field and a branch displacement field, and branches to an address obtained by adding a value of said branch displacement field to its address, comprising:

a memory for storing instructions;

an instruction fetch unit for fetching the instructions from said memory;

an instruction decoding unit for decoding the instructions fetched by said instruction fetch unit, dividing one instruction into one or a plural number of unit processing codes, processing one of said unit processing code in one decoding processing, and for outputting a decoded result including a code length of the decoded unit processing code;

an instruction execution unit for executing the instructions on the basis of the said decoded result inputted from said instruction decoding unit;

a program counter for holding an address of the unit processing code decoded in said instruction decoding unit; and a branch target address calculation unit including adding means, including a three input adder, for calculating a first address in parallel with decoding of a first unit processing code of a first instruction in said instruction decoding unit, by adding a value of said branch displacement field of said first instruction inputted from said instruction fetch unit, an address of a last unit processing code of a second instruction preceding to said first instruction inputted from said program counter, and said code length of said last unit processing code inputted from said instruction decoding unit, said adding means stating calculation of said first address before said first instruction is identified as said branch instruction; and transferring means for transferring said first address to said instruction fetch unit when said first instruction is said branch instruction, wherein said instruction fetch unit fetches an instruction of said first address when said first instruction is said branch instruction.

5. A data processor for processing a first branch instruction which includes a first operation code field and a first branch displacement field, and branches to an address obtained by adding a value of said first branch displacement field to its address, and a second branch instruction which includes a second operation code field and a second branch displacement field different from said first displacement field, and branches to an address obtained by adding a value of said second branch displacement field to its address, comprising:

a memory for storing instructions;

an instruction fetch unit for fetching the instructions from said memory;

an instruction decoding unit for decoding the instructions fetched by said instruction fetch unit, dividing one instruction into one or a plural number of unit processing codes, processing one of said unit processing code in one decoding processing, and outputting a decoded result including a code length of the decoded unit processing code;

an instruction execution unit for executing the instructions on the basis of said decoded results inputted from said instruction decoding unit;

a program counter for holding an address of the unit processing code decoded in said instruction decoding unit; and a branch target address calculation unit including first adding means, including a first three input adder, for calculating a first address in parallel with decoding of a first unit processing code of a first instruction in said instruction decoding unit, by adding a value of said first branch displacement field of said first instruction inputted from said instruction fetch unit, an address of a last unit processing code of a second instruction preceding to said first instruction inputted from said program counter, and a code length of said last unit processing code inputted from said instruction decoding unit, said first adding means stating calculation of said first address before said first instruction is identified as said first branch instruction;

second adding means, including a second three input adder, for calculating a second address in parallel with decoding of said first unit processing code of said first instruction in said instruction decoding unit, by adding a value of said second branch displacement field of said first instruction inputted from said instruction fetch unit, the address of said last unit processing code of said second instruction inputted from said program counter, and said code length of said last unit processing code inputted from said instruction decoding unit, said second adding means stating calculation of said second address before said first instruction is identified as said second branch instruction; and transferring means for selectively transferring said first and second address to said instruction fetch unit in accordance with a part of said decoded result of said first instruction, said transferring means transferring said first address when said first instruction is said first branch instruction, and transferring said second address when said first instruction is said second branch instruction, wherein said instruction fetch unit fetches an instruction of said first address when said first instruction is said first branch instruction, and fetches an instruction of said second address when said first instruction is said second branch instruction.

6. A data processor for processing a first branch instruction which includes a first operation code field and a first branch displacement field, and branches to an address obtained by adding value of said first branch displacement field to its address, and a second branch instruction which includes a second operation code field and a second branch displacement field different from said first displacement field, and branches to an address obtained by adding a value of said second branch displacement field to its address, comprising:

a memory for storing instructions;

an instruction fetch unit for fetching the instructions from said memory;

an instruction decoding unit for decoding the instructions fetched by said instruction fetch unit, dividing one instruction into one or a plural number of unit processing codes, processing one of said unit processing code in one decoding processing, outputting a decoded result including a code length of the decoded unit processing code, and outputting a value of said second branch displacement field when the decoded instruction is said second branch instruction;

an instruction execution unit for executing the instructions on the basis of said decoded result inputted from said instruction decoding unit;

a program counter for holding an address of the unit processing code decoded in said instruction decoding unit; and a branch target address calculation unit including adding means, including a three input adder, (a) for calculating a first address in parallel with decoding of a first unit processing code of a first instruction in said instruction decoding unit, by adding a value of said first branch displacement field of said first instruction inputted from said instruction fetch unit, an address of a last unit processing code of a second instruction preceding to said first instruction inputted from said program counter, and said code length of said last unit processing code inputted from said instruction decoding unit, said adding means starting calculation of said first address before said first instruction is identified as said first branch instruction and (b) for calculating a second address after calculating said first address, by adding a value of said second branch displacement field of said first instruction inputted from said instruction decoding unit, and an address of said first instruction inputted from said program counter, when said first instruction is said second branch instruction; and transferring means for selectively transferring said first and second address to said instruction fetch unit in accordance with a part of said decoded result of said first instruction, said transferring means transferring said first address when said first instruction is said first branch instruction, and transferring said second address when said first instruction is said second branch instruction, wherein said instruction fetch unit fetches an instruction of said first address when said first instruction is said first branch instruction, and fetches an instruction of said second address when said first instruction is said second branch instruction.

* * * * *